United States Patent
Nishi et al.

(10) Patent No.: US 9,990,952 B2
(45) Date of Patent: Jun. 5, 2018

(54) OPTICAL MEDIUM REPRODUCING DEVICE AND OPTICAL MEDIUM REPRODUCING METHOD

(71) Applicant: Sony Corporation, Tokyo (JP)

(72) Inventors: Noriaki Nishi, Kanagawa (JP); Kimihiro Saito, Saitama (JP); Junya Shiraishi, Tokyo (JP); Nobuhiko Ando, Nagano (JP)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 15/548,520

(22) PCT Filed: Dec. 9, 2015

(86) PCT No.: PCT/JP2015/006143
§ 371 (c)(1),
(2) Date: Aug. 3, 2017

(87) PCT Pub. No.: WO2016/129022
PCT Pub. Date: Aug. 18, 2016

(65) Prior Publication Data
US 2018/0096703 A1 Apr. 5, 2018

(30) Foreign Application Priority Data
Feb. 12, 2015 (JP) .................................. 2015-025666

(51) Int. Cl.
*G11B 7/135* (2012.01)
*G11B 7/005* (2006.01)
(Continued)

(52) U.S. Cl.
CPC ............ *G11B 7/005* (2013.01); *G11B 7/1381* (2013.01); *G11B 20/10009* (2013.01); *G11B 2007/00709* (2013.01); *G11B 2220/2541* (2013.01)

(58) Field of Classification Search
None
See application file for complete search history.

(56) References Cited

U.S. PATENT DOCUMENTS 4,633,457 A * 12/1986 Yamamoto ............... G11B 7/08
369/112.17
5,581,531 A * 12/1996 Ito ............................. G03F 7/26
369/100
(Continued)

FOREIGN PATENT DOCUMENTS

JP 05-242512 A 9/1993
JP 08-249664 A 9/1996
(Continued)

OTHER PUBLICATIONS

International Search Report and Written Opinion and English translation thereof dated Mar. 1, 2016 in connection with International Application No. PCT/JP2015/006143.
(Continued)

*Primary Examiner* — Peter Vincent Agustin
(74) *Attorney, Agent, or Firm* — Wolf, Greenfield & Sacks, P.C.

(57) ABSTRACT

There is provided an optical medium reproducing device configured to optically reproduce an optical medium including a plurality of tracks formed, the optical medium reproducing device including: an optical filter configured to receive an incident returned light beam from the optical medium, and to spatially and optically form a plurality of signals having different bands in a tangential direction and a radial direction; an arithmetic unit configured to operate the plurality of first signals formed by the optical filter so as to form a plurality of channels of second signals; and an electrical filter configured to individually receive the second (Continued)

signals, and to perform processing to the second signals so as to acquire a reproduced signal.

11 Claims, 39 Drawing Sheets

(51) Int. Cl.
    *G11B 20/10*     (2006.01)
    *G11B 7/1381*     (2012.01)
    *G11B 7/007*     (2006.01)

(56) References Cited

U.S. PATENT DOCUMENTS

| | | | | |
|---|---|---|---|---|
| 5,621,717 | A * | 4/1997 | Finkelstein | G11B 7/0037 |
| | | | | 369/112.16 |
| 5,625,613 | A * | 4/1997 | Kato | G11B 7/005 |
| | | | | 369/112.15 |
| 2006/0114791 | A1 * | 6/2006 | Marshall | G11B 7/1381 |
| | | | | 369/100 |
| 2014/0341006 | A1 | 11/2014 | Miyashita et al. | |
| 2016/0196848 | A1 * | 7/2016 | Nishi | G11B 20/10046 |
| | | | | 369/59.15 |
| 2017/0133049 | A1 * | 5/2017 | Nishi | G11B 7/005 |

FOREIGN PATENT DOCUMENTS

| | | |
|---|---|---|
| JP | 2009-199635 A | 9/2009 |
| JP | 2012-079385 A | 4/2012 |
| WO | WO 2014/054246 A1 | 4/2014 |
| WO | WO 2014/203526 A1 | 12/2014 |
| WO | WO 2014/207972 A1 | 12/2014 |

OTHER PUBLICATIONS

International Preliminary Report on Patentability and English translation thereof dated Aug. 24, 2017 in connection with International Application No. PCT/JP2015/006143.

* cited by examiner

FIG. 12
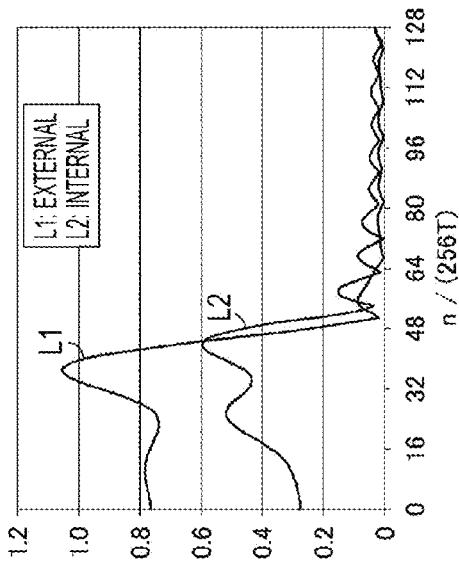
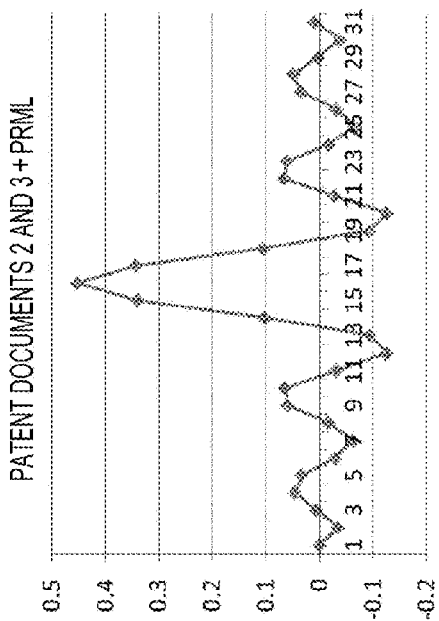
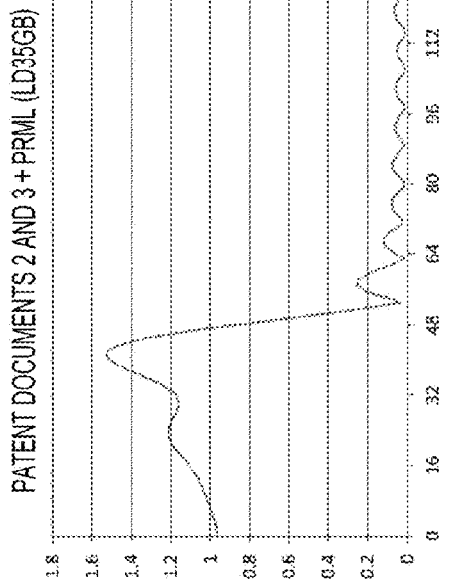

FIG. 14
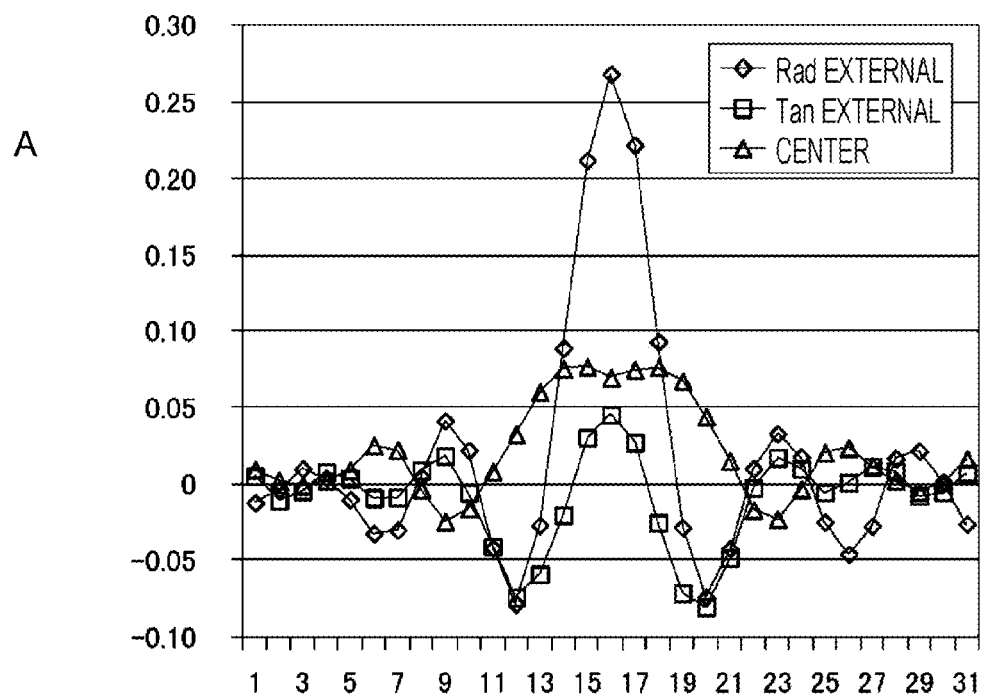
A
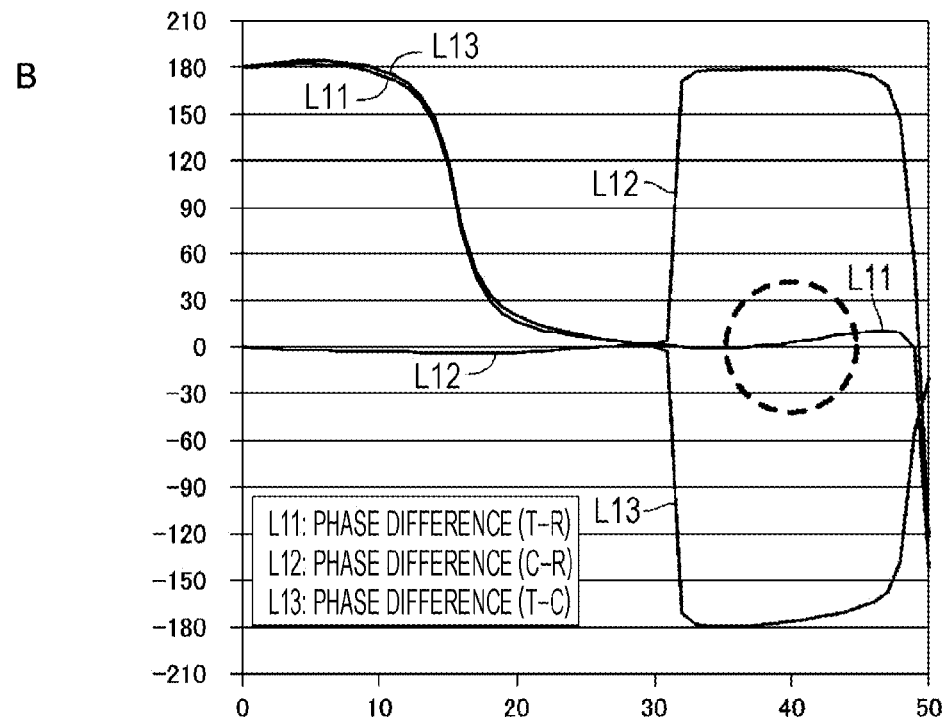
B

FIG. 16
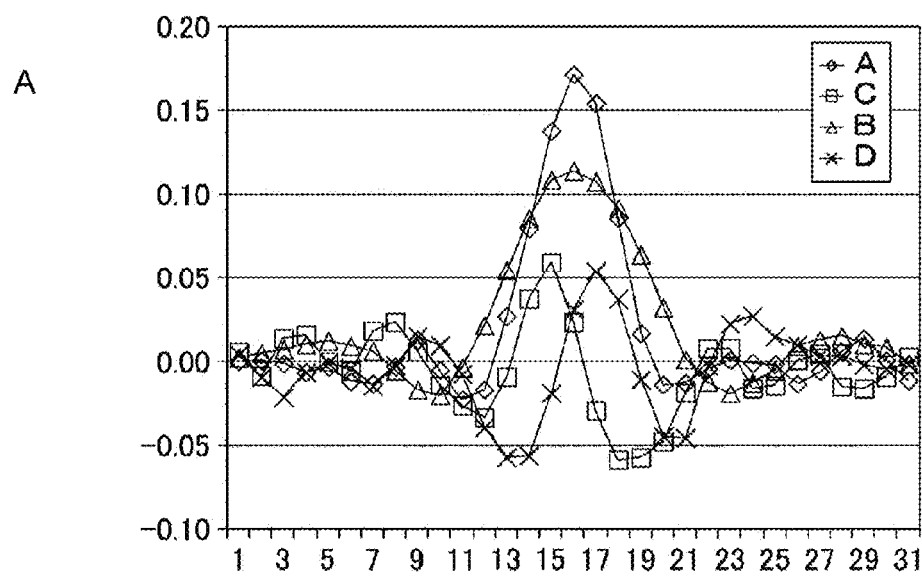
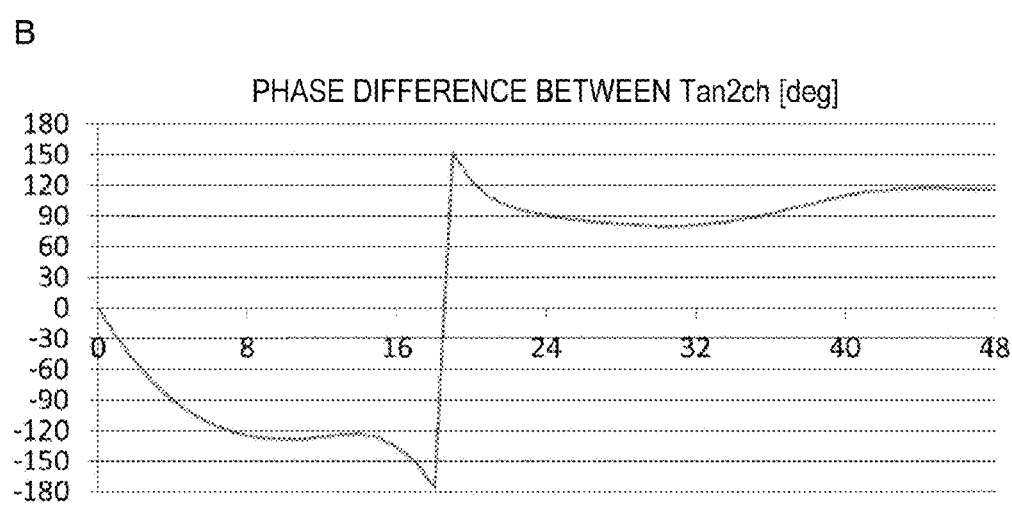

FIG. 18
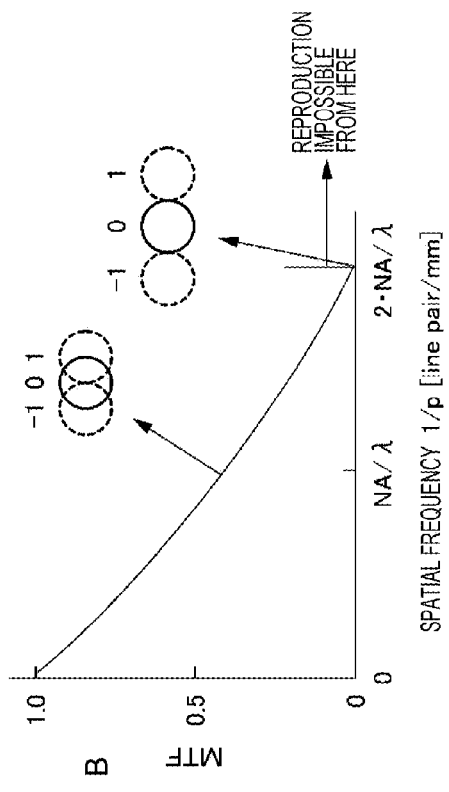
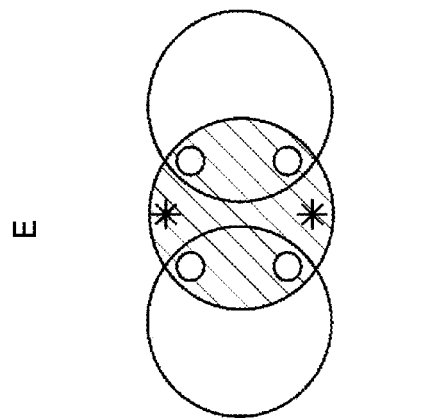
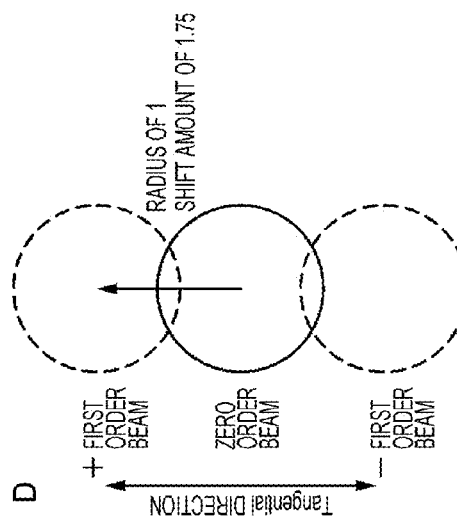
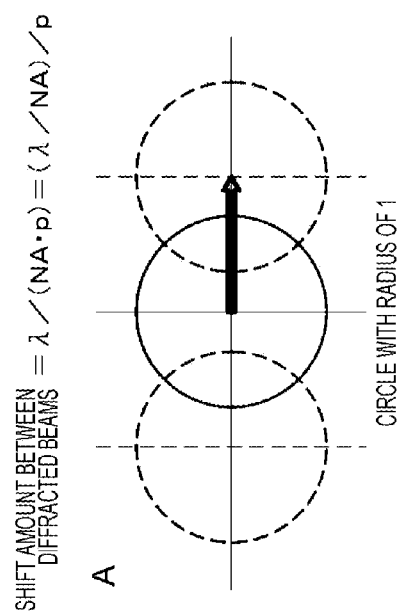
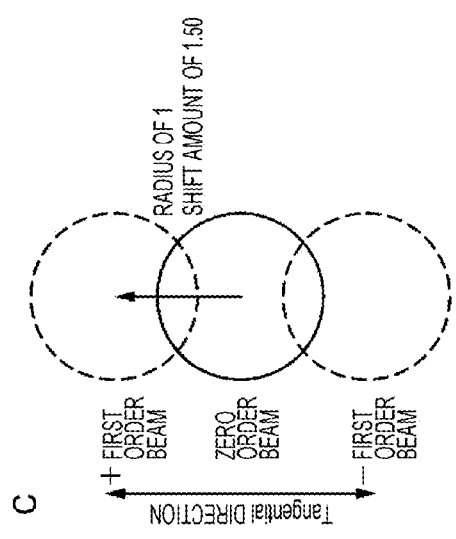

FIG. 21
A
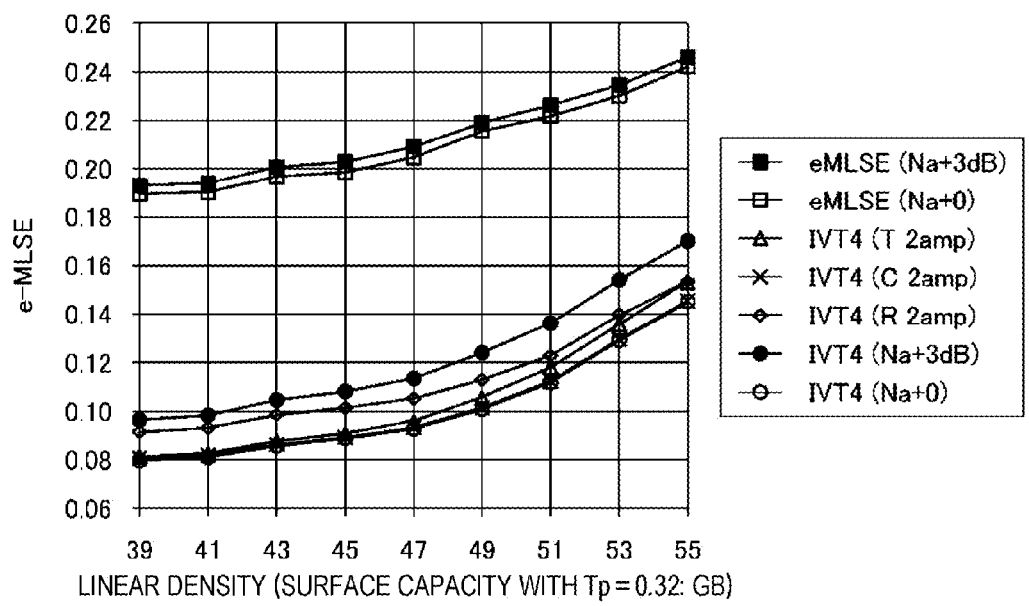
B
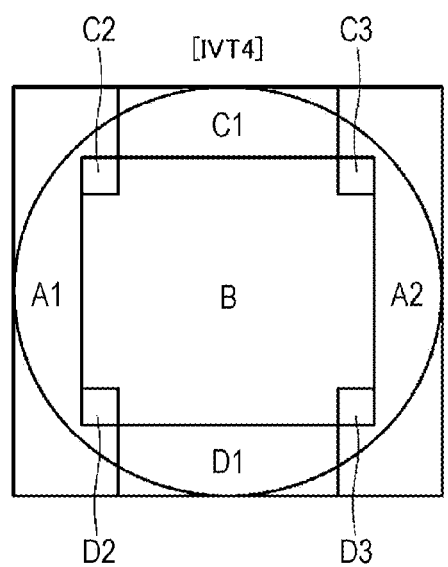

FIG. 22
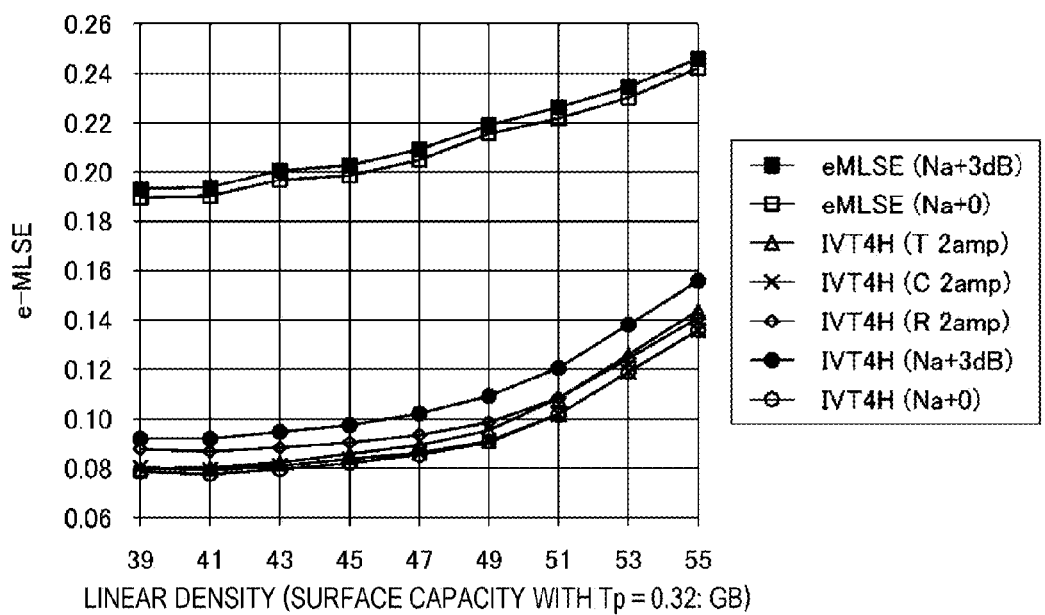
A
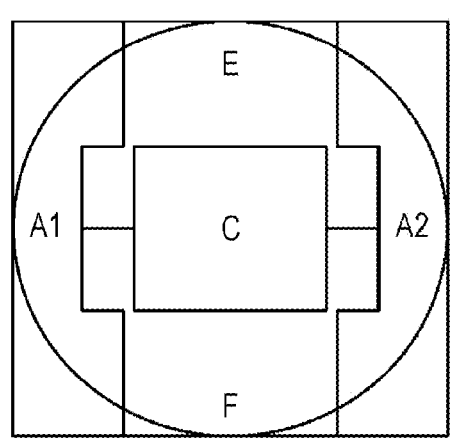
B

FIG. 24
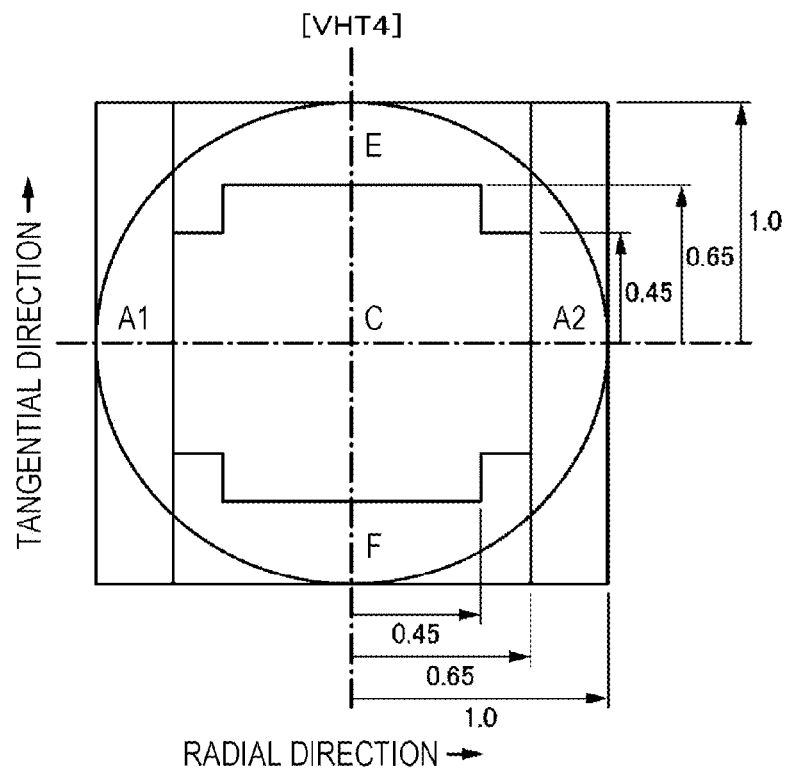
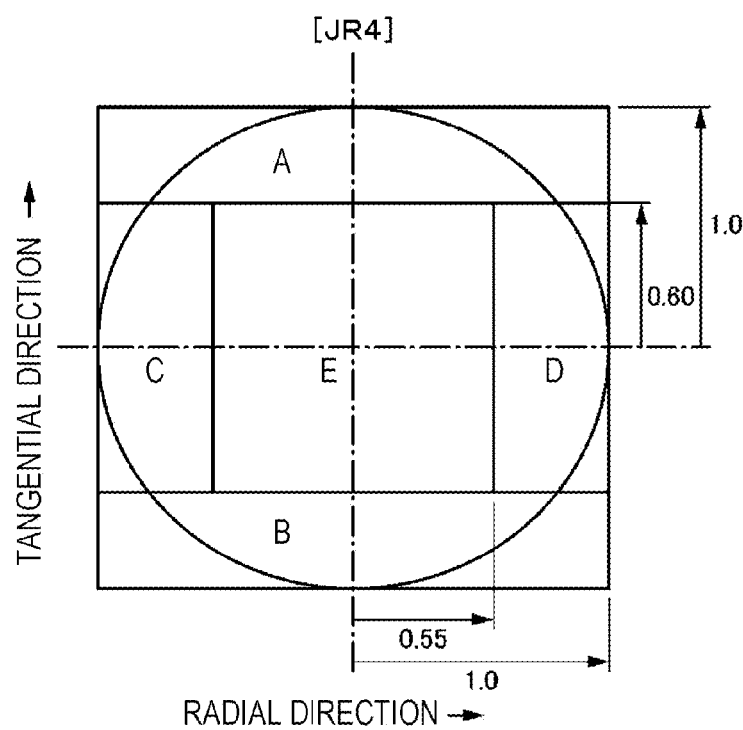

FIG. 25
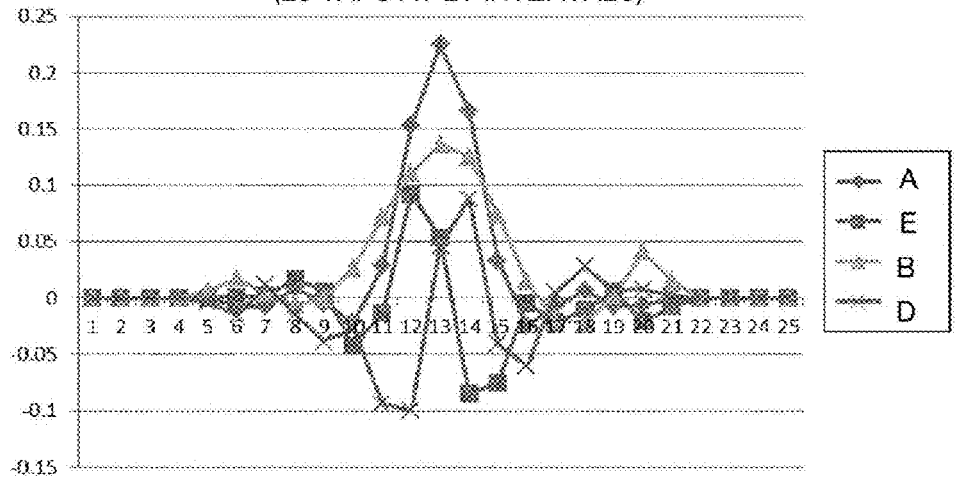
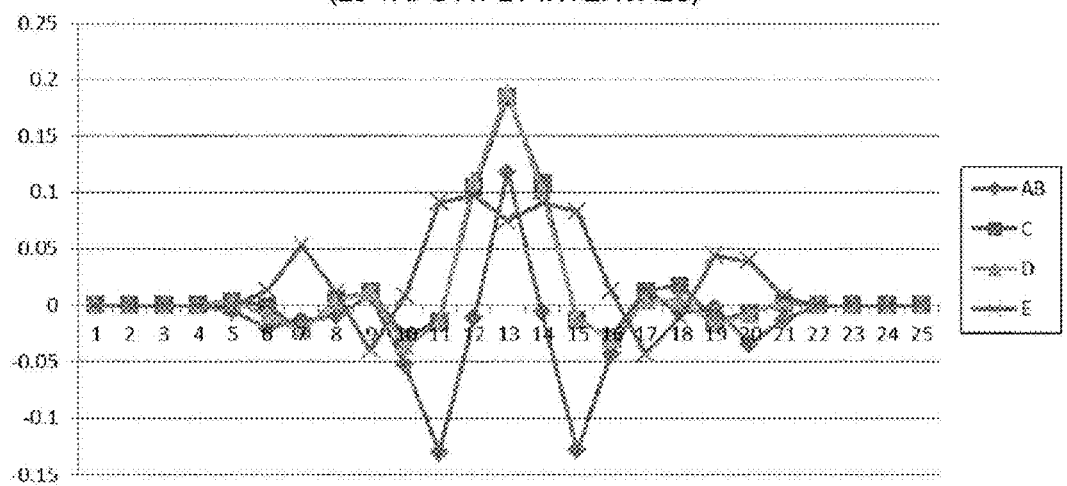

FIG. 30
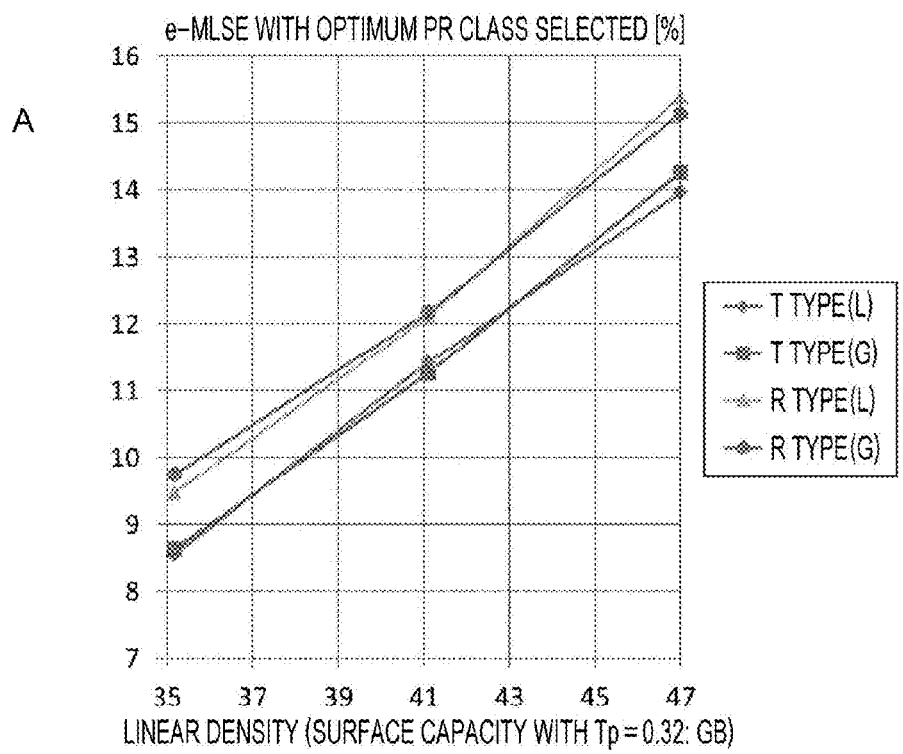
A
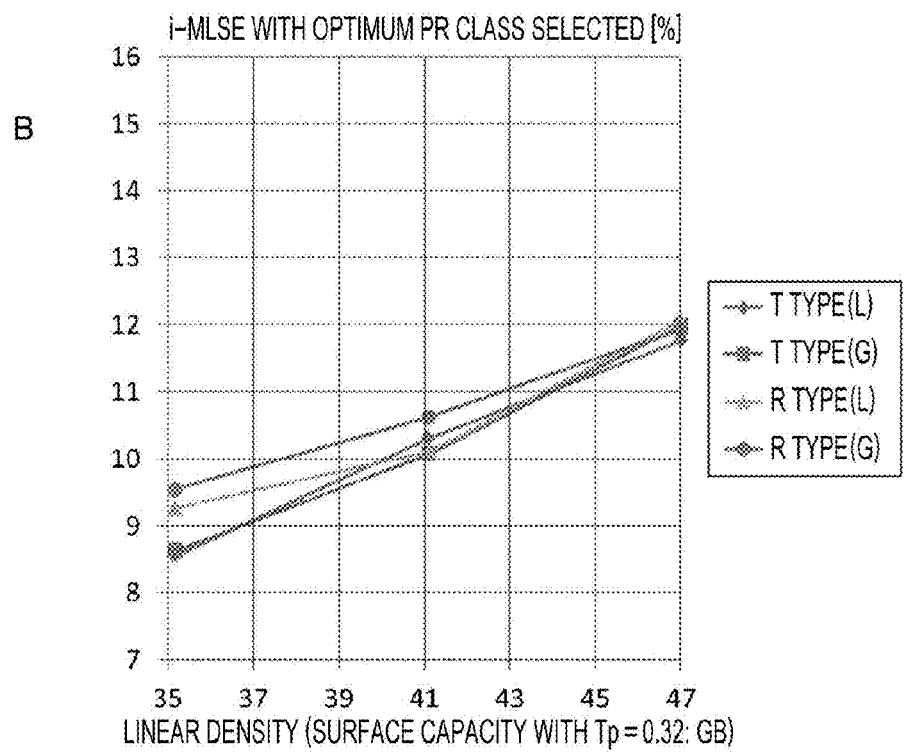
B

[IVNST6]

[VHT4]

OPTICAL MEDIUM REPRODUCING DEVICE AND OPTICAL MEDIUM REPRODUCING METHOD

CROSS REFERENCE TO RELATED APPLICATIONS

This application claims the benefit under 35 U.S.C. § 371 as a U.S. National Stage Entry of International Application No. PCT/JP2015/006143, filed in the Japanese Patent Office as a Receiving Office on Dec. 9, 2015, which claims priority to Japanese Patent Application Number JP2015-025666, filed in the Japanese Patent Office on Feb. 12, 2015, each of which is hereby incorporated by reference in its entirety.

TECHNICAL FIELD

The present disclosure relates to an optical medium reproducing device that reproduces an optical medium, such as an optical disc, and an optical medium reproducing method.

BACKGROUND ART

Examples of a method of performing densification to an optical disc, include a method of performing densification in a linear density direction by shortening a channel bit length, namely, a mark length, and a method of narrowing a track pitch. However, performing the densification in the linear density direction causes a problem that inter-code interference increases. In addition, narrowing the track pitch increases leakage of information from an adjacent track (adjacent track crosstalk). A method of reducing adjacent track crosstalk (hereinafter, appropriately referred to as crosstalk, simply) has been proposed.

For example, Patent Document 1 describes that crosstalk is canceled by supplying reproduced signals of a track to be reproduced and tracks on both sides thereof, to adaptive equalizer units, and controlling the tap coefficients of the adaptive equalizer units.

Furthermore, Patent Documents 2 and 3 each describe that the influence of crosstalk is reduced by spatially dividing reflected light from an optical medium into three in a track width direction, individually detecting the light that has been divided into three, performing constant multiplication to detected signals (weighting), and operating addition. In addition, Patent Document 2 has suggested that further performing weighting in a beam propagating direction can emphasize and reproduce a reproduced signal of a small recorded mark, as an idea.

CITATION LIST

Patent Document

Patent Document 1: Japanese Patent Application Laid-Open No. 2012-079385
Patent Document 2: Japanese Patent Application Laid-Open No. 8-249664
Patent Document 3: Japanese Patent Application Laid-Open No. 5-242512

SUMMARY OF THE INVENTION

Problems to be Solved by the Invention

The technology described in Patent Document 1, needs three beams in order to read the track to be reproduced and the tracks on both sides, simultaneously. The phases of the reproduced signals read with the three beams are necessary to synchronize. One beam sequentially reproduces the three tracks so that synchronization can also be performed to the reproduced signals. A memory is needed for performing the synchronization. Therefore, the technology described in Patent Document 1 has problems that the configuration of an optical pickup is intricate, phase synchronizing is intricate, and a circuit scale increases. Furthermore, the technology described in Patent Document 1 has not referred to performance of densification in a linear density direction.

In addition, the technologies described in Patent Documents 2 and 3 each divide a region, perform constant multiplication to a partial region (weighting), and perform addition so as to cancel crosstalk. However, the both do not describe performance of countermeasures against defects before adaptive equalization, the countermeasure being similar to those in the present disclosure. In addition, an optimum configuration in a system using partial response maximum likelihood decoding processing (a partial response maximum likelihood (PRML) detection method) and performance of favorable reproduction with a division pattern varying adaptively, are not described.

The present applicant has previously proposed an "adaptive electro optical (AERO) multi-function filter" The technology can make a signal characteristic favorable in comparison to Patent Documents 1 to 3. Furthermore, a signal including disturbance such defects, as small as possible, is preferable in performing processing with an adaptive equalizer, in the technology.

Therefore, an object of the present disclosure is to provide an optical medium reproducing device and an optical medium reproducing method, capable of inhibiting the influence of disturbance such as defects, by operating signals between a plurality of regions.

Solutions to Problems

According to the present disclosure, there is provided an optical medium reproducing device configured to optically reproduce an optical medium including a plurality of tracks formed, the optical medium reproducing device including: an optical filter configured to receive an incident returned light beam from the optical medium, and to spatially and optically form a plurality of signals having different bands in a tangential direction and a radial direction; an arithmetic unit configured to operate the plurality of first signals formed by the optical filter so as to form a plurality of channels of second signals; and an electrical filter configured to individually receive the second signals, and to perform processing to the second signals so as to acquire a reproduced signal.

According to the present disclosure, there is provided an optical medium reproducing method of optically reproducing an optical medium including a plurality of tracks formed, the optical medium reproducing method including: forming a plurality of signals having different bands in a tangential direction and a radial direction, spatially and optically, from an incident returned light beam from the optical medium, by an optical filter; by an arithmetic unit, operating the plurality of first signals formed by the optical filter to form a plurality of channels of second signals; and performing processing to the second signals that have been input, by an electrical filter to acquire a reproduced signal.

Effects of the Invention

According to at least one of the embodiments, performing an operation of acquiring the difference between regions can reduce an error rate in a case where a disc having a large amount of disturbance such as defects is reproduced. Note that, the effect described here is not necessarily limited, and any of effects described in the present disclosure may be provided.

BRIEF DESCRIPTION OF DRAWINGS

FIG. 12 illustrates graphs of tap coefficients and the frequency-amplitude characteristics of electrical filters corresponding to the tap coefficients.

FIGS. 14A and 14B illustrate graphs of tap coefficients and frequency-phase characteristics, respectively.

FIGS. 16A and 16B illustrate graphs of tap coefficients and a frequency-phase characteristic.

FIGS. 18A to 18E are substantial diagrams each for describing a reproduced signal of an optical disc.

FIG. 21A illustrates graphs of the relationship between linear density and e-MLSE and FIG. 21B is a substantial diagram of a division pattern IVT4.

FIG. 22A illustrates graphs of the relationship between linear density and e-MLSE and FIG. 22B is a substantial diagram of a division pattern IVT4H.

FIG. 24 is a substantial diagram for describing a plurality of exemplary patterns of region division.

FIGS. 25A and 25B are substantial diagrams of exemplary tap coefficients.

FIGS. 30A and 30B illustrate graphs of the relationship between linear density and e-MLSE and graphs of the relationship between linear density and i-MLSE, respectively, in a case where an optimum PR class has been selected.

MODE FOR CARRYING OUT THE INVENTION

Embodiments to be described below are preferable specific examples of the present disclosure, and include technically preferable various limitations. However, the scope of the present disclosure is not limited to the embodiments as far as the effect that the present disclosure is limited, is not described in the following descriptions. An "adaptive electro optical (AERO) multi-function filter" relating to the present disclosure will be described before the embodiments of the present disclosure are described.

[Optical Disc Device]

Figure 1:
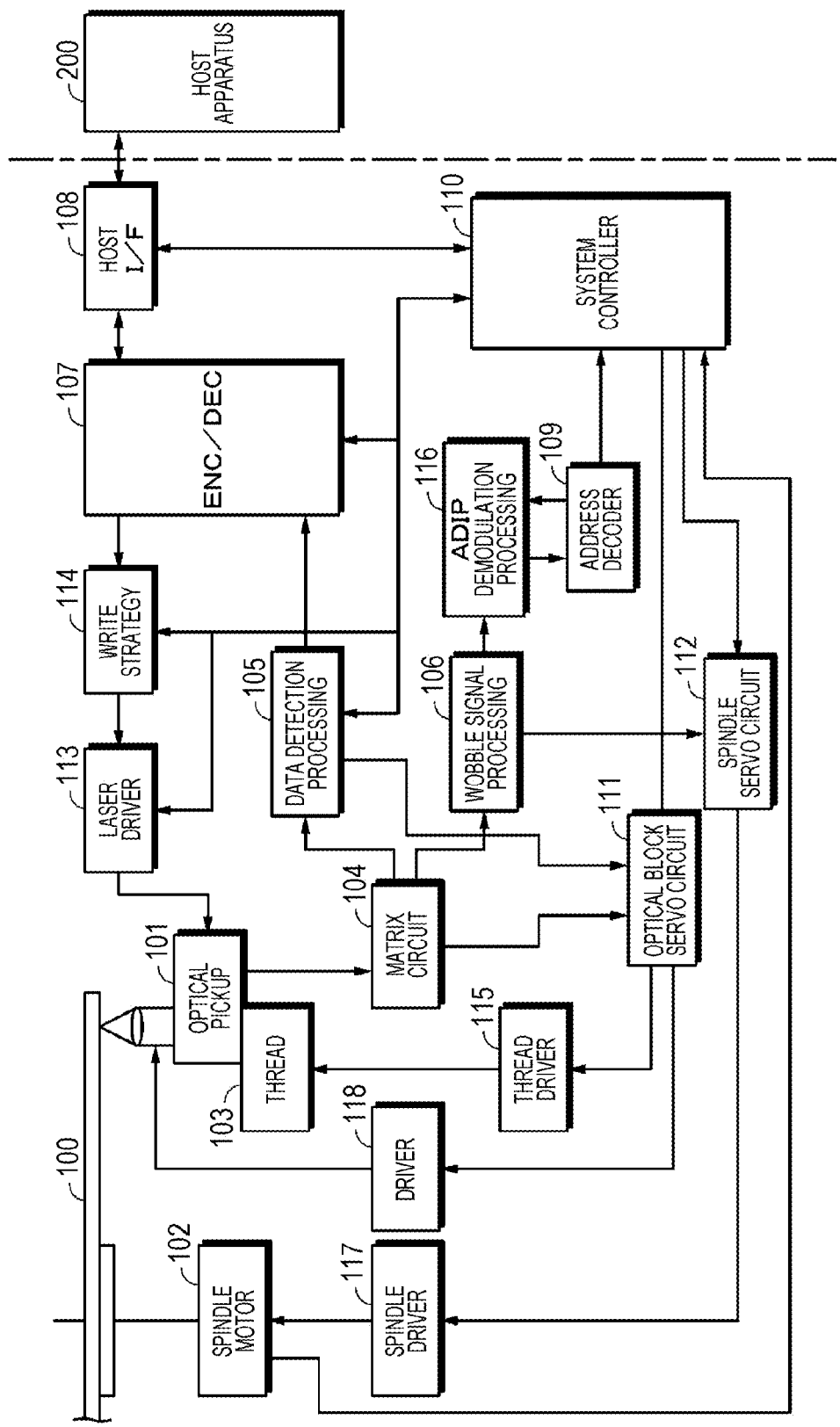
FIG. 1 is a block diagram of a configuration of an optical disc device according to one embodiment of the present disclosure.

An optical disc device to which the present disclosure can be applied, includes an optical pickup 101 that records and reproduces information with respect to an optical disc 100 as an optical medium, and a spindle motor 102 that rotates the optical disc 100, as illustrated in FIG. 1. A thread (a feed motor) 103 is provided in order to move the optical pickup 101 in a diametric direction of the optical disc 100.

A high-density optical disc, such as the Blu-ray (registered trademark) Disc (BD), can be used as the optical disc 100. The BD is a high-density optical disc having a recording capacity of approximately 25 GB with a single-sided/single-layer and a recording capacity of approximately 50 GB with a single-sided/dual-layer. A light source wavelength is 405 nm and the numerical aperture (NA) of an objective lens is 0.85 so as to be large, in order to make a beam spot diameter small, in a BD standard. A CD standard includes a light source wavelength of 780 nm, an NA of 0.45, and a spot diameter of 2.11 μm, and a DVD standard includes a light source wavelength of 650 nm, an NA of 0.6, and a spot diameter of 1.32 μm. The spot diameter can be narrowed down to 0.58 μm in the BD standard.

Furthermore, recently, the BDXL (registered trademark) that has achieved a large capacity of 100 GB with a triple layer and a large capacity of 128 GB with a quadruple layer, by shortening a channel bit length, namely, a mark length, and performing densification in a linear density direction, has been commercially practical opposite the Blu-ray (registered trademark) Disc (BD).

In addition, an optical disc that adopts a method of recording data in both a groove track and a land track (appropriately referred to as a land/groove recording method), is preferable in order to further increase recording capacity. Note that, a groove is referred to as a groove, and a track formed with the groove is referred to as a groove track. The groove is defined as a portion irradiated with a laser beam in manufacturing an optical disc, an area interposed between adjacent grooves is referred to as a land, and a track formed with the land is referred to as a land track. Furthermore, a multi-layer optical disc including a plurality of information recording layers layered, can further increase recording capacity. In order to achieve the increase of the capacity, a configuration capable of reducing crosstalk between adjacent tracks even with a shallow structure equivalent to or less than the BD, is preferable, the shallow structure including a narrow track pitch in which ±first order diffracted beams due to a groove are not superimposed, not exerting an adverse effect due to a groove structure, on other layers even with a multi-layer optical disc, similarly to the present disclosure, instead of optically reducing crosstalk between adjacent tracks by using a wide track pitch having a range in which ±first order diffracted beams due to a groove are superimposed, and deepening a groove depth down to approximately λ/6, similarly to a DVD-RAM.

The optical disc 100 capable of high-density recording, with this configuration, is inserted into the optical disc device so as to be rotationally driven with constant linear velocity (CLV) or constant angular velocity (CAV) by the spindle motor 102 in recording/reproducing. In the reproducing, the optical pickup (an optical head) 101 reads mark information recorded in a track on the optical disc 100. In data recording with respect to the optical disc 100, the optical pickup 101 records user data into a track on the optical disc 100 as a phase change mark or a pigmentary change mark.

In a case of a recordable disc, a recording mark due to a phase change mark is recorded on a track formed with a wobbling groove for a recordable disc, and the phase change mark is recorded with linear density including 0.12 μm/bit and 0.08 μm/channel bit, with, for example, an run length limited (RLL) (1, 7) parity preserve/prohibit repeated minimum transition runlength (rmtr) (PP) modulation method, for a BD having 23.3 GB per layer. Similarly, recording is performed with density corresponding to a channel bit length in response to a disc classification, for example, 0.0745 μm/channel bit for a BD having 25 GB/layer, 0.05826 μm/channel bit for a BDXL (registered trademark) having 32 GB/layer, and 0.05587 μm/channel bit for a BDXL (registered trademark) having 33.4 GB/layer. When a channel clock cycle is defined as "T", a mark length ranges from 2T to 8T. In a case of a reproduce-only disc, no groove is formed, but data modulated with the RLL (1, 7) PP modulation method has been recorded as an embossed pit string, similarly.

For example, physical information on the disc is recorded due to an embossed pit or a wobbling groove as reproduce-only management information, for example, in the internal circumferential area of the optical disc 100. The optical pickup 101 also reads the information. Furthermore, the optical pickup 101 also reads ADIP information embedded as the wobbling of a groove track on the optical disc 100.

The optical pickup 101 includes, for example, a laser diode being a laser light source, an optical filter for spatially and optically separating reflected light into a plurality of signals having different bands, in a linear density direction (a tangential direction) and in a track density direction (a radial direction), a photodetector for detecting the plurality of signals separated by the optical filter, an objective lens being an output end of a laser beam, and an optical system that irradiates a disc recording surface with the laser beam through the objective lens and leads the reflected light thereof to the photodetector, inside. The objective lens is retained by a biaxial mechanism so as to be movable in a tracking direction and a focusing direction, in the optical pickup 101. The entire optical pickup 101 is movable in a disc radial direction by a thread mechanism 103. A laser driver 113 supplies a drive current to the laser diode of the optical pickup 101 so that the laser diode generates a laser.

The reflected light from the optical disc 100 is detected by the photodetector so as to be made into an electrical signal in response to the light intensity of received light so that the electrical signal is supplied to a matrix circuit 104. The matrix circuit 104 includes, for example, a current-voltage conversion circuit and a matrix arithmetic/amplifier circuit for output currents from a plurality of light-receiving elements being the photodetector, so as to generate a necessary signal with matrix arithmetic processing. In consideration of signal transmission quality, parts of the current-voltage conversion circuit and the matrix arithmetic/amplifier circuit may be formed in the photodetector elements. For example, a reproduction information signal (an RF signal) corresponding to reproduced data, a focus error signal for servo control, and a tracking error signal are generated. Furthermore, a push-pull signal is generated as a signal according to the wobbling of a groove, namely, a signal for detecting the wobbling.

The reproduction information signal output from the matrix circuit 104 is supplied to a data detection processing unit 105, the focus error signal and the tracking error signal are supplied to an optical block servo circuit 111, and the push-pull signal is supplied to a wobble signal processing circuit 106.

The data detection processing unit 105 performs binarization processing of the reproduction information signal. For example, the data detection processing unit 105 performs, for example, A/D conversion processing of an RF signal, reproduction clock generation processing with a PLL, partial response (PR) equalization processing, and Viterbi decoding (maximum-likelihood decoding) so that a binarized data string is acquired with partial response maximum likelihood decoding processing (a partial response maximum likelihood (PRML) detection method). The data detection processing unit 105 supplies the binarized data string being information read from the optical disc 100, to an encoding/decoding unit 107 being a subsequent stage.

The encoding/decoding unit 107 performs demodulation processing to reproduced data in the reproducing and modulation processing to recorded data in the recording. That is, for example, data demodulation, deinterleave, ECC decoding, and address decoding are performed in the reproducing, and, for example, ECC encoding, interleave, and data modulation are performed in the recording.

The binarized data string decoded by the data detection processing unit 105 is supplied to the encoding/decoding unit 107, in the reproducing. The encoding/decoding unit 107 performs the demodulation processing to the binarized data string so as to acquire the reproduced data from the optical disc 100. That is, demodulation processing is performed to data to which run length limited code modulation, such as RLL (1, 7) PP modulation, has been performed, recorded in the optical disc 100 and ECC decoding processing of performing error correction is performed so that the reproduced data is acquired from the optical disc 100.

The data that has been decoded to be the reproduced data by the encoding/decoding unit 107, is transferred to a host interface 108 so as to be transferred to a host apparatus 200 on the basis of an instruction from a system controller 110. Examples of the host apparatus 200 include a computer device and an audio-visual (AV) system apparatus.

Processing of the ADIP information is performed in the recording/reproducing to the optical disc 100. That is, the push-pull signal output from the matrix circuit 104 as a signal according to the wobbling of the groove, is made to be digitized wobble data in the wobble signal processing circuit 106. PLL processing generates a clock in synchronization with the push-pull signal. The wobble data is demodulated into a data stream included in an ADIP address, by an ADIP demodulation processing unit 116, so as to be supplied to an address decoder 109. The address decoder 109 performs decoding to the data that has been supplied, so as to acquire an address value, and then supplies the address value to the system controller 110.

In the recording, the host apparatus 200 transfers the recorded data, and the recorded data is supplied to the encoding/decoding unit 107 through the host interface 108. The encoding/decoding unit 107 performs, for example, error correction code addition (the ECC encoding) and addition of the interleave and subcode as encoding processing to the recorded data. Run length limited code modulation, such as the RLL (1,7) PP method, is performed to the data to which the pieces of processing have been performed.

The recorded data processed by the encoding/decoding unit 107 is supplied to a write strategy unit 114. The write strategy unit 114 performs laser drive pulse waveform adjustment to, for example, the characteristic of a recording layer, the spot shape of the laser beam, and recording linear velocity, as record compensation processing. Then, a laser drive pulse is output to the laser driver 113.

The laser driver 113 flows a current into the laser diode in the optical pickup 101 so as to perform laser emission, on the basis of the laser drive pulse to which the record compensation processing has been performed. With this arrangement, a mark corresponding to the recorded data is formed in the optical disc 100.

The optical block servo circuit 111 generates various servo drive signals of focus, tracking, and thread from the focus error signal and the tracking error signal from the matrix circuit 104, so as to perform a servo operation. That is, a focus drive signal and a tracking drive signal are generated in response to the focus error signal and the tracking error signal so that a driver 118 drives a focus coil and a tracking coil in the biaxial mechanism in the optical pickup 101. With this arrangement, the optical pickup 101, the matrix circuit 104, the optical block servo circuit 111, the driver 118, and a tracking servo loop and a focus servo loop due to the biaxial mechanism, are formed.

Furthermore, the optical block servo circuit 111 turns the tracking servo loop off and outputs a jump drive signal in response to a track jump command from the system controller 110, so as to perform a track jump operation. Furthermore, the optical block servo circuit 111 generates a thread drive signal on the basis of a thread error signal acquired as a low-frequency component of the tracking error signal and access performance control from the system controller 110 so that a thread driver 115 drives the thread mechanism 103.

A spindle servo circuit 112 controls the spindle motor 102 to perform CLV rotation or CAV rotation. The spindle servo circuit 112 acquires the clock generated with the PLL with respect to a wobble signal, as current rotation speed information on the spindle motor 102, and compares the rotation speed information with predetermined reference speed information, so as to generate a spindle error signal. Furthermore, since a reproduction clock generated with the PLL in the data detection processing unit 105 is the current rotation speed information on the spindle motor 102 in the data reproducing, the rotation speed information is compared with the predetermined reference speed information so that a spindle error signal is generated. Then, the spindle servo circuit 112 outputs a spindle drive signal generated in response to the spindle error signal so that a spindle driver 117 performs the CLV rotation or the CAV rotation of the spindle motor 102.

The spindle servo circuit 112 generates a spindle drive signal in response to a spindle kick/brake control signal from the system controller 110 so that operations, such as startup, stop, acceleration, and deacceleration of the spindle motor 102, are also performed.

The system controller 110 formed with a microcomputer, controls the various operations in the servo system and the recording/reproducing system described above. The system controller 110 performs a variety of processing in response to a command given from the host apparatus 200 through the host interface 108. For example, when the host apparatus 200 outputs a write command, the system controller 110 first moves the optical pickup 101 to an address to be written. Then, the encoding/decoding unit 107 performs the encoding processing to data transferred from the host apparatus 200 (e.g., video data or audio data) as described above. Then, the laser driver 113 drives the laser emission in response to the data that has been encoded, so that recording is performed.

Furthermore, in a case where, for example, the host apparatus 200 has supplied a read command for requesting a transfer of a piece of data recorded in the optical disc 100, the system controller 110 first performs seek operation control for the address that has been instructed. That is, an access operation of the optical pickup 101 having, as a target, the address specified with a seek command by giving a command to the optical block servo circuit 111, is performed. After that, operation control necessary for transferring data in a data segment that has been instructed, to the host apparatus 200, is performed. That is, the data is read from the optical disc 100 and reproduction processing is performed in the data detection processing unit 105 and the encoding/decoding unit 107 so that the data that has been requested is transferred.

Note that, the optical disc device coupled to the host apparatus 200, has been described in the example of FIG. 1, but a mode in which an optical disc device is not coupled to a different apparatus, may be provided. In that case, an operation unit and a display unit are provided, and the configuration of an interface unit for data input/output is different from that of FIG. 1. That is, recording and reproducing are at least performed in response to an operation of a user, and additionally a terminal unit for inputting and outputting a variety of data is at least formed. Needless to say, examples of the configuration of the optical disc device include different various types.

[Optical Pickup]

Next, the optical pickup 101 used in the optical disc device described above, will be described with FIG. 2. The optical pickup 101 records information onto the optical disc 100 and reproduces the information from the optical disc 100 with, for example, a laser beam having a wavelength λ of 405 nm. A semiconductor laser (a laser diode (LD)) 1 emits the laser beam.

The laser beam passes through a collimator lens 2, a polarizing beam splitter (PBS) 3, and an objective lens 4 so as to be irradiated onto the optical disc 100. The polarizing beam splitter 3 includes a separation plane that transmits P polarization substantially 100% and reflects S polarization substantially 100%, for example. Reflected light from a recording layer of the optical disc 100 returns back through the same optical path and then is incident on the polarizing beam splitter 3. A λ/4 element not illustrated is interposed so that the laser beam that has been incident is reflected substantially 100% from the polarizing beam splitter 3.

An optical filter 7 spatially and optically divides the laser beam reflected from the polarizing beam splitter 3 into a plurality of regions including signals having different bands, in a linear density direction and a track density direction with parting lines extending in a radial direction (a disc radial direction) and a tangential direction (a track direction) of the optical disc 100, so that beams that have been divided are condensed onto the light-receiving surface of a photodetector 6 through a lens 5. For example, the region of the optical filter 7 has been divided, similarly to a pattern IVT4 to be described later (refer to FIG. 8A). The photodetector 6 includes light-receiving cells that photoelectrically convert the beams that have been incident, on the light-receiving surface. The light-receiving cells are individually arranged so as to receive the beams divided into the plurality of regions by the optical filter 7. The photodetector 6 outputs a plurality of channels of electrical signals in response to the light-received intensities in the regions of the light-receiving cells.

As one example, the optical filter 7 spatially and optically divides a light flux into four regions including signals having different bands, in the linear density direction and the track density direction. The signals in the four regions are individually indicated with A, C, E, and F. Note that, the indications of the regions and reproduced signals acquired from the regions are denoted with the same reference signs. The matrix circuit 104 operates light-received signals so as to generate four channels of signals Ch1 to Ch4 so that the four channels of signals Ch1 to Ch4 are input to the data detection processing unit 105.

Figure 2:
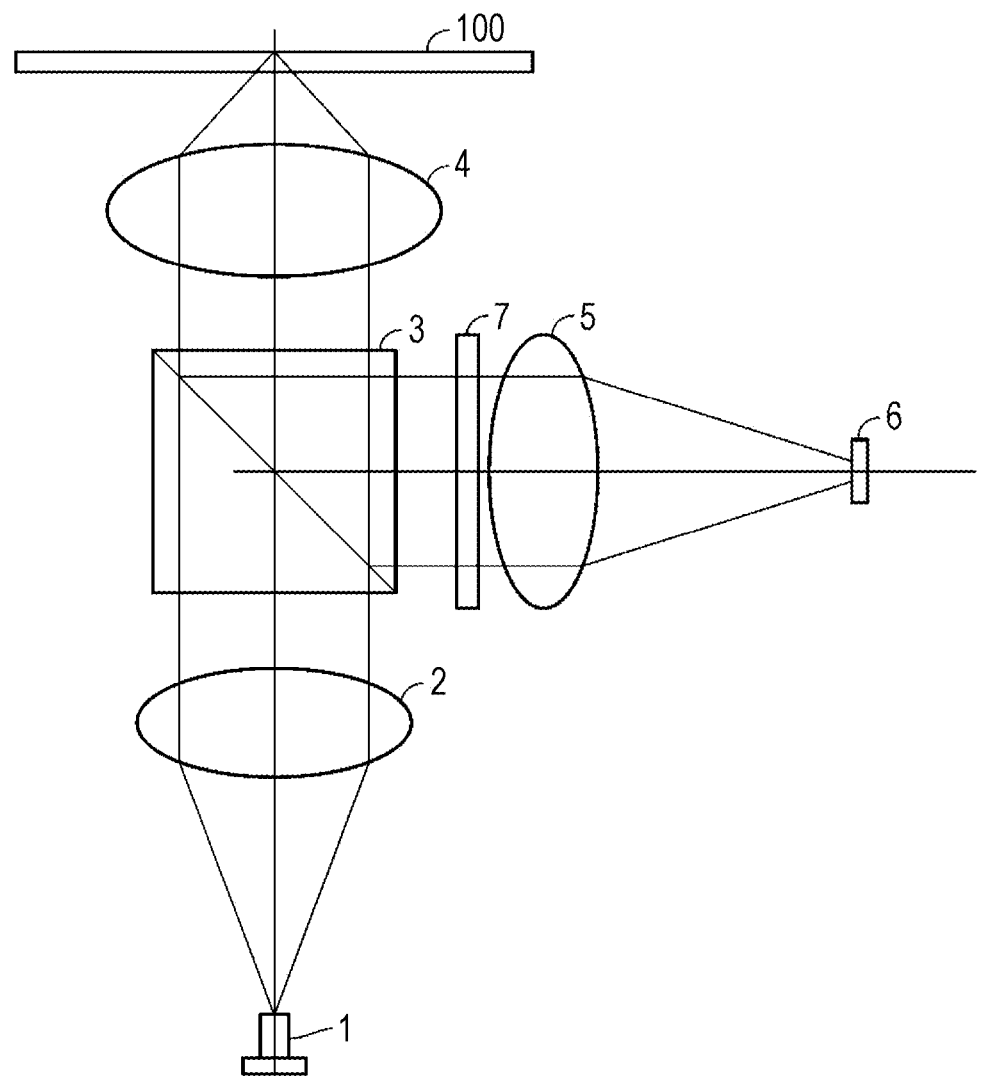
FIG. 2 is a substantial diagram of a configuration of an optical pickup according to one embodiment of the present disclosure.

Note that, the configuration of the optical pickup 101 of FIG. 2 indicates the minimum constituent elements for describing the present disclosure, and omits, for example, signals for generating the focus error signal and the tracking error signal output to the optical block servo circuit 111 through the matrix circuit 104 and the push-pull signal output to the wobble signal processing circuit 106 through the matrix circuit 104. Different various configurations may be provided other than the configuration illustrated in FIG. 2.

According to the present disclosure, the section of the light flux of a returned beam from the optical disc 100, is divided into a plurality of regions so that a plurality of channels of reproduced signals corresponding to the respective regions, is required. Examples of a method of acquiring a reproduction information signal for each region, which can be used, include a method of providing the function of an optical filter to a photodetector by dividing the photodetector 6, in addition to the method of performing division with the optical filter 7. In dividing with the optical filter 7, for example, a method of supplying, to different photodetectors, a plurality of beams separated with an optical path conversion element for separating the plurality of regions, the optical path conversion element being arranged in the optical path that passes through the objective lens 4 and reaches the photodetector 6, can be used. Examples of the optical path conversion element that can be used, include a diffraction element, such as a holographic optical element, and a refraction element, such as a microlens array or a microprism.

[Data Detection Processing Unit]

Figure 3:
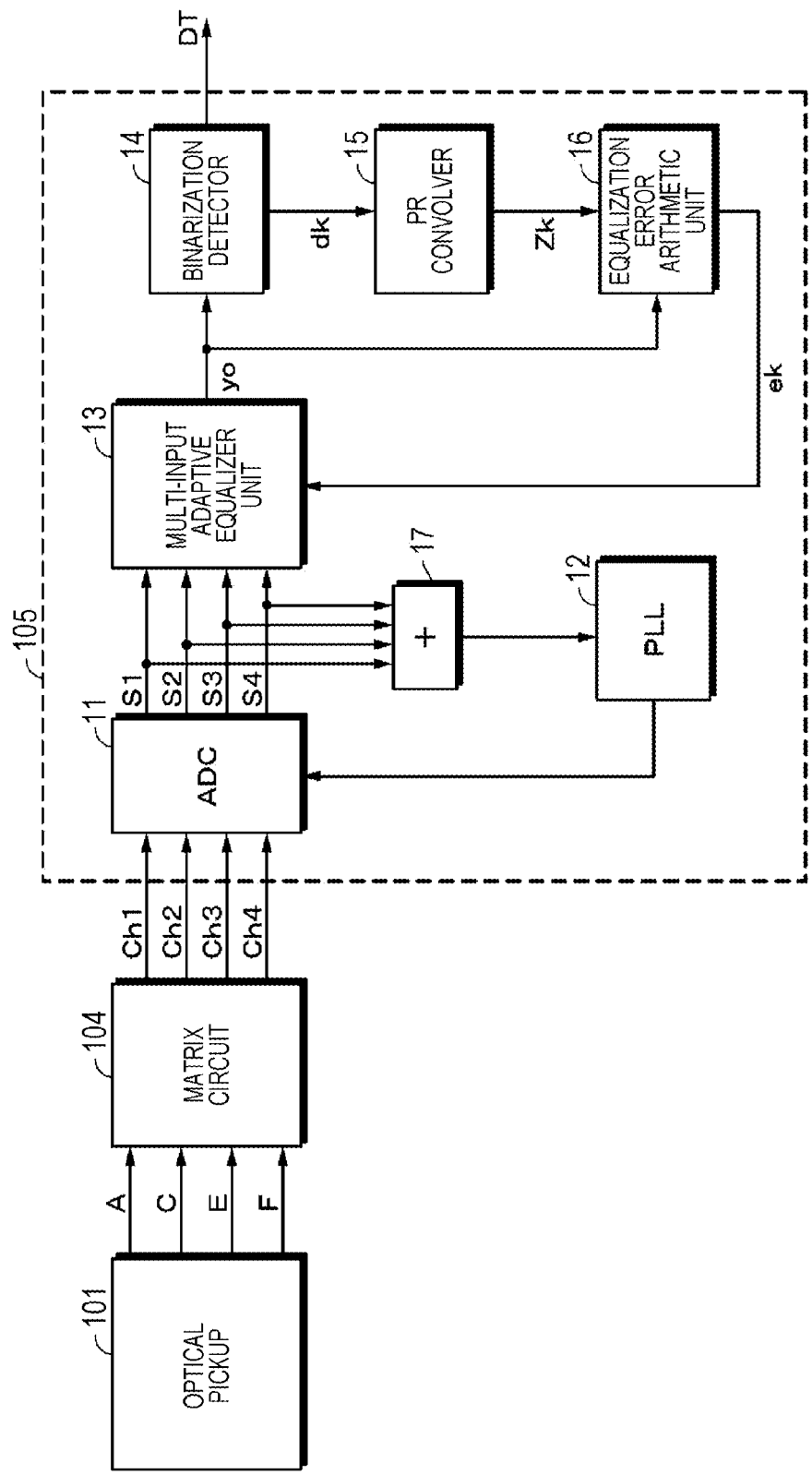
FIG. 3 is a block diagram of an exemplary data detection processing unit according to one embodiment.

As described above, detected signals corresponding to the respective regions, reproduced from the optical disc 100 by the optical pickup 101, are supplied to the matrix circuit 104 so as to be a plurality of channels of signals having a number equivalent to the number of the signals before the operation. The data detection processing unit 105 includes an A/D converter 11 supplied with the reproduction information signals supplied from the matrix circuit 104, as illustrated in FIG. 3. Note that, FIGS. 3 and 4 exemplarily illustrate that the section of the light flux of the returned beam from the optical disc 100 is divided into four regions and the four channels of reproduced signals Ch1 to Ch4 are acquired from the matrix circuit 104.

The PLL 12 forms the clock to the A/D converter 11. The A/D converter 11 converts the reproduced signals supplied from the matrix circuit 104, into digital data. Reproduction information signals including the four channels of reproduced signals Ch1 to Ch4 generated by the matrix circuit 104, digitized, are indicated with S1 to S4. A signal including the reproduction information signals S1 to S4 added together by an addition circuit 17, is supplied to the PLL 12.

Furthermore, the data detection processing unit 105 includes a multi-input adaptive equalizer unit 13, a binarization detector 14, a PR convolver 15, and an equalization error arithmetic unit 16. The multi-input adaptive equalizer unit 13 performs PR adaptive equalization processing on the basis of the reproduction information signals S1 to S4. That is, an equalized signal y0 including the reproduction information signals S1 to S4 output through adaptive equalizer units, added together, is equalized so as to be approximated to a PR waveform being a target.

Note that, the output of the multi-input adaptive equalizer unit may be used as a signal to be input to the PLL 12. In this case, the initial coefficient of the multi-input adaptive equalizer is previously set to be a predetermined value. In addition, even in a case where the signal from the addition circuit 17 is used, a configuration of performing addition after the phase-frequency characteristics and the amplitude-frequency characteristics of the reproduction information signals S1 to S4 are varied with, for example, an FIR filter, may be provided, instead of simply adding the reproduction information signals S1 to S4 together. In that case, the tap coefficient of the FIR filter is previously set to be a predetermined value.

The binarization detector 14 is, for example, a Viterbi decoder, and performs the maximum likelihood decoding processing to the equalized signal y0 to which the PR equalization has been performed, so as to acquire binarized data DT. The binarized data DT is supplied to the encoding/decoding unit 107 illustrated in FIG. 1 so that reproduced data demodulation processing is performed to the binarized data. A Viterbi detector including a plurality of states including, as a unit, a consecutive bit having a predetermined length, and branches indicated with transitions between the states, is used for the Viterbi decoding, and is configured to effectively detect a desired bit sequence from all available bit sequences.

Two registers including a register referred to as a path metric register, which stores the path metric of a partial response sequence and a signal until each state, and a register referred to as a path memory register, which stores the stream of the bit sequence until each state, are provided to each state in a practical circuit. Furthermore, an arithmetic unit referred to as a branch metric unit, which calculates the path metric of the partial response sequence and the signal in the bit of each branch, is provided to each branch.

The Viterbi decoder is capable of associating various bit sequences in pairs with one of paths passing through each state. In addition, an inter-state transition included in each of the paths, namely, the branch metric of each branch is sequentially added so that the path metric between the partial response sequence passing through the paths and the actual signal (a reproduced signal) is acquired.

Furthermore, sequentially selecting a path having a small path metric with the sizes of path metrics included in two branches or less arriving at each state, being compared, can achieve the selection of a path for minimizing the path metric. The selection information is transferred to the path memory register so that information indicating a path arriving at each state with a bit sequence is stored. The value of the path memory register is sequentially updated and finally converges to a bit sequence with which the path metric is minimized so that the result thereof is output.

As indicated with the following expression, the PR convolver 15 performs convolution processing to a binarized result so as to generate a target signal Zk. The target signal Zk includes the binarized detected result convolved, and thus is an ideal signal including no noise. For example, the value P for each channel clock is (1, 2, 2, 2, 1) in a case of PR(1, 2, 2, 2, 1). The constraint length is 5. Furthermore, the value P for each channel clock is (1, 2, 3, 3, 3, 2, 1) in a case of PR(1, 2, 3, 3, 3, 2, 1). The constraint length is 7. Furthermore, the value P for each channel clock is (1, 2, 3, 4, 4, 4, 3, 2, 1) in a case of PR(1, 2, 3, 4, 4, 4, 3, 2, 1). The constraint length is 9. The detection is difficult to perform without detectivity increased by lengthening the constraint length of the partial response from 5 to 7 in a case where recording density is made to be high so that the capacity approximately exceeds 35 GB when the track pitch is constantly 0.32 μm with the laser beam having a wavelength λ of 405 nm and the objective lens having an NA of 0.85, and furthermore the detectivity is needed to be high by lengthening the constraint length from 7 to 9 in a case where the recording density is made to be high so that the capacity approximately exceeds the neighborhood of 45 GB. Note that, d denotes binarized data in the following expression.

[Mathematical Formula 1]

$$Z_n = \sum_m P_m D_{n-m} \quad (1)$$

$P = (1, 2, 3, 3, 3, 2, 1)$
$P = (1, 2, 2, 2, 1)$
$P = (1, 2, 3, 4, 4, 4, 3, 2, 1)$

Figure 6:
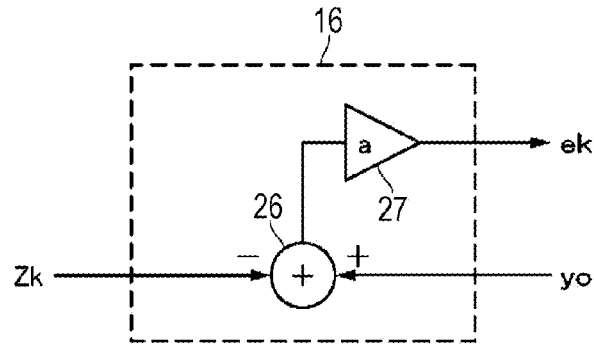
FIG. 6 is a block diagram of an exemplary equalization error arithmetic unit.

The equalization error arithmetic unit 16 acquires an equalization error ek with the equalized signal y0 from the multi-input adaptive equalizer unit 13 and the target signal Zk, so as to supply the equalization error ek to the multi-input adaptive equalizer unit 13 for tap coefficient control. As illustrated in FIG. 6, the equalization error arithmetic unit 16 includes a subtractor 26 and a coefficient multiplier 27. The subtractor 26 subtracts the target signal Zk from the equalized signal y0. The coefficient multiplier 27 multiplies a result of the subtraction by a predetermined coefficient a so as to generate the equalization error ek.

Figure 4:
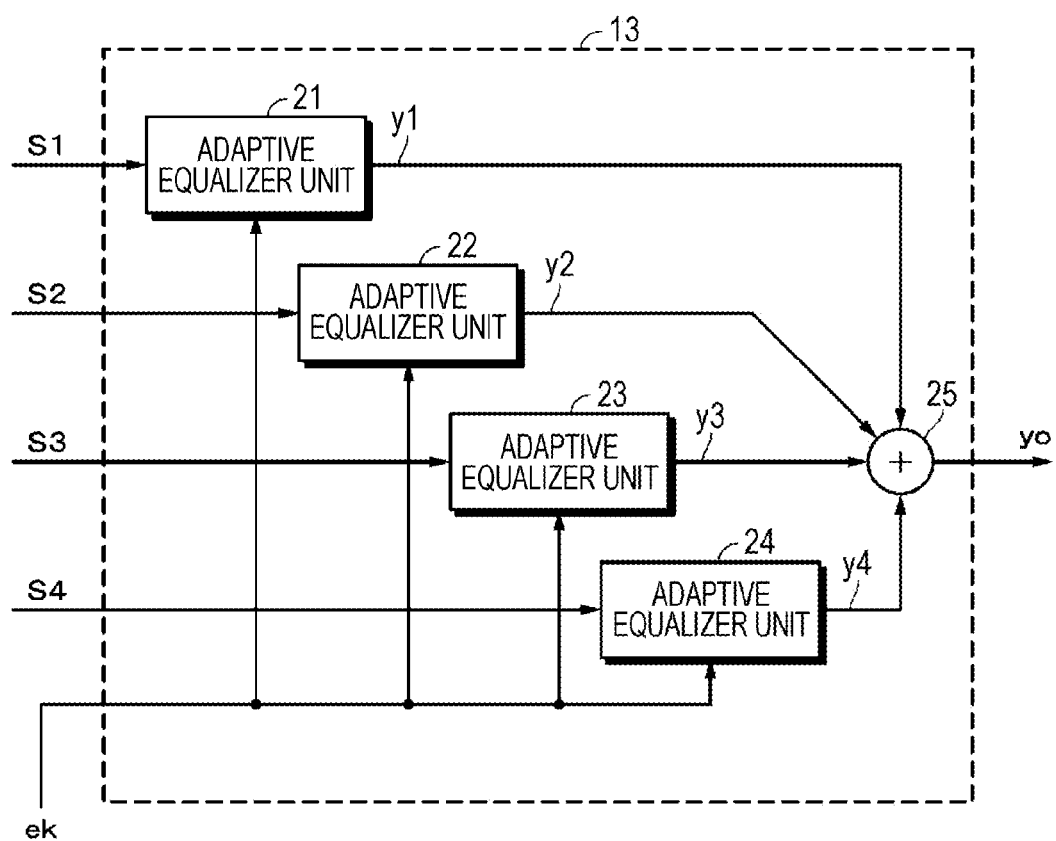
FIG. 4 is a block diagram of an exemplary multi-input adaptive equalizer in the data detection processing unit.

The multi-input adaptive equalizer unit 13 includes the adaptive equalizer units 21, 22, 23, and 24, and an adder 25 as illustrated in FIG. 4. The reproduction information signals S1 to S4 described above are input into the adaptive equalizer units 21 to 24, respectively. A configuration of the multi-input adaptive equalizer unit 13 is illustrated in a case where the reproduction information signals output from the matrix circuit include four channels. The adaptive equalizer units are provided in response to the number of channels of signals to be input.

The adaptive equalizer units 21, 22, 23, and 24 each include the parameters of a finite impulse response (FIR) filter tap number, the operation accuracy thereof (bit resolution), and the update gain of an adaptive operation, and each includes the optimum values set. The equalization error ek is supplied to each of the adaptive equalizer units 21, 22, 23, and 24 as a coefficient control value for adaptive control.

Outputs y1, y2, y3, and y4 of the adaptive equalizer units 21, 22, 23, and 24 are added together by the adder 25 so as to be output as the equalized signal y0 of the multi-input adaptive equalizer unit 13. The output target of the multi-input adaptive equalizer unit 13 is an ideal PR waveform including the binarized detected result convolved into the partial response (PR).

Figure 5:
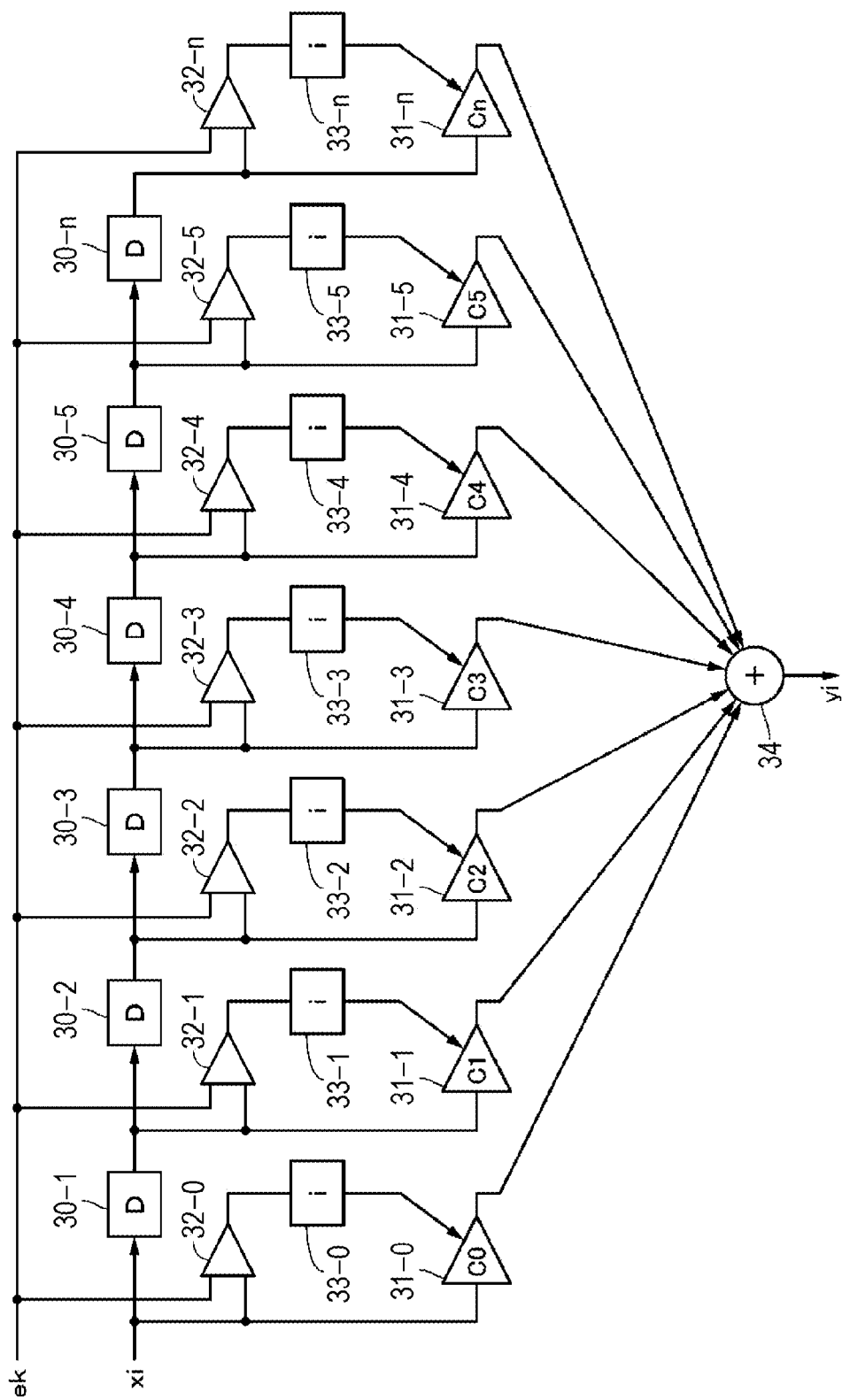
FIG. 5 is a block diagram of an exemplary adaptive equalizer unit.

The adaptive equalizer unit 21 includes, for example, an FIR filter as illustrated in FIG. 5. The adaptive equalizer unit 21 is a filer including an n+1 staged tap including delay elements 30-1 to 30-$n$, coefficient multipliers 31-0 to 31-$n$, and an adder 34. The coefficient multipliers 31-0 to 31-$n$ multiply an input x by tap coefficients C0 to Cn at points in time, respectively. The outputs of the coefficient multipliers 31-0 to 31-$n$ are added together by the adder 34 so as to be extracted as the output y0. The tap coefficients are previously set to be an initial value.

The tap coefficients C0 to Cn are controlled in order to perform adaptive equalization processing. Accordingly, arithmetic units 32-0 to 32-$n$ each that receive and operate the equalization error ek and a tap input, are provided. Integrators 33-0 to 33-$n$ that integrate the outputs of the arithmetic units 32-0 to 32-$n$, respectively, are provided. The arithmetic unit 32-0 to 32-$n$ each perform the operation of −1*ek*x. The integrators 33-0 to 33-η integrate the outputs of the arithmetic units 32-0 to 32-$n$, respectively, and the tap coefficients C0 to Cn of the coefficient multipliers 31-0 to 31-$n$ are varyingly controlled on the basis of the integrated results. Note that, the integrators 33-0 to 33-*n* each perform the integration in order to adjust the responsiveness of adaptive coefficient control.

The data detection processing unit 105 having the configuration, performs the encoding of the binarized data after performing reduction of an unnecessary signal, such as crosstalk.

The adaptive equalizer units 22, 23, and 24 each have a configuration similar to that of the adaptive equalizer unit 21. The common equalization error ek is supplied to the adaptive equalizer units 21, 22, 23, and 24 so that adaptive equalization is performed. That is, the adaptive equalizer units 21, 22, 23, and 24 optimize errors of the input signal frequency components and the phase distortions of the reproduction information signals Sa, Sb, and Sc, namely, perform adaptive PR equalization. That is, the tap coefficients C0 to Cn are adjusted in response to the operation results of −1*ek*x with the arithmetic unit 32-0 to 32-*n*, respectively. This means that the tap coefficients C0 to Cn are adjusted in a direction in which the equalization error is canceled.

In this manner, the adaptive equalizer units 21, 22, 23, and 24 adaptively control the tap coefficients C0 to Cn with the equalization error ek in a direction in which a target frequency characteristic is made. The equalized signal y0 of the multi-input adaptive equalizer unit 13, acquired by adding the outputs y1, y2, y3, and y4 of the adaptive equalizer units 21, 22, 23, and 24 with the adder 25, is a signal including, for example, crosstalk and inter-code interference reduced.

[Electro-Optical Filter]

A signal reproduced from an optical disc, has deviated from an ideal signal by an increase of inter-code interference due to densification in a linear direction as well as an increase of leakage of a signal from an adjacent track due to densification in a track direction with respect to the ideal signal. Conventionally, an electrical filter has solved the problem. For example, the BDXL (registered trademark) has achieved 33.4 GB/L.

Figure 7:
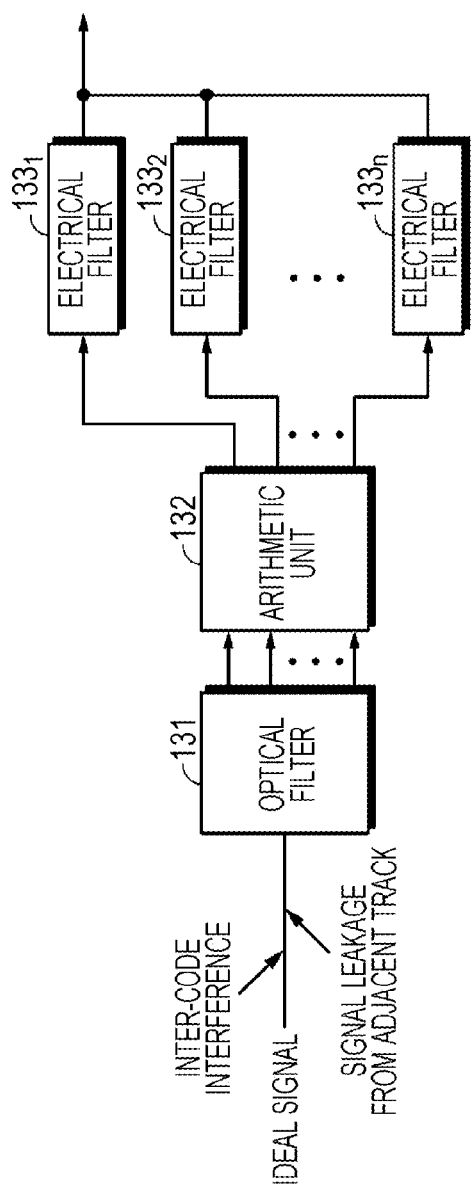
FIG. 7 is a block diagram of an exemplary configuration for performing reproducing.

FIG. 7 illustrates a configuration of reproducing a signal recorded with high density, according to the present disclosure. That is, a reproduced signal is supplied to an optical filter 131, and the optical filter 131 spatially and optically separates the reproduced signal into, for example, n units of first signals x11, x12 to x1n having different bands in the linear density direction (the tangential direction) and the track density direction (the radial direction). The n units of first signals x11, x12 to x1n that have been separated, are supplied to an arithmetic unit 132. The arithmetic unit 132 operates the first signals x11, x12 to x1n so as to form n units of second signals x21, x22 to x2n. The second signals x21, x22 to x2n are supplied to electrical filters $133_1$ to $133_n$. The outputs of the electrical filters $133_1$ to $133_n$ are added together so that the reproduced signal is acquired. The following can be considered as the operation.

[Mathematical Formula 2]

$$\begin{pmatrix} x21 \\ x22 \\ \vdots \\ x2n \end{pmatrix} = \begin{pmatrix} a11 & a12 & \cdots & a1n \\ a21 & a22 & \cdots & a2n \\ \vdots & \vdots & & \vdots \\ an1 & an2 & \cdots & ann \end{pmatrix} \times \begin{pmatrix} x11 \\ x12 \\ \vdots \\ x1n \end{pmatrix} \quad (2)$$

The light flux of the optical beam reflected from the optical disc 100 is received and then the optical filter 7 spatially and optically divides the light flux into the plurality of regions having the different bands in the linear density direction and the track density direction with the parting lines extending in the radial direction and the tangential direction. A plurality of channels of reproduction information signals is formed with a plurality of light-received signals in response to light intensities incident on the plurality of regions, so as to be supplied to the electrical filters. The adaptive equalizer units described above each correspond to an electrical filter. After individual light-receiving elements receive the signal beams that have been regionally divided, the matrix circuit 104 operates the signal beams so as to act as a partial function of an optical filter.

[Exemplary Patterns of Region Division]

First, exemplary patterns of region division in the present specification, will be described with reference to FIGS. 8A to 8G. Note that, a circle denotes the outer circumference of a section of a beam light flux in the diagrams. A square indicates the area of an optical filter or the area of light-receiving cells of a photodetector for detection, the optical filter being a diffraction element, such as a holographic optical element, or an optical path conversion element including a refraction element, such as a microlens array or a microprism, for separating a plurality of regions. Note that, an upper and lower direction and a left and right direction of the region division diagrams correspond to a tangential direction and a radial direction of a returned light flux, respectively. Furthermore, the region division patterns illustrated in FIGS. 8A to 8G are exemplary, and thus patterns other than the patterns illustrated in FIGS. 8A to 8G are also available. For example, a parting line is not limited to a straight line, and may be a curve, such as an arc.

(Pattern IVT4)

A pattern IVT4 illustrated in FIG. 8A is an example of including four regions. That is, a beam is divided into a region A(=A1+A2) outside in the radial direction, a region C of a center portion, and a region E(E1+E2+E3) of an upper portion and a region F(F1+F2+F3) of a lower portion in the tangential direction. A detected signal corresponding to each region is acquired. Here, region division positions in the radial direction are positioned so as to be ±0.5 and ±0.7 when a pupillary radius is 1.0. Region division positions in the tangential direction are positioned so as to be ±0.45 and ±0.65 when the pupillary radius is 1.0.

Four channels of signals corresponding to the division pattern IVT4, may be generated on the basis of outputs from four light-receiving cells corresponding to the regions A, C, E, and F, or the four channels of signals may be generated with a matrix circuit on the basis of outputs of five light-receiving cells corresponding to five regions of the regions A1, A2, C, E, and F. In a case where the four channels are generated from the five signals with the matrix circuit in the second, the following various division patterns can be achieved with the same division as a fundamental form.

IVT4: Ch1=A1+A2, Ch2=C, Ch3=E, Ch4=F
IVR4: Ch1=E+F, Ch2=C, Ch3=A1, Ch4=A2
IVi4: Ch1=E, Ch2=C+F, Ch3=A1, Ch4=A2

(Pattern IVT4H)

A pattern illustrated in FIG. 8B includes the shape and the position of each region varied in order to improve a characteristic with higher linear density, following the optical filter configuration of the IVT4.

(Pattern IV3)

A pattern illustrated in FIG. 8C includes one channel E including the channels (E and F) outside in the IVT4 integrally formed.

(Pattern IV3ts0.2)

A pattern IV3ts0.2 illustrated in FIG. 8D includes IV3 shifted in the tangential direction, for example, shifted by 20% of a light flux radius.

(Pattern H3A)

In a pattern H3A illustrated in FIG. 8E, the beam is divided into two being a region C inside and a region A (=A1+A2) outside in the radial direction, with two parting lines extending in the tangential direction, and, furthermore, an upper portion and a lower portion of the region inside are partitioned with parting lines extending in the radial direction so that regions E1 and E2 are formed above and below in the tangential direction and the remaining center region is defined as C. That is, the pattern includes three regions divided, the three regions including the region C, the region (A1+A2), and the region E(=E1+E2). Three channels of signals corresponding to the three regions are acquired.

(Patterns R2 and R3)

Patterns R2 and R3 (refer to FIGS. 8F and 8G) are comparative patterns in order to clarify effects due to the configurations according to the present disclosure. The pattern R2 including two regions divided in the radial direction and the pattern R3 including three regions divided in the radial direction, with two parting lines extending in the tangential direction, are illustrated. In a case of the pattern R2, electrical signals corresponding to light-received signals of regions A1 and A2, are added together so as to be one channel of signal. That is, two channels (R2) being an internal channel (a region C) and an external channel (the regions A1 and A2), are formed. In a case of the pattern R3, three channels of signals are acquired, the three channels being an internal channel (a region C) and external channels (regions A and D). Here, region division positions in the radial direction are positioned so as to be ±0.55 when the pupillary radius is 1.0. In addition, a result in characteristic comparison will be described later in a case where the technologies in Patent Documents 2 and 3 and the PRML detection method have been combined, on the basis of the divisions of the patterns R2/R3 and the pattern H3A.

[Simulated Result of Each Pattern]

Figure 8:
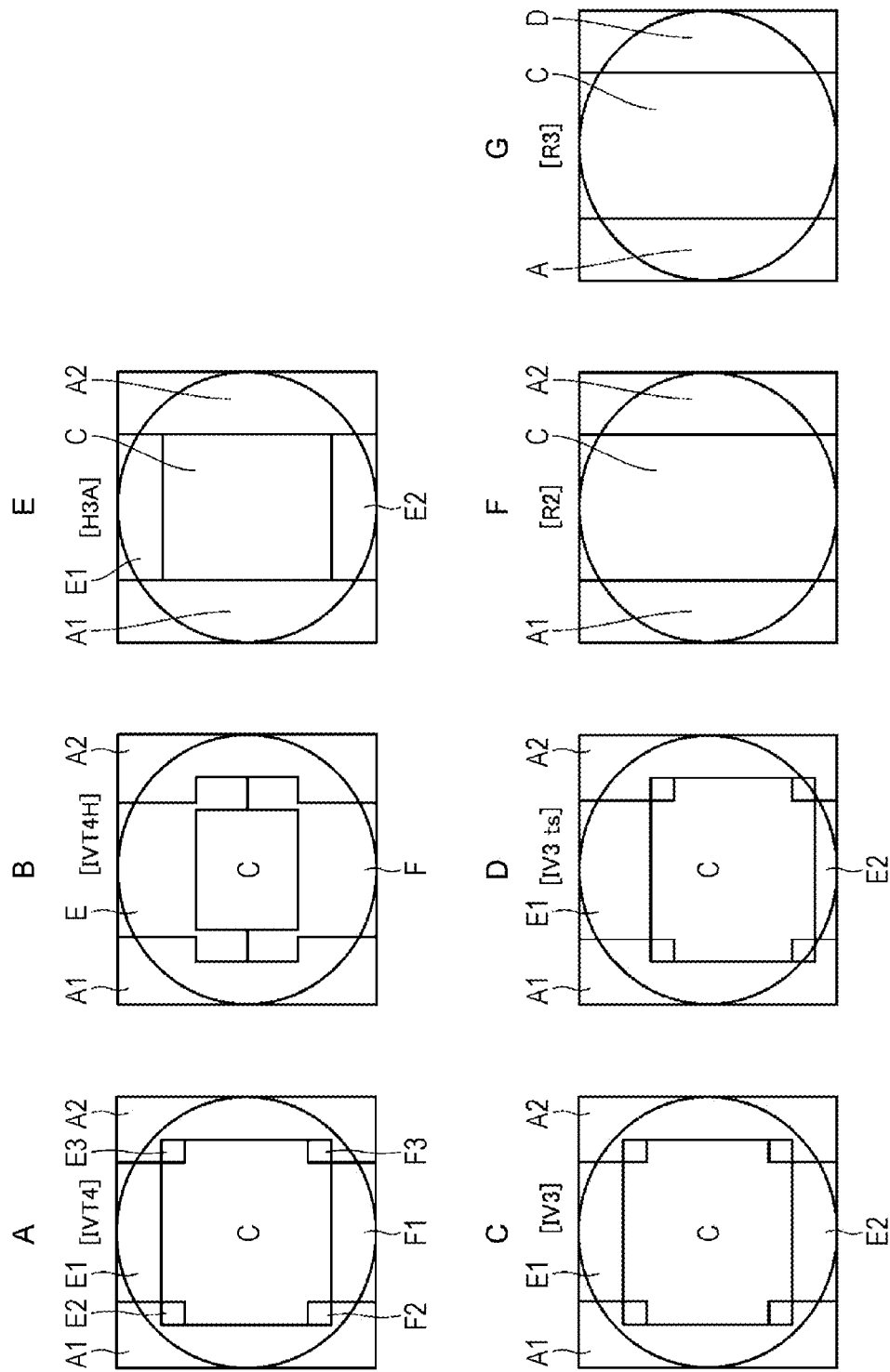
FIGS. 8A to 8G are substantial diagrams for describing a plurality of exemplary patterns of region division.
Figure 9:
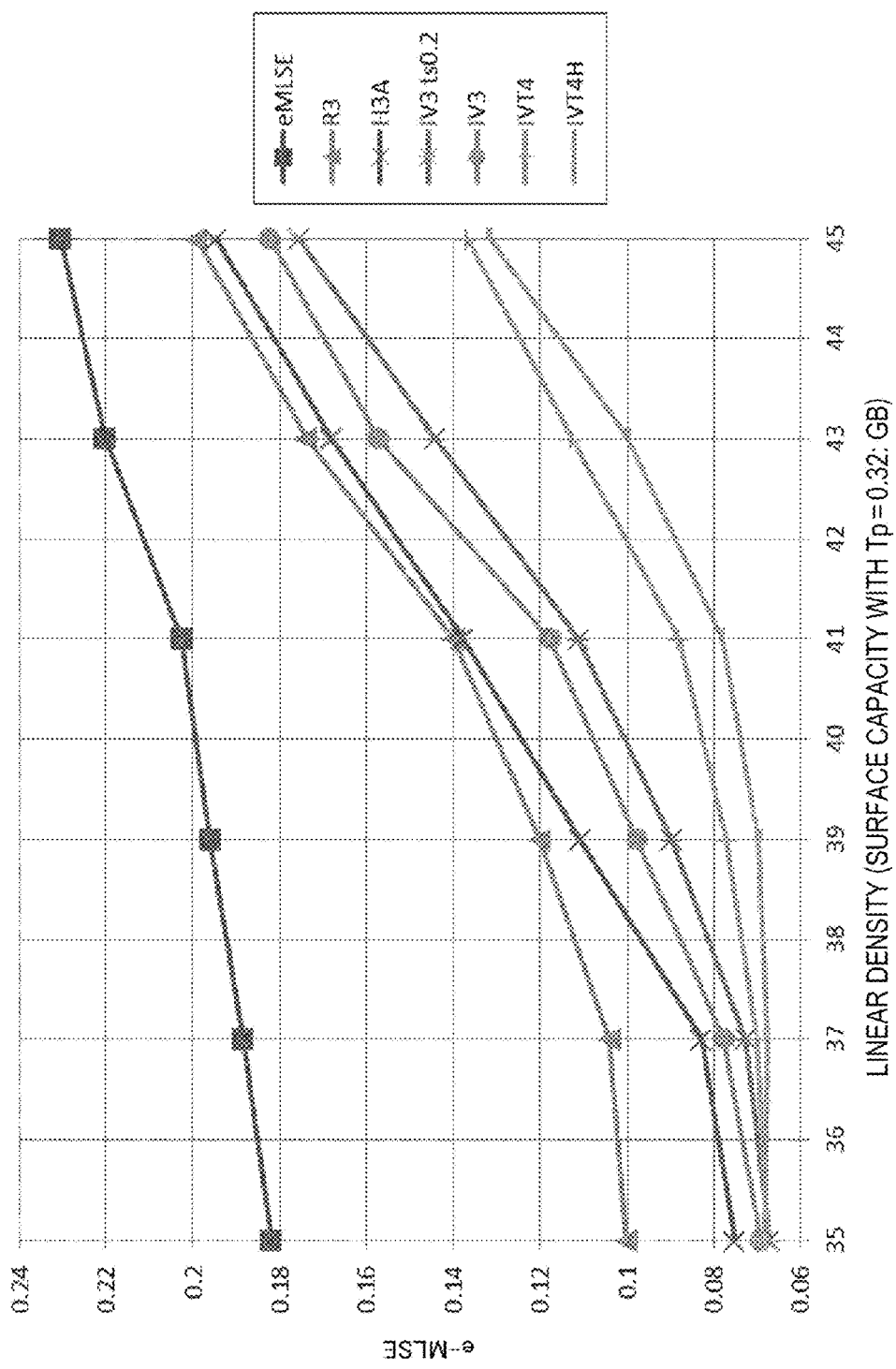
FIG. 9 illustrates graphs of the relationship between linear density and e-MLSE.

FIG. 9 illustrates simulated results of six patterns illustrated in FIG. 8. Similarly to the following simulations, e-MLSE is used as a signal index value. In a case where recording density has been made higher than that of the BDXL (registered trademark), a data pattern that easily causes an error varies. As a result, an error in i-MLSE being a conventional signal index value, is a problem. Therefore, a signal evaluation value different from the i-MLSE, including new data patterns added, is used for describing an effect, the new data patterns being necessary for accuracy improvement of the signal index value with higher linear density. A new index value including accuracy improved, is referred to as the e-MLSE.

The data patterns added in the e-MLSE are the following three types.

A bit denoted with 1 in a pattern string indicates a spot at which bit inversion occurs in an error pattern with respect to a detected pattern.

Additional pattern (1): 10111101
Additional pattern (2): 1011110111101
Additional pattern (3): 10111100111101

For example, the e-MLSE and the i-MLSE substantially agree with each other with linear density equivalent to that of the conventional BDXL (registered trademark) in which the accuracy of the i-MLSE is sufficient, and a difference by the error improvement appears with higher linear density. The both are the same in terms of the theoretical correlation of an index value to an error rate important in practice. Therefore, the evaluation values of signal qualities indicated by the both, may be treated in the same manner although there are differences in terms of operations and the range of adaptive linear density. Note that, indices other than the e-MLSE may be used in the present disclosure. A difference between the e-MLSE and the i-MLSE due to a variation in a data pattern that easily causes an error in a case where the linear density has been made to be high, will be additionally described later.

Descriptions will be given below on the basis of the simulated results to the respective patterns. Simulation conditions are as follows:

Tp=0.225 μm (for land and groove)
NA=0.85
PR(1233321)
Evaluation index: e-MLSE
Groove depth of (1/15)λ
Mark width=Tp*0.7
Disc Noise and Amp Noise existing
Tap: 31 taps at 1T intervals
Perturbation origin (e.g., defocus and skew all at the origin)

In addition, the linear density is denoted with LD (surface capacity with Tp=0.32 μm) by using surface capacity when a disc has a diameter of 120 mm and a track pitch Tp of 0.32 μm.

A graph denoted with e-MLSE in the simulated results of FIG. 9 is a result in a case where region division has not been performed. As can be seen in FIG. 9, the R3 without the configurations according to the present disclosure, has the e-MLSE insufficiently fallen at LD35 GB. For example, the R2 and the R3 have substantially equivalent characteristics at the perturbation origin. The H3A and the IV3 each have the e-MLSE reduced at LD35 GB, but have no channel having a different center position in the tangential direction so that degradation is large due to the linearly-densification. In addition, the H3A has the e-MLSE slightly higher than that of the IV3 having an optical filter shape more optimum, at LD35 GB, and the difference expands when the linear density increases.

The pattern IV3ts0.2 including the pattern IV3 shifted in the tangential direction, can make a difference between center positions in consideration of the external channel in the tangential direction and the center channel in terms of the center of gravity, so that degradation due to the linearly-densification can be slightly inhibited.

The IVT4 including the different channels having the different center positions in the tangential direction, has sufficiently reduced the e-MLSE at LD35 GB, and additionally has an linearly-densification effect corresponding to LD3 GB in the linear density direction, with respect to the IV3 including division positions in the radial and tangential directions, the same.

The IVT4H including an optical filter shape optimized in priority to a characteristic in a case where the linearly-densification has been performed, has further acquired a linearly-densification effect corresponding to LD1 GB, with respect to the IVT4.

Here, comparison is made to a characteristic in a case where the technologies in Patent Documents 2 and 3 and the PRML detection method have been combined, in addition to the configurations A to E according to the present disclosure and the comparative configurations F and G.

Figure 10:
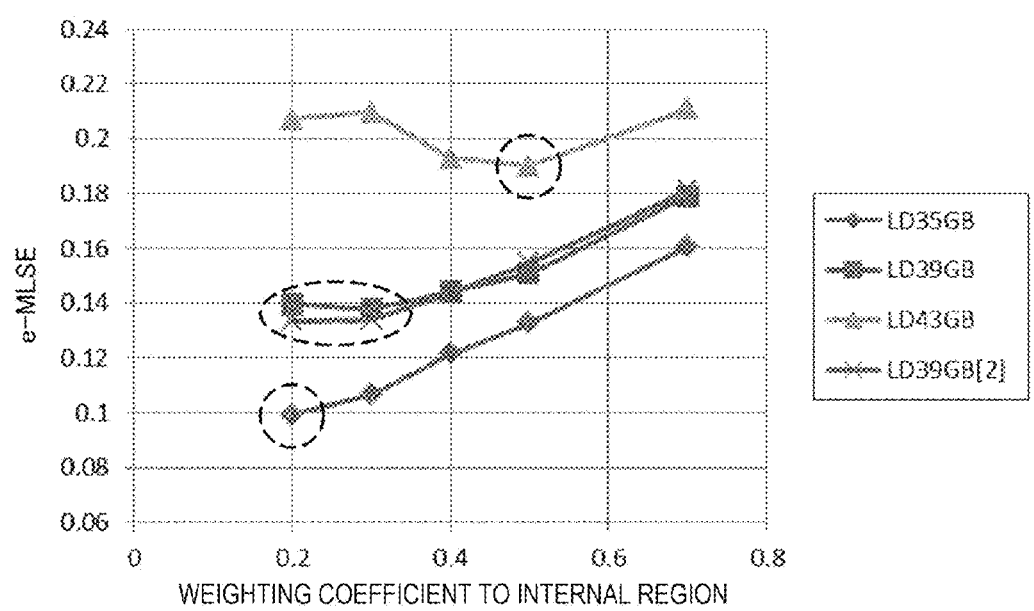
FIG. 10 illustrates graphs of the relationship between linear density and e-MLSE.

Patent Documents 2 and 3 describes a technology of canceling crosstalk by performing constant multiplication to a signal of a region inside (weighting) and performing addition to signals due to a region divided into three in a radial direction, the signals being similar to those of the comparative configurations (refer to FIGS. 8F and 8G). However, the both do not describe signal characteristic improvement in high-linear-density recording in which a shortest mark, similar to the present disclosure, exceeds the cut-off spatial frequency of an optical system. Thus, FIG. 10 illustrates results in simulation that has been performed to the signal to which the constant multiplication and the addition have been performed, with respect to LD35 GB, LD39 GB, and LD43 GB with a system including an FIR filter having 31 taps at 1T intervals and PR (1, 2, 3, 3, 2, 1), similarly to the configurations according to the present disclosure, with the assumption of a case where the combination with the PRML detection method is used. When the weighting coefficient is 0.2 with LD35 GB, the e-MLSE has improved approximately equivalent to that of the pattern R3 described above, but the improvement effect of the e-MLSE has considerably decreased with LD39 GB and the improvement effect has hardly occurred with LD43 GB.

Furthermore, Patent Document 2 has suggested that "further performing weighting in a beam propagating direction can emphasize and reproduce a reproduced signal of a small recorded mark", as an idea. A result of further dividing a center region at a position corresponding to the H3A and further performing double-weighting to the outside and the inside in the tangential direction, in a case of LD39 GB with which the e-MLSE improvement effect has decreased, is denoted with LD39 GB. However, a linearly-densification effect that has been suggested, has hardly occurred.

Figure 11:
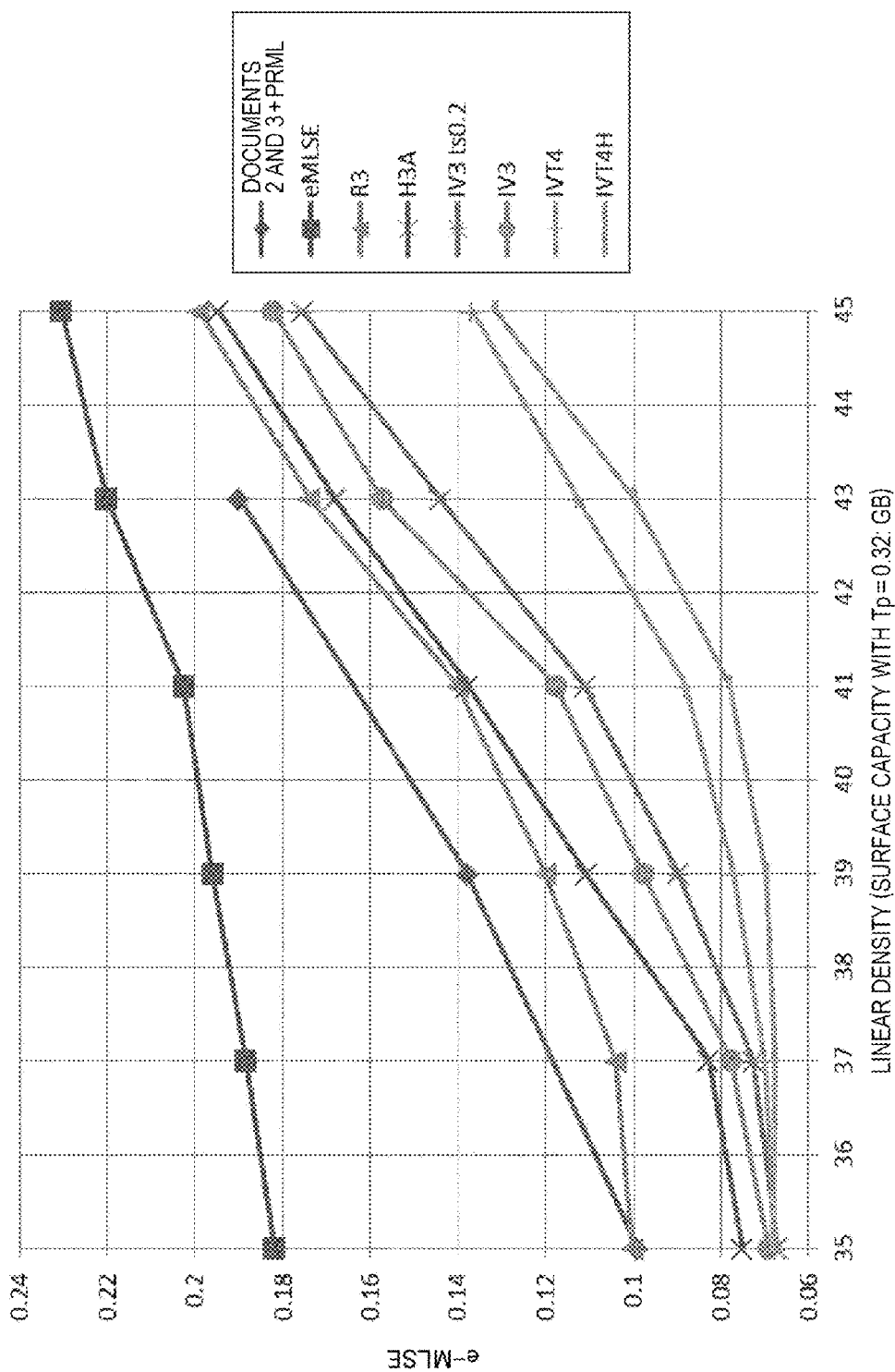
FIG. 11 illustrates graphs of the relationship between linear density and e-MLSE.

FIG. 11 illustrates the result of an applied example in which the technologies in Patent Documents 2 and 3 and the PRML detection method have been combined together and the weighting coefficient has further varied with the linear density, the result being superimposed and plotted on the graphs of FIG. 9. The superiority of bottom characteristics of the configurations according to the present disclosure, has clearly appeared at LD35 GB, and the further superiority of the IVT4 and the IVT4H has been clearly appeared in a case where the linearly-densification has been performed.

On the basis of a difference in an configuration of an electro-optical filter characteristic for each pattern, a mechanism of causing a difference in a characteristic will be described.

[Electrical Filter Characteristics in Configuration of Patent Documents 2 and 3+PRML and Pattern R2] FIG. 12 illustrates the tap coefficients and the frequency-amplitude characteristics as electrical filters corresponding to the tap coefficients in simulated results of the FIR filter in the configuration of the Patent Document applied example and an FIR filter in the pattern R2, in a case of LD35 GB, as comparative examples to the present disclosure. A characteristic L1 in a case of the pattern R2 is the frequency-amplitude characteristic of a channel corresponding to the region A outside, and a characteristic L2 is the frequency-amplitude characteristic of a channel corresponding to the region C inside.

The horizontal axis represents n/(256T) (n: the value on the horizontal axis) in the frequency-amplitude characteristics. For example, in a case where n is 64, the following expression is satisfied: $(64/256T)=(1/4T)$ For example, in a case where the RLL (1, 7) PP modulation method has been used, when a channel clock cycle is defined as "T", a mark length ranges from 2T to 8T. (1/4T) is a frequency in a case where a mark with 2T repeats. With LD35 GB, the mark with 2T exceeds a spatial optical cut-off frequency so that a frequency region in which reproduction cannot be performed is provided, and thus a characteristic in which a mark with 3T can be reproduced, is provided.

As can be seen that the e-MLSEs are equivalent to each other at LD35 GB in FIG. 11, no large difference is present between the shapes of the tap coefficients and between the frequency-amplitude characteristics. At LD35 GB (the perturbation origin), even when the configuration of Patent Document applied example or a configuration of coupling an individual electrical filter to each channel in the pattern R2 is provided, a substantially equivalent characteristic is acquired. In a case of the patterns R2 and R3, a further effect acquired by providing individual electrical filters is limited.

[Adaptive Electro-Optical Filter Characteristic in Pattern H3A]

The pattern H3A can improve reproduction performance higher than a configuration including division only in the radial direction, by further performing the region division in the tangential direction in addition to the radial direction, spatially and optically making the three regions corresponding to signals having different bands, in the linear density direction and the track density direction, and adding the three channels of signals formed from the signals of the respective regions, through electrical filters having different frequency and phase characteristics.

Figure 13:
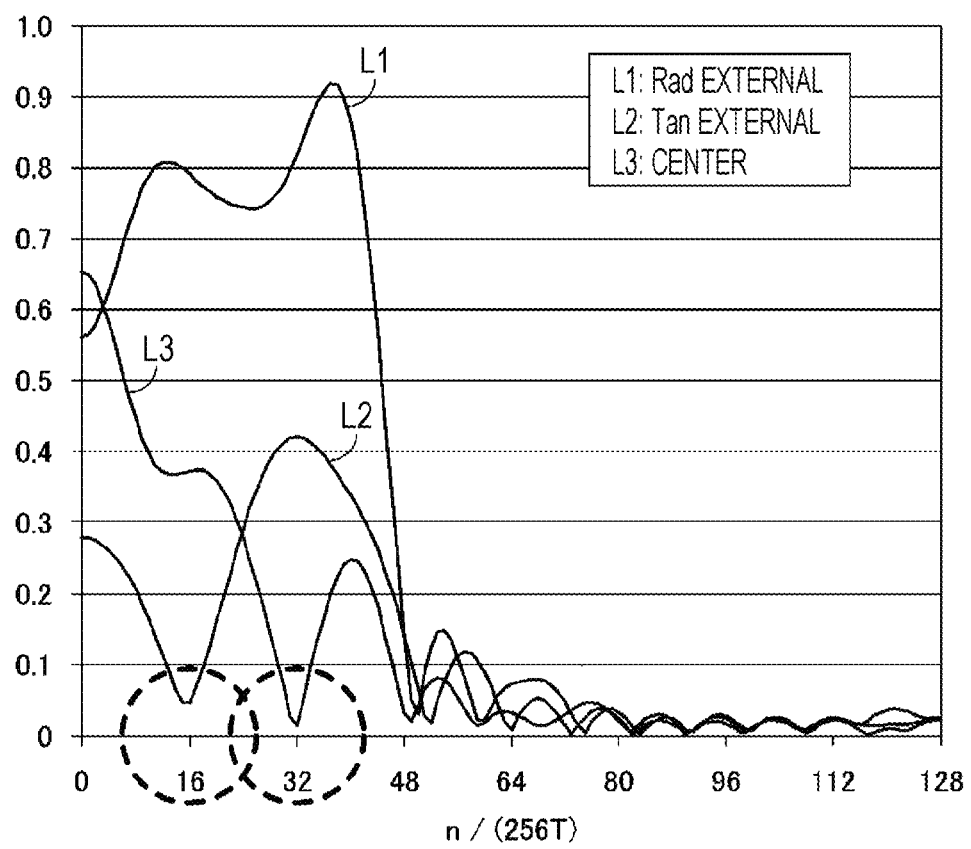
FIG. 13 illustrates graphs of frequency-amplitude characteristics.

FIG. 13 illustrates the adaptive electro-optical filter characteristic of the pattern H3A (refer to FIG. 8) in a case of LD35 GB. The horizontal axis represents n/(256T) (n: the value on the horizontal axis) in a frequency-amplitude characteristic. For example, in a case where n is 64, the following expression is satisfied: $(64/256T)=(1/4T)$ For example, in a case where the RLL (1, 7) PP modulation method has been used, when a channel clock cycle is defined as "T", a mark length ranges from 2T to 8T. (1/4T) is a frequency in a case where a mark with 2T repeats. A characteristic L1 is the frequency-amplitude characteristic of a channel corresponding to the region A outside in the radial direction, a characteristic L2 is the frequency-amplitude characteristic of a channel corresponding to the region E outside in the tangential direction, and a characteristic L3 is the frequency-amplitude characteristic of a channel corresponding to the region C at the center. Note that, the characteristics are characteristic examples at the perturbation origin.

FIG. 14A illustrates the tap coefficient of each channel of the pattern H3A. For example, the tap number of the FIR filter is 31 taps. FIG. 14B illustrates the frequency-phase characteristic of each channel. The frequency-phase characteristics each indicate the phase difference between two channels in the three channels. A characteristic L11 indicates the phase difference between reproduction information signals of the channels corresponding to the region E outside in the tangential direction and the region A outside in the radial direction. A characteristic L12 indicates the phase difference between reproduction information signals of the channels corresponding to the region C at the center and the region A outside in the radial direction. A characteristic L13 indicates the phase difference between reproduction information signals of the channels corresponding to the region E outside in the tangential direction and the region C at the center.

As described above, the filter characteristic of the H3A has the following features.

A filter having largely different frequency characteristics with respect to the amplitude and the phase for each regions of the three channels is provided so that favorable reproduced signal reproduction can be achieved.

The center region, the region E outside in the tangential direction, and the area A outside in the radial direction, have been mutually shifted by 180 deg in phase, in the frequency band corresponding to a 3T signal (proximity to a value of 43 on the horizontal axis, indicated being surrounded with a broken line).

The center region has a characteristic of cutting off the frequency band corresponding to a 4T signal (proximity to a value of 32 on the horizontal axis), and inhibits aliasing due to crosstalk.

The outside in the tangential direction should contribute to short mark reproduction, and cuts off the frequency band corresponding to an 8T signal (proximity to a value of 16 on the horizontal axis), and additionally the center region C, the region A outside in the radial direction, and the region E outside in the tangential direction, have been mutually shifted by 180 deg in phase, in a frequency band lower than that of the 8T signal.

In this manner, for example, a high-pass filter, a low-pass filter, a band-pass filter, or a band-stop (or notch) filter is provided for each region so that a filter characteristic that cannot be achieved only optically or only electrically, has been achieved.

Note that, the tap coefficients of the adaptive equalizer units (FIR filters) are adaptively controlled in the descriptions in the present specification. However, in a case where an optimal tap coefficient has been acquired as a result of simulation, an equalizer unit including the tap coefficient fixed can be used, or an analog filter or a digital filter, having an equivalent characteristic, can be used other than a FIR filter. The tap coefficient is unnecessary to adaptively control so that processing and hardware can be simplified although the adaptive type is superior in terms of performance. In addition, a fix-typed equalizer unit can be used for a channel from a plurality of channels, and adaptive equalizer units can be used for the other channels.

[Optimum Electrical Filter for Pattern IVT4]

As can be seen in FIG. 11, the IVT4 has the e-MLSE characteristic considerably favorable at LD35 GB, and additionally can retain the e-MLSE to be favorable in comparison to the pattern R3, the H3A, and the IV3, including no channel having a different center position in the tangential direction, in a case where the linearly-densification has been performed.

Figure 15:
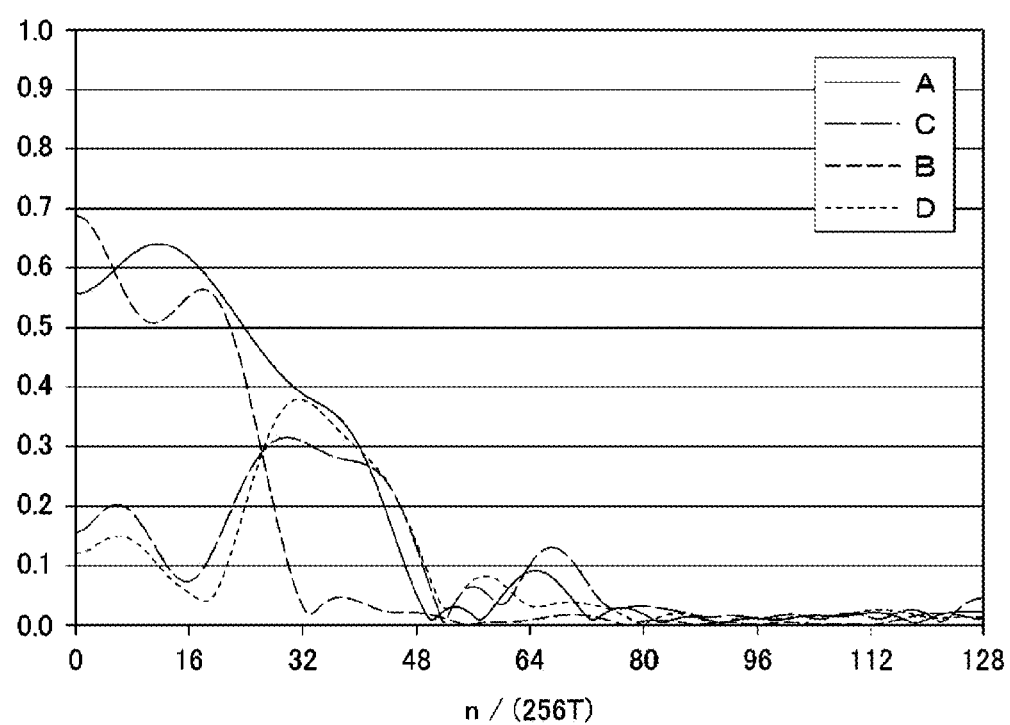
FIG. 15 illustrates graphs of frequency-amplitude characteristics.

An optimum electrical filter for the IVT4 will be described. First, FIG. 16A illustrates the tap coefficient of each channel corresponding to each region (here, the tap number of each FIR filter is 31 taps), FIG. 15 illustrates the frequency-amplitude characteristic, and FIG. 16B illustrates the frequency-phase characteristic, in a case of LD35 GB. The frequency-phase characteristic indicates the phase difference between the channel corresponding to the region E outside in the tangential direction and the channel corresponding to the region F outside in the tangential direction.

The filter characteristic of the IVT4 illustrated in FIGS. 15, 16A, and 16B has the following features.

Similarly to the pattern H3A, the center region has a low-pass characteristic and the region outside in the tangential direction has a high-pass characteristic (here, the high-pass means that a band-pass characteristic in which the band corresponding to a shorter mark passes, in a frequency band contributing to signal reproduction, is expressed as being mutually high-pass).

Furthermore, the pattern IVT4 has the region outside in the tangential direction including individual two channels, and is included in a filter that makes the two regions have a phase difference of approximately 120 to 90 deg (approximately two clocks as can be seen from the tap coefficients), in the frequency bands corresponding to 3T and 4T (proximity to values of 43 and 32 on the horizontal axis). With this arrangement, detection with higher sensitivity can be performed to reproduced amplitude due to a simple summed signal, for the short mark. For the short mark reproduction, utilizing the phase difference between the regions, achieves a favorable reproduced signal characteristic and additionally contributes to a favorable characteristic in a case where the linearly-densification has been further performed.

In the bands corresponding to 4T (proximity to a value of 32 on the horizontal axis) and 3T (proximity to a value of 43 on the horizontal axis), the region C hardly including the signal components of the bands, inhibits crosstalk components and the other noise components present in the regions, with a low-pass filter characteristic. Furthermore, the crosstalk components are reduced with the phase difference between the E and the F, and the remaining crosstalk components are canceled with a balance with the frequency-amplitude characteristic of the C. As a result, the frequency-amplitude characteristics of the E, the F, and the A are unnecessary to rise more than necessary, leading to the achievement of a favorable reproduced signal characteristic.

Figure 17:
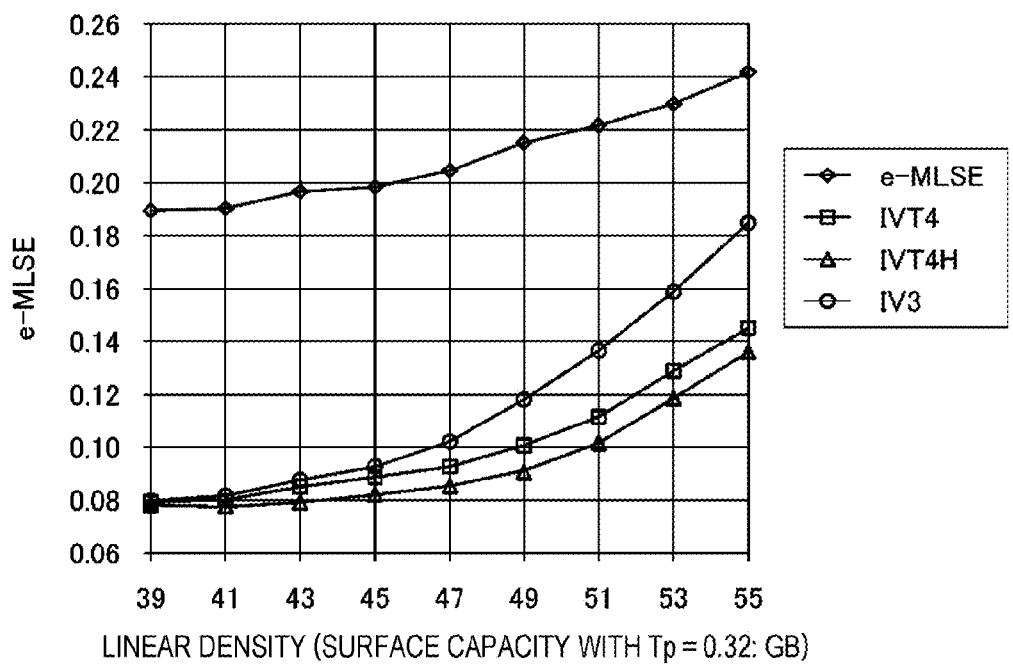
FIG. 17 illustrates graphs of the relationship between linear density and e-MLSE.

Lengthening the constraint length of PRML is effective in the linearly-densification. FIG. 17 illustrates simulated results in a case of PR(1, 2, 3, 4, 4, 4, 3, 2, 1) with an example of the constraint length being 9.

Simulation conditions are as follows:
Tp=0.225 μm (for land and groove)
NA=0.85
PR(123444321)
Evaluation index: e-MLSE
Groove depth of (1/15)λ
Mark width=Tp*0.7
Disc Noise and Amp Noise existing
Tap: 31 taps at 1T intervals
Perturbation origin (e.g., defocus and skew all at the origin)

In addition, similarly to a case where PR(1, 2, 3, 3, 3, 2, 1) has been used, the linear density is denoted with LD (surface capacity with Tp=0.32 μm) by using surface capacity when a disc has a diameter of 120 mm and a track pitch Tp of 0.32 μm.

A graph denoted with e-MLSE in the simulated results of FIG. 17 is a result in a case where region division has not been performed. As can be seen in FIG. 17, the IV3 including no channel having a different center position in the tangential direction, has degradation due to the linearly-densification, large, similarly to the case where PR(1, 2, 3, 3, 3, 2, 1) has been used. It can be seen that the IVT4 including the channels having the different center positions in the tangential direction, also has a linearly-densification effect corresponding to LD3 GB in the linear density direction, with respect to the IV3 having the division positions in the radial and tangential directions, the same as those of the IVT4.

It can be confirmed that the IVT4H including the optical filter shape optimized in priority to the characteristic in the case where the linearly-densification has been performed, has also further acquired a linearly-densification effect corresponding to LD1 GB, with respect to the IVT4.

As described above, densification is performed in a linear density direction by shortening a channel bit length, namely, a mark length, and densification is performed in a track density direction by narrowing a track pitch, so that recorded marks are two-dimensionally arranged on a signal recording surface in a case where densification of an optical disc is achieved.

The variation of light and dark is detected for a reproduced signal in an optical disc, the variation occurring when diffracted beams generated with a periodic structure including, for example, a recorded mark and a groove, are superimposed so as to interfere. As illustrated in FIG. 18A, the shift amount of the center is expressed with $\lambda/(NA*p)$ in ±first order diffracted beams due to a periodic structure having a cycle p, in a case where the pupillary radius is 1. The amplitude of the reproduced signal increases as the superimposition due to the shift amount increases, and the amplitude decreases as the superimposition decreases. When the superimposition disappears, namely, the shift amount satisfies the following expression: $\lambda/(NA*p)=2$, the amplitude becomes zero. As a result, the spatial frequency characteristic of the modulation transfer function (MTF) is made as illustrated in FIG. 18B. On the basis of the following expression: $\lambda/(NA*p)=2$, the cut-off spatial frequency satisfies the following expression: $1/p=2NA/\lambda$. The amplitude becomes zero in a case where a periodic structure smaller than the following expression: $1/p=2NA/\lambda$, has been consecutive.

This is applied to a system including a wavelength of 405 nm and an NA of 0.85, similar to that described above, so that a smallest periodic structure capable of reproducing the cycle p satisfying the following expression: $p=\lambda/(2NA)=238$ nm, is provided on the basis of the following expression: $1/p=2NA/\lambda$. This means, in a system having 53 nm/channelbit with the RLL (1, 7) PP (LD35.2 GB), shortest 2T mark/space, described as an example of low linear density, satisfies the following expression: 53 nm*2 2=212 nm so as to exceed the cut-off spatial frequency so that the sequence of 2T mark/space makes the amplitude zero. The shift amount satisfies the following expression: $\lambda/(NA*p)=1.50$, with respect to a periodic structure corresponding to 3T mark/space satisfying the following expression: 53 nm 3 2=318 nm, so that regions including a zero order beam and the ±first order beams superimposed, in FIG. 18C contribute to signal reproduction. When the linearly-densification has been slightly performed so as to make a system including LD41 GB: 45.47 nm /channelbit, shortest 2T mark/space satisfies the following expression: 45.47 nm*2 2=182 nm so as to exceed the cut-off spatial frequency, and the shift amount satisfies the following expression: $\lambda/(NA*p)=1.75$ with respect to a periodic structure corresponding to 3T mark/space satisfying the following expression: 45.47 nm 3 2=273 nm, so that the regions including the zero order beam and the ±first order beams superimposed, in FIG. 18D contribute the signal reproduction. Signal processing does not collapse even in density in which the amplitude of 2T mark/space is zero due to the PRML, but the reproduction quality of the short mark is an important element.

As described above, the regions outside in the tangential direction, are filters that perform high bandpass to a frequency band corresponding to a short mark having, for example, 3T or 4T, and the center regions are low-pass filters through which a frequency band corresponding to a long mark having 5T or more, passes in large quantity, in the electro-optical filter characteristics of the patterns H3A and IVT4. As can be seen from the contrast between FIGS. 18C and 18D, this means that the reproduced signal quality of a self-track is achieved to improve, by spatially and optically separating a region to make a large contribution to reproduction of a band corresponding to a short mark and a region to make a large contribution to reproduction of a band corresponding to a long mark, effectively, further emphasizing a frequency component estimated to have the ratio of the reproduced signal component of the self-track, high, and suppressing, cutting off, or canceling, in balance with the other signals, a frequency component estimated to have the ratio of the reproduced signal component of an adjacent track, high, in each region. Furthermore, in a case of the IVT4, the signals from the two regions outside in the tangential direction, are made to have a phase difference so that detection with higher sensitivity can be performed to produced amplitude due to a simple summed signal, for a short mark. As can be seen in the comparison between FIGS. 18C and 18D, the regions to contribute to the reproduction of 3T mark/space in addition to 2T mark/space, decrease as the linearly-densification is performed. Although the reproduction due to the simple summed signal causes a disadvantageous state, characteristic degradation is inhibited with high sensitivity made due to phase difference detection.

In this manner, a favorable reproduced signal including inter-code interference and leakage of a signal from an adjacent track, reduced, can be acquired by performing region division in the tangential direction and the radial direction in order to make spatially and optically separation of a plurality of signals having different bands, in the linear density direction and the track density direction, applying electrical filters having individual characteristics optimum to a high-pass filter, a low-pass filter, a band-pass filter, or a band-stop (or notch) filter, to the signals from the respective regions, and then adding the signals together again.

Instead of simply performing region division in the tangential direction and the radial direction, similarly to the IVT4 and the IVT4H, a filter that spatially and optically separates signals having different bands effectively, is provided so that the e-MLSE at the perturbation center position can be made favorable and additionally various margins, such as a radial coma aberration margin, can be expanded. Separating regional signals in interfering regions (indicated with 0) with the ±first order diffracted beams due to the track structure, is effective in addition to only using the signal in the region of the zero order beam as a diffracted beam denoted with * in FIG. 18E, due to a track structure, corresponding to short mark reproduction.

As indicated in the characteristics of FIGS. 14 and 16 described above, the regions (A1 and A2) outside in the radial direction have high gain over a wide band so as to be sensitive to noise. Furthermore, having the channels outside in the tangential direction, is advantageous to the linearly-densification.

[Influence of Amplifier Noise]

Figure 19:
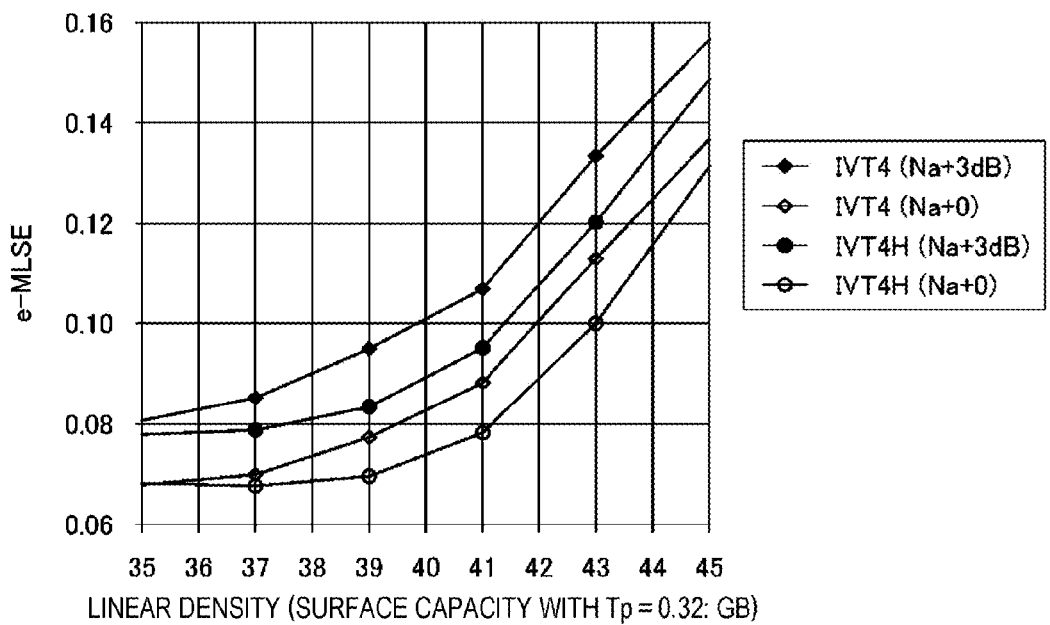
FIG. 19 illustrates graphs of the relationship between linear density and e-MLSE.

FIG. 19 illustrates simulated results for indicating the influence of random noise typified by amplifier noise. In FIG. 19, the PRML with PR(1233321) has been used. The simulated results of the IVT4 and the IVT4H are illustrated. The relationship between IVT4(Na+0) and IVT4(Na+3 dB) means a case where the random noise typified by the amplifier noise has increased by 3 dB. The relationship between IVT4H(Na+0) and IVT4H(Na+3 dB) have a meaning similar to the above.

As can be seen in FIG. 19, a large area of channel (light intensity) outside in the radial direction and a large area of channel (light intensity) outside in the tangential direction are effective against an increase in the random noise typified by the amplifier noise (or against a case where the random noise typified by the amplifier noise has mutually increased with signal light intensity decreased, similarly).

Figure 20:
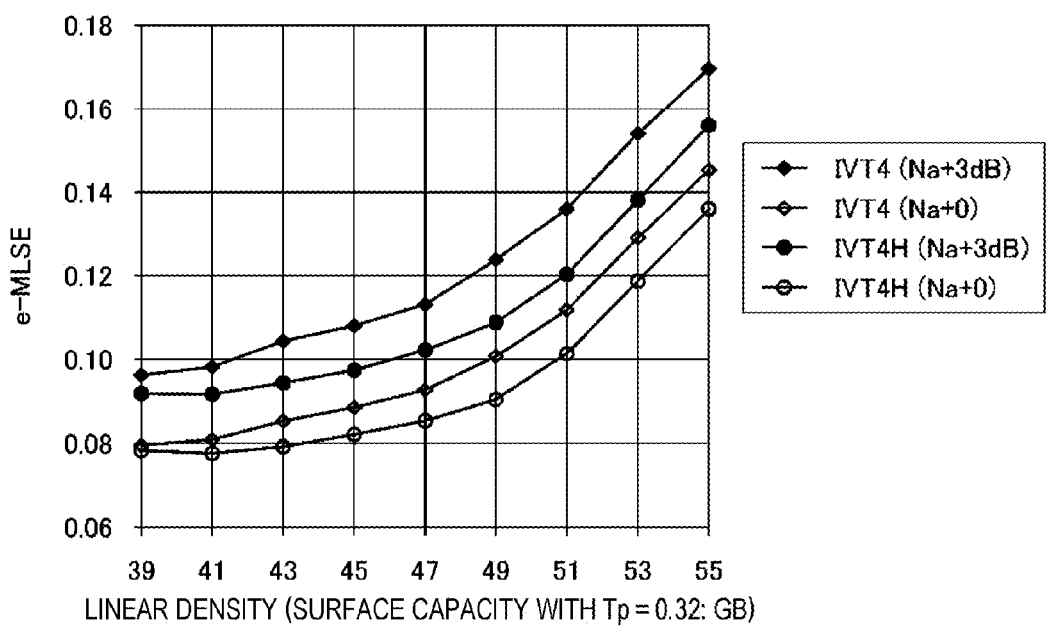
FIG. 20 illustrates graphs of the relationship between linear density and e-MLSE.

FIG. 20 illustrates simulated results for indicating the influence of the random noise typified by the amplifier noise. In FIG. 20, the PRML with PR(123444321) has been used. The simulated results of the IVT4 and the IVT4H are illustrated. In this case, a similarity to the above is illustrated.

FIG. 21A illustrates simulated results for indicating the influence of the random noise typified by the amplifier noise. In FIG. 21A, the PRML with PR(123444321) has been used. The simulated results of the IVT4 (illustrated in FIG. 21B) are illustrated. Here, for further simplification, influence is illustrated on the assumption that the random noise except the amplifier noise is sufficiently small and the amplifier noise is dominant as the random noise.

In FIG. 21A, (R 2 amp) indicates a case where channels A1 and A2 outside in the radial direction have been detected by different detectors so as to be added through IV amplifiers. Two units of the IV amplifiers are used so that the amplifier noise increases. (T 2 amp) indicates a case where two amplifiers have been used for a one-sided channel E or F in the tangential direction, and (C 2 amp) indicates a case where two amplifiers have been used for a center channel. (Na+3 dB) indicates a case where the four channels each have used two amplifiers.

FIG. 22A illustrates simulated results for indicating the influence of the amplifier noise. In FIG. 22A, the PRML with PR(123444321) has been used. The simulated results of the IVT4H (illustrated in FIG. 22B) are illustrated. In FIG. 22A, the respective meanings of (R 2 amp), (T 2 amp), (C 2 amp), and (Na+3 dB) are similar to those in FIG. 21A.

As can be seen in the case, an increase in the amplifier noise or a decrease in a signal level degrades the value of the e-MLSE by 1 to 2% (0.01 to 0.02), and thus increase of the amplifier noise, retainment of reproduction power sufficient in a range in which a recorded signal does not degrade, and design of the reflectivity of a disc capable of retaining a sufficient signal level, are important factors.

[Optimum PR Class]

For simplicity in the above, the simulated results have been described in a case where PR(1, 2, 3, 3, 3, 2, 1) with a constraint length of 7, having a linear density range of LD35 GB to LD45 GB fixed and PR(1, 2, 3, 4, 4, 4, 3, 2, 1) with a constraint length of 9, having a linear density range of LD39 GB to LD55 GB fixed.

However, in practice, the optimum PR class varies, depending on an optical filter shape, particularly, whether channels corresponding to a plurality of regions having different center positions in the tangential direction, are provided, or signal recording density, particularly, the degree of density in the linear density direction.

Figure 23:
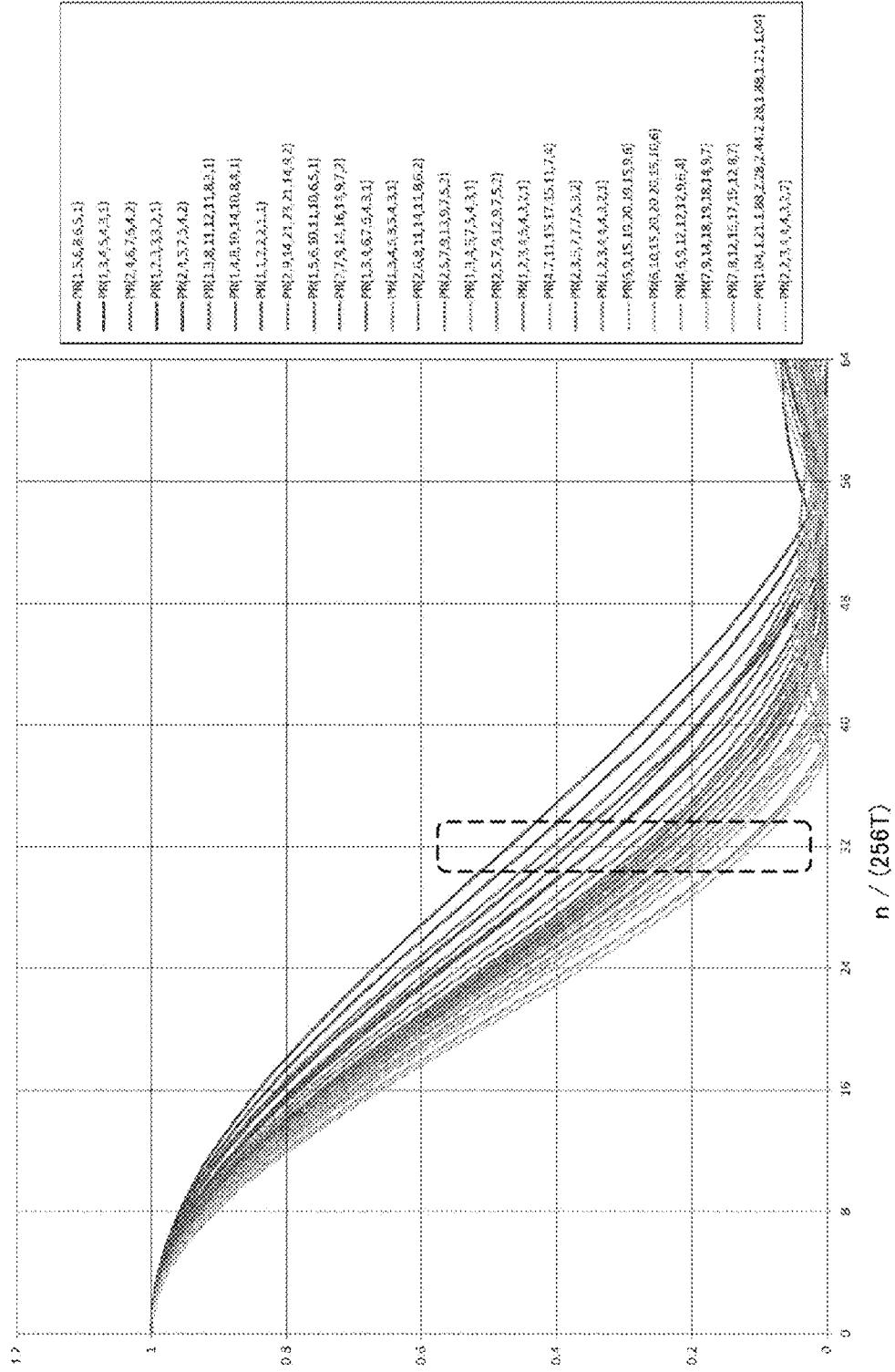
FIG. 23 illustrates graphs of frequency characteristics of adaptive equalization targets

Various types can be considered as the PR class. FIG. 23 illustrates the frequency characteristics of adaptive equalization targets for various PR classes considered to be effective for an optical filter and signal recording density assumed in the present disclosure, with a horizontal axis of n/(256T), similarly to the electrical filters. As an index value that features the characteristic of each PR class, using a value PR-TL(4T) of the equalization target (target level) is effective, on an horizontal axis of 32, namely, at the frequency corresponding to 4T mark/space. When the linearly-densification is performed, the spatial and optical cut-off frequency shifts to the left in the direction of the horizontal axis so that PR-TL(4T) corresponding to the optimum PR class decreases.

Recording has been performed, with a plurality signal recording densities, to a disc including a single-sided/three-layer structure, produced in practice. Results of signal reproduction that has been performed to the disc with a configuration including an optical filter having channels corresponding to a plurality of regions having different center positions in the tangential direction, and a configuration including an optical filter without the channels, are shown below.

Experimental conditions are as follows:
Disc:
Recording surface: single-sided/three-layer structure
Tp=0.225 μm (for land and groove)
Groove depth of approximately ($\frac{1}{16}$)λ
Multitrack recording to both of the land and the groove to satisfy a signal recording density of LD35.18 GB (53 nm/channelbit) corresponding to 50.0 GB/layer and 300 GB with double-sided 6 layers, a signal recording density of LD41.1 GB (45.4 nm/channelbit) corresponding to 58.5 GB/layer and 351 GB with double-sided 6 layers, and a signal recording density of LD47.0 GB (39.7 nm/channelbit) corresponding to 66.8 GB/layer and 401 GB with double-sided 6 layers Reproduction Optical System:
NA=0.85
Wavelength of 405 nm
Optical Filter:
Two types illustrated in FIG. 24
VHT4: Total four channels of signals including three channels corresponding to three regions C, E, and F having different center positions in the tangential direction and one channel corresponding to a region A (A1+A2) outside in the radial direction, are acquired. The optical filter having a characteristic considerably close to that of the IVT4 described above. This is a representative example of "T type" including a plurality of regions having different center positions in the tangential direction.

JR4: No channels corresponding to a plurality of regions having different center positions in the tangential direction, is provided. Total four channels of signals including three channels corresponding to three regions C, E, and D having different center positions in the radial direction and one channel corresponding to a region (A+B) outside in the tangential direction, are acquired. This is a representative example of "R type" including a plurality of regions having different center positions in the radial direction.

Adaptive Equalizer:
Tap: 25 taps at 2T intervals (a width of 49T) Tap initial value existing (examples illustrated in FIGS. 25A and 25B)
PR Class:
Range of PR-TL(4T) of 0.128 to 0.471, with PR(1, 2, 3, 3, 3, 2, 1) and PR(1, 2, 3, 4, 4, 4, 3, 2, 1) described in Table 1, included
Evaluation index:
e-MLSE

TABLE 1

|  |  | PR-TL (4T) |
|---|---|---|
| ISI5 | PR (2,3,3,3,2) | 0.557 |
| ISI7 | PR (1,4,7,8,7,4,1) | 0.515 |
| ISI7 | PR (1,4,6,8,6,4,1) | 0.502 |
| ISI7 | PR (1,4,6,7,6,4,1) | 0.485 |
| ISI7 | PR (1,5,6,8,6,5,1) | 0.471 |
| ISI7 | PR (1,3,4,5,4,3,1) | 0.440 |
| ISI7 | PR (2,4,6,7,6,4,2) | 0.408 |
| ISI7 | PR (1,2,3,3,3,2,1) | 0.389 |
| ISI7 | PR (1,1,2,2,2,1,1) | 0.341 |
| ISI9 | PR (1,5,6,10,11,10,6,5,1) | 0.292 |
| ISI9 | PR (2,7,9,14,16,14,9,7,2) | 0.274 |
| ISI9 | PR (1,3,4,6,7,6,4,3,1) | 0.264 |

TABLE 1-continued

|  |  | PR-TL (4T) |
|---|---|---|
| ISI9 | PR (2,6,8,11,14,11,8,6,2) | 0.251 |
| ISI9 | PR (1,2,3,4,5,4,3,2,1) | 0.233 |
| ISI9 | PR (4,7,11,15,17,15,11,7,4) | 0.223 |
| ISI9 | PR (2,3,5,7,7,7,5,3,2) | 0.211 |
| ISI9 | PR (1,2,3,4,4,4,3,2,1) | 0.201 |
| ISI9 | PR (6,9,15,19,20,19,15,9,6) | 0.188 |
| ISI9 | PR (6,10,15,20,20,20,15,10,6) | 0.181 |
| ISI9 | PR (4,6,9,12,12,12,9,6,4) | 0.169 |
| ISI9 | PR (7,9,14,18,19,18,14,9,7) | 0.154 |
| ISI9 | PR (7,8,12,15,17,15,12,8,7) | 0.128 |

Figure 26:
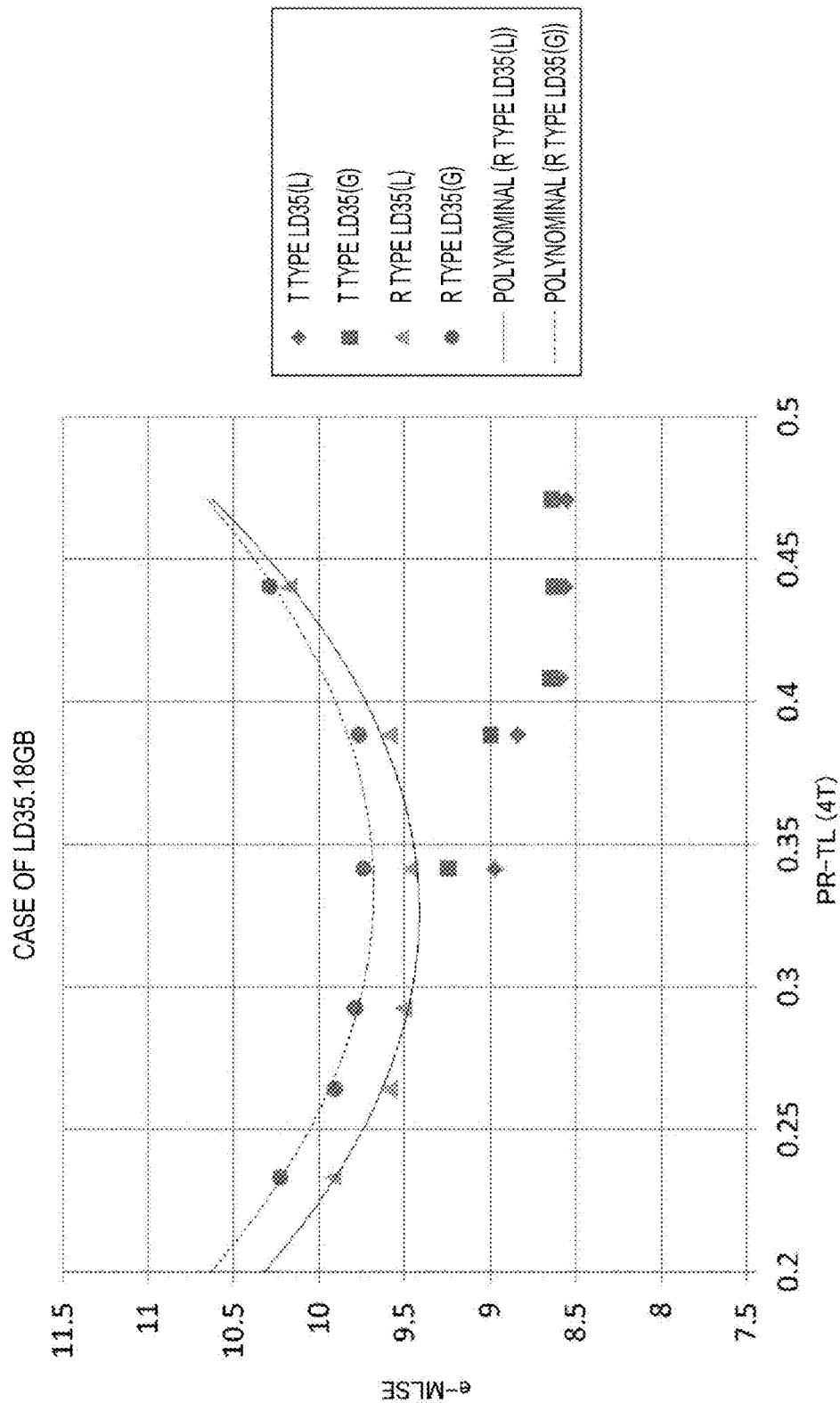
FIG. 26 illustrates graphs of the relationship between PR-TL(4T) and e-MLSE.

FIG. 26 illustrates experimental results in a case of LD35.18 GB (53 nm/channelbit) corresponding to 50.0 GB/layer and 300 GB with double-sided 6 layers.

Figure 27:
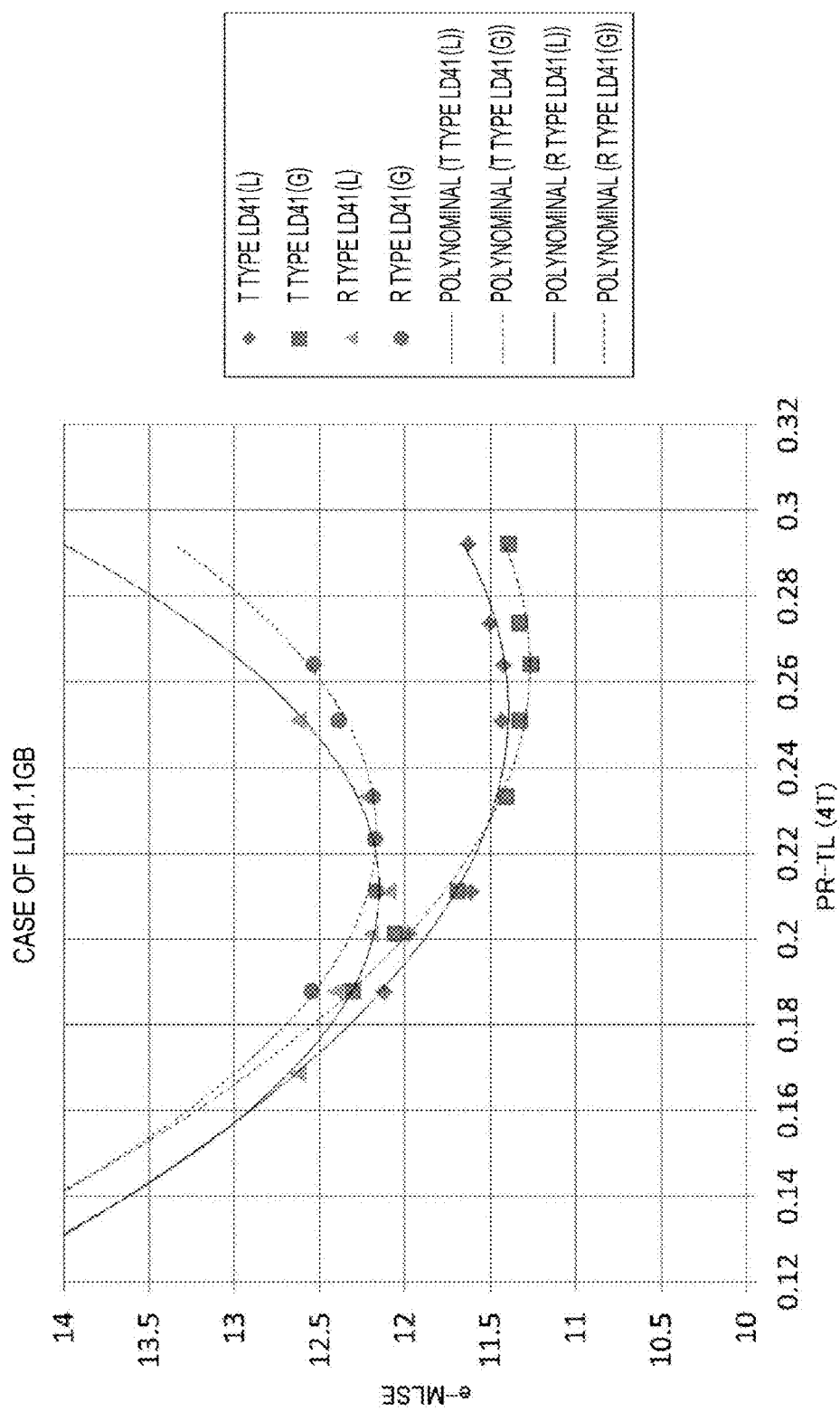
FIG. 27 illustrates graphs of the relationship between PR-TL(4T) and e-MLSE.

FIG. 27 illustrates experimental results in a case of LD41.1 GB (45.4 nm/channelbit) corresponding to 58.5 GB/layer and 351 GB with double-sided 6 layers.

Figure 28:
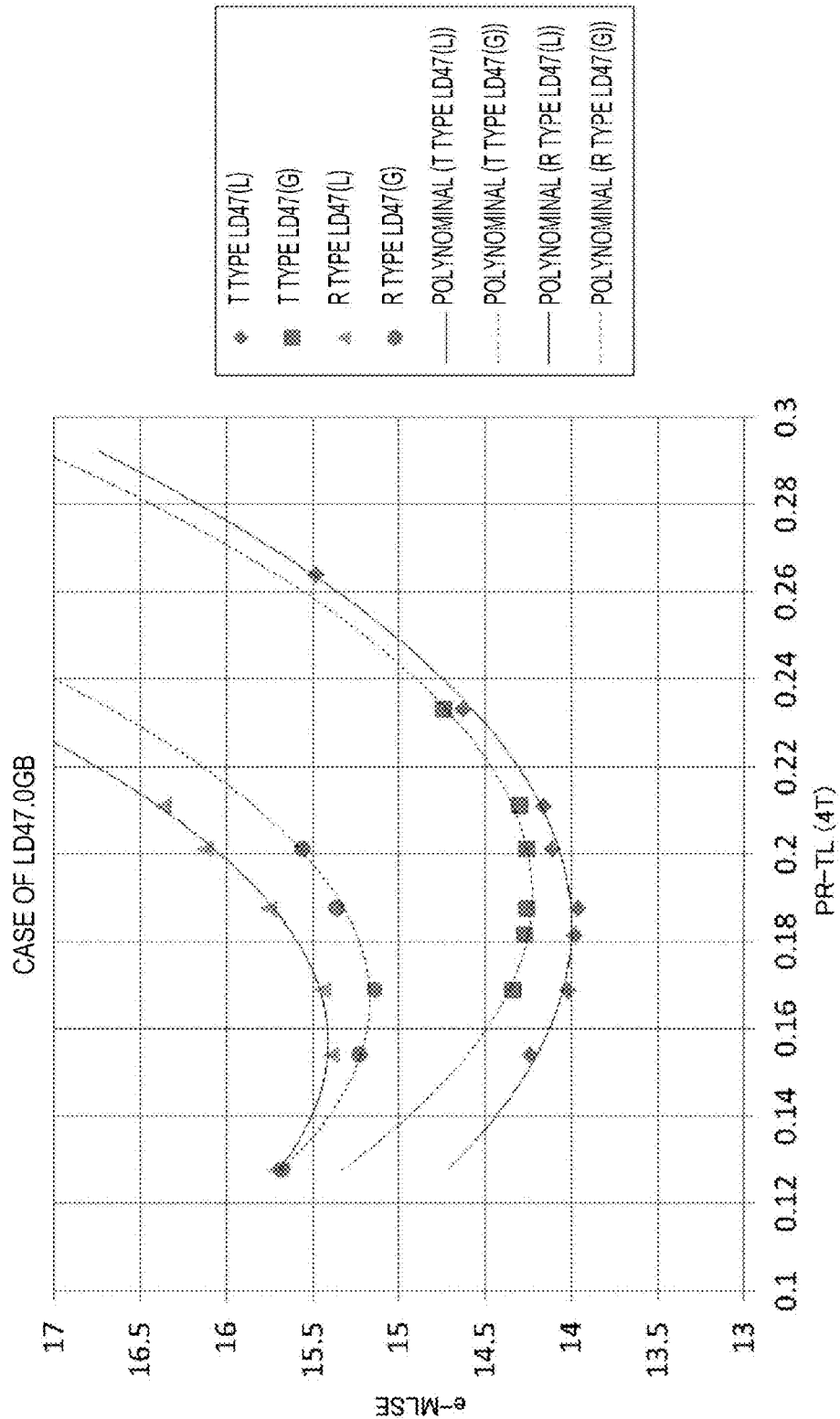
FIG. 28 illustrates graphs of the relationship between PR-TL(4T) and e-MLSE.

FIG. 28 illustrates experimental results in a case of LD47.0 GB (39.7 nm/channelbit) 66.8 GB/layer and 401 GB with double-sided 6 layers.

Each horizontal axis indicates the equalization target value PR-TL(4T) at the frequency corresponding to 4T mark/space, of each PR class used for reproduction, and each vertical axis indicates the average value of e-MLSEs in a sufficiently wide section at that time (percent notation).

The results indicated with T type each correspond to a case where the VHT4 has been used, and the results indicated with R type each correspond to a case where the JR4 has been used. (G) indicates a case of groove reproducing in the area including the land and the groove to which recording has been performed, and (L) indicates a case of land reproducing.

As can be seen in FIG. 26 and in Table 1, the e-MLSE characteristics of the land and the groove both are optimal at a PR-TL(4T) of 0.325 to 0.33 close to PR(1, 1, 2, 2, 2, 1, 1), in a case of the R-typed JR4 with LD35.18 GB, and the e-MLSE characteristics of the land and the groove both are substantially flat at a PR-TL(4T) of 0.41 or more in a case of the T-typed VHT4. In this manner, it can be seen that the optimum PR class varies between the R type and the T type. In addition, it can be seen that, with PR(1, 2, 3, 3, 3, 2, 1) used for the simulations made as a reference, the optimum PR-TL(4T) of the R type is present on the small side and optimum PR-TL(4T) of the T type is present on the large side, so as to be appropriate PR classes in comparison with PR fixation.

As can be seen in FIG. 27 and in Table 1, the land has the e-MLSE optimum at approximately PR(2, 3, 5, 7, 7, 7, 5, 3, 2) and the groove has the e-MLSE optimum at approximately PR(4, 7, 11, 15, 17, 15, 11, 7, 4) in a case of the R-typed JR4 with LD41.1 GB. The land has the e-MLSE optimum at approximately PR(2, 6, 8, 11, 14, 11, 8, 6, 2) and the groove has the e-MLSE optimum at approximately PR(1, 3, 4, 6, 7, 6, 4, 3, 1) in a case of the T-typed VHT4 with LD41.1 GB. In this manner, the optimum PR class varies between the R type and the T type, and additionally the optimum PR class also varies between the land and the groove.

As can be seen in FIG. 28 and in Table 1, the land has the e-MLSE optimum at approximately PR(7, 9, 14, 18, 19, 18, 14, 9, 7) and the groove has the e-MLSE optimum at approximately PR(4, 6, 9, 12, 12, 12, 9, 6, 4) in a case of the R-typed JR4 with LD47.0 GB. The land and the groove each have the e-MLSE optimum at approximately PR(6, 9, 15, 19, 20, 19, 15, 9, 6) in a case of the T-typed VHT4 with LD47.0 GB. Here, it can be seen that there is a difference between the land and the groove in terms of the PR-TL(4T) value even when the land and the groove have optima at the same PR class used in the experiment.

Here, it can also be seen that, with PR(1, 2, 3, 4, 4, 4, 3, 2, 1) used in the simulations with the high linear density conditions, made as a reference, the optimum PR-TL(4T) of the R type and the optimum. PR-TL(4T) of the T type both are present on the large side with LD41.1 GB and the optimum PR-TL(4T) of the R type and the optimum PR-TL (4T) of the T type both are present on the small side with LD47.0 GB, so as to be appropriate PR classes in comparison with PR fixation.

Figure 29:
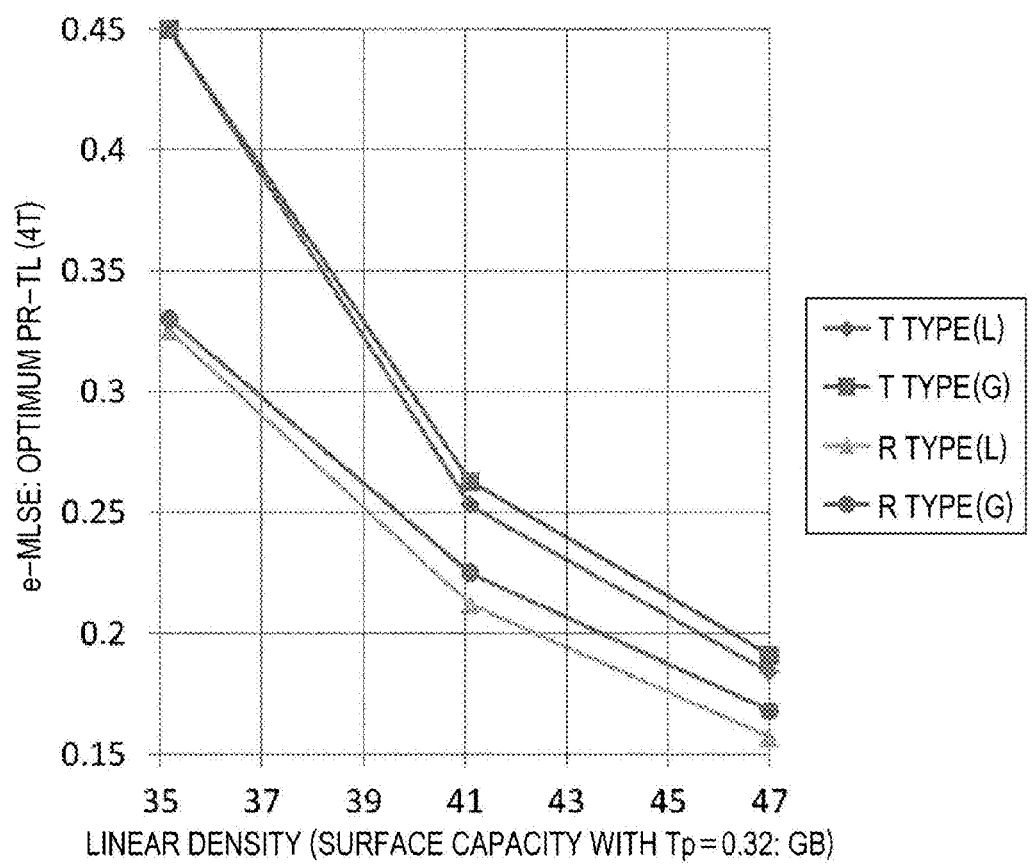
FIG. 29 illustrates graphs of the relationship between optimum PR-TL(4T) and linear density.

FIG. 29 illustrates the relationship between the optimum PR-TL(4T) and the linear density, plotted with each condition of the R-typed land and groove and the T-typed land and groove. Since the PR-TL(4T) having the e-MLSE optimum, has high correlation with the linear density, when the linear density in which the optimum PR-TL(4T) of the R type and the optimum PR-TL(4T) of the T type are equivalent, is read from the graphs, the linear density approximately corresponds to the neighborhood of LD3 GB. Thus, it can be seen that an effect equivalent to the linearly-densification effect of the T type confirmed in the simulations with the PR fixation, can also be confirmed in the experiment.

In selecting the optimum PR class from a plurality of PR classes, the value of the corresponding PR-TL(4T) is effective to use as a reference. A reproduction characteristic is confirmed to a plurality of PR classes corresponding to different values of the PR-TL(4T) being candidates so that a PR class closest to a margin center with respect to each value of the PR-TL(4T), is at least selected.

FIGS. 30A and 30B illustrate the relationship between e-MLSE and linear density and the relationship between i-MLSE and linear density, respectively, in a case where the optimum PR class has been selected. In a case where the optimum PR class has been selected, it can be seen that the R type and the T type linearly vary with substantially equivalent gradients for the relationship between the linear density and the e-MLSE. In addition, it can be seen that the R type and the T type at LD35.18 GB each have substantially the same values for the e-MLSE and the i-MLSE but the different between the e-MLSE and the i-MLSE expands as the linearly-densification is performed. As described above, this is because the data pattern that easily causes an error varies in a case where the linearly-densification has been performed so that the difference expands between the e-MLSE including the pattern added and the i-MLSE including the pattern not added.

The experimental results described above are slightly worse than the simulated results described previously, in terms of the e-MLSE. The difference can be sufficiently described with, for example, a variation of approximately 1% in the e-MLSE due to the recorded state in the measured section, random noise, such as the amplifier noise described previously, in a case of the experimental disc with the single-sided/three-layer structure larger than that in the simulations, and a different recorded mark, in the experimental results.

Figure 31:
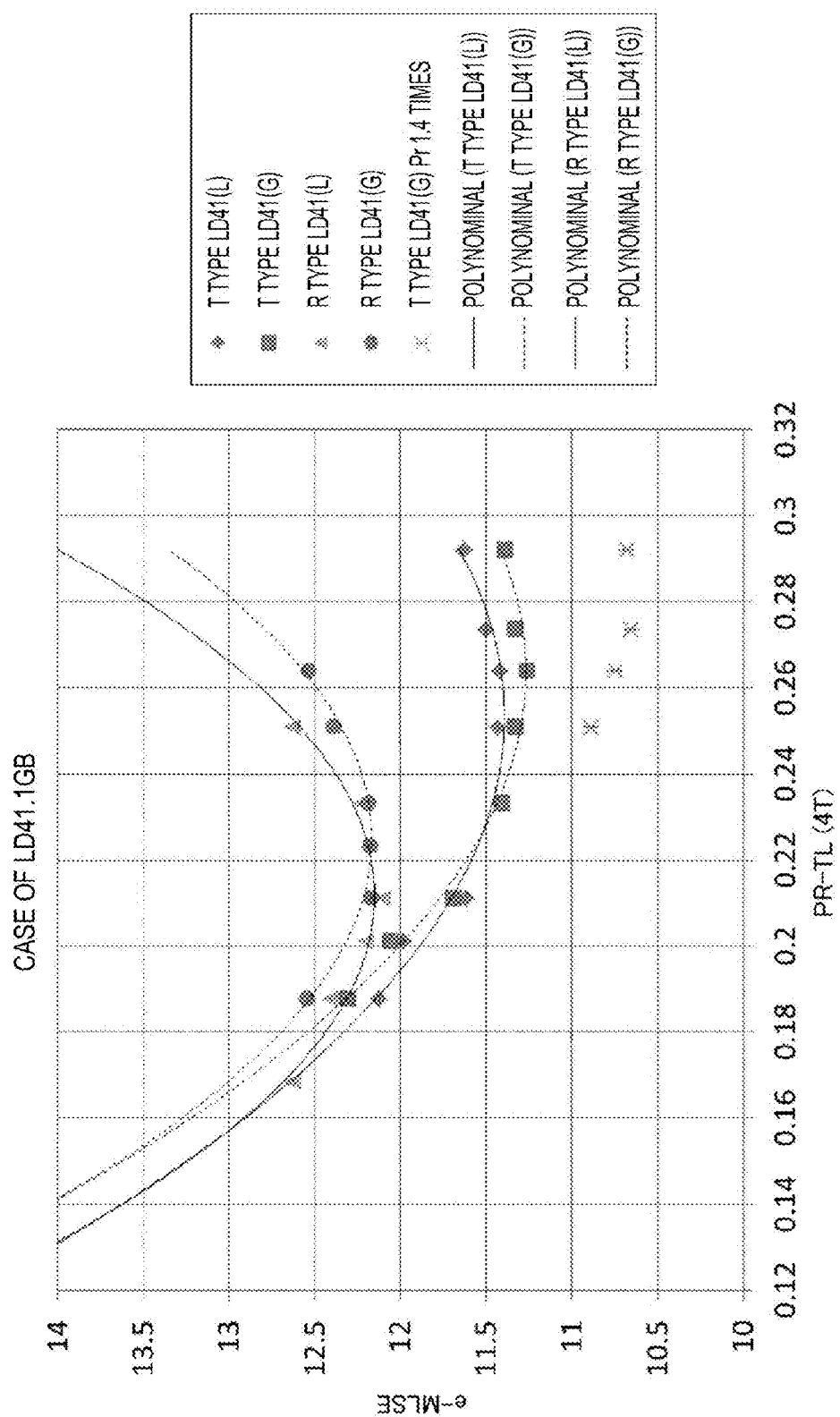
FIG. 31 illustrates graphs of the relationship between PR-TL(4T) and e-MLSE.

In order to grasp the degree of the influence of the random noise, FIG. 31 illustrates the e-MLSE in a case where reproduction power has increased 1.4 times for the groove of the T-typed VHT4, added into FIG. 28, with LD41.1 GB. It can be seen that increasing the reproduction power 1.4 times improves the e-MLSE by approximately 1%. In addition, the optimum PR class (PR-TL(4T)) slightly varies depending on the reproduction power.

[Exemplary Pattern Selection]

Figure 32:
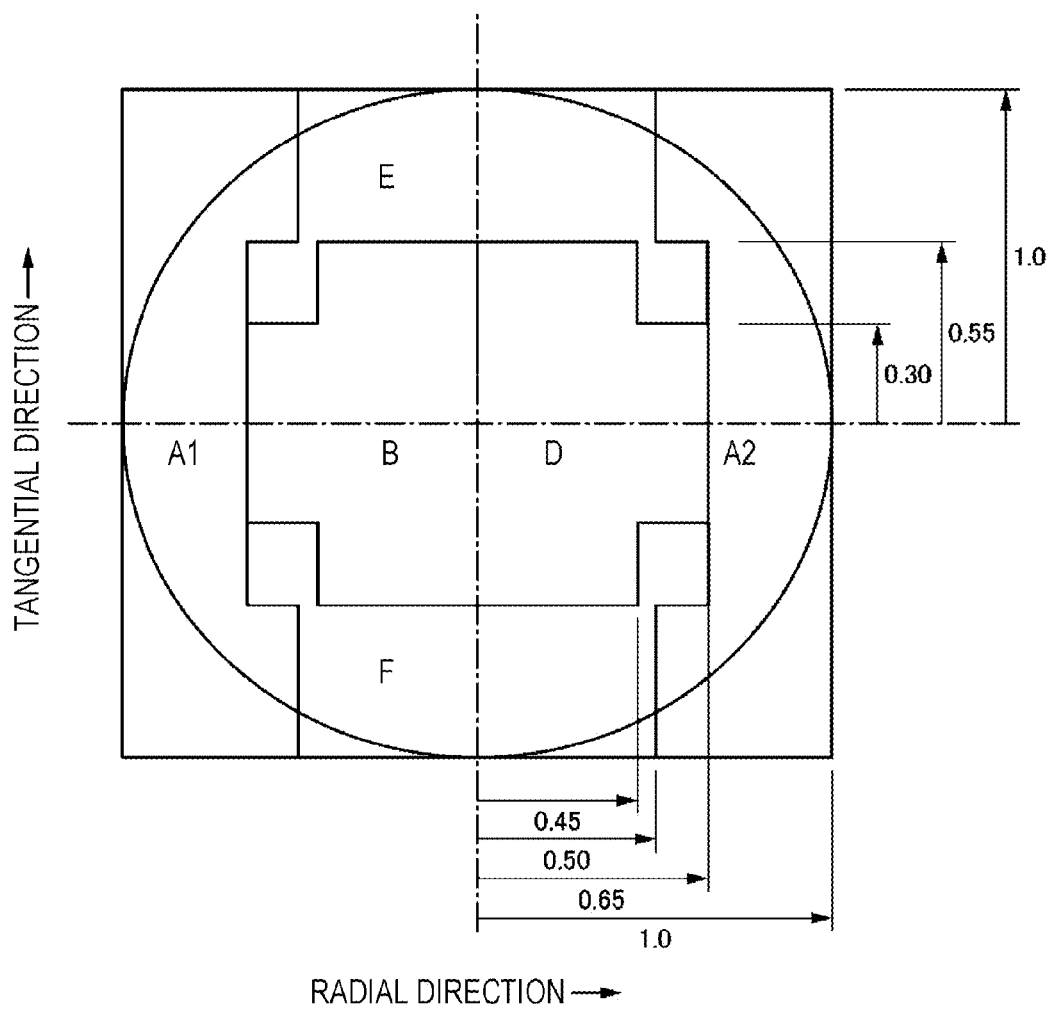
FIG. 32 is a substantial diagram of a detailed exemplary division pattern.

FIG. 32 illustrates an exemplary division pattern according to one embodiment of the present disclosure. Division is performed to make six regions denoted with A1, A2, B, D, E, and F. According to the present disclosure, the first region E and the second region F separated in the tangential direction, are formed. Then, individual detectors receive beams from the respective regions so that each channel is operated through IV amplifiers, as illustrated in Table 2.

TABLE 2

|  | IVT4M | IVR4M | IVL4M |
| --- | --- | --- | --- |
| channel 1 | A1 + A2 | E + F | E + F |
| channel 2 | B + D | B + D | A1 + A2 |
| channel 3 | E | A1 | B |
| channel 4 | F | A2 | D |

As indicated in Table 2, the detected signals of the regions in the division pattern of FIG. 32 are combined on the basis of a combination pattern that has been selected (hereinafter, appropriately referred to as a selection pattern), so that four channels Ch1 to Ch4 are individually formed as below. Selection patterns IVT4M, IVR4M, and IVL4M are formed. For example, the detected signal of the detector for each channel is composited in accordance with Table 2.

Selection pattern IVT4M: Ch1=A1+A2, Ch2=B+D, Ch3=E, and Ch4=F

Selection pattern IVR4M: Ch1=E+F, Ch2=B+D, Ch3=A1, and Ch4=A2

Selection pattern IVL4M: Ch1=E+F, Ch2=A1+A2, Ch3=B, and Ch4=D

The IVT4M corresponds to the "T type" and the IVR4M corresponds to the "R type" in the previous experimental results.

[Actual Convergent Termination of Adaptive Equalizer]

Figure 33:
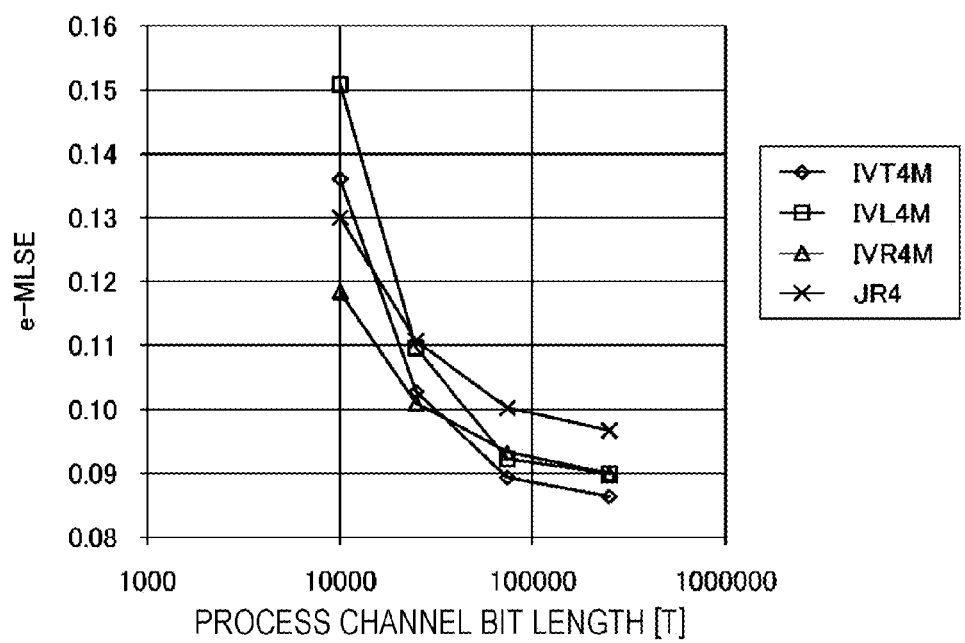
FIG. 33 illustrates graphs of the relationship between process channel bit length and e-MLSE.

FIG. 33 illustrated a simulated result of a process in which the adaptive equalizer starts from a state in which an equalization error is large and then converges, for each selection pattern illustrated in Table 2. Note that, since amplifier noise and disc noise have been added but burst noise such as defects, has not been added, the value of the e-MLSE improves as a process channel bit length increases. The pattern JR4 as a comparative example is that illustrated in FIG. 24. FIG. 33 illustrates the simulated results in a case where the linear density is LD35.18 GB (50 GB/L) and the PR class is PR(1233321).

In an actual device, it is thought that, for example, the substrate of a disc, a recording film, and recorded signal quality vary what stage each graph can reach on the horizontal axis. If the quality of, for example, the disc is favorable and the convergence can be appropriately made, the IVT4M has the most favorable characteristic. Conversely, in a case where the quality of, for example, the disc is unfavorable and a large disturbance of signal that interrupts the convergence, is present, it can be said that the IVR4M having initial convergence early is advantageous. Furthermore, it can be said that the IVL4M is unfavorable in convergence. If a proper tap coefficient initial value is given, a degree of difference in convergence can be absorbed, but in a case where the quality of, for example, the disc is unfavorable and a large disturbance of the signal that interrupts the convergence is present, a difference in convergence is reflected on a difference in an average characteristic.

Figure 34:
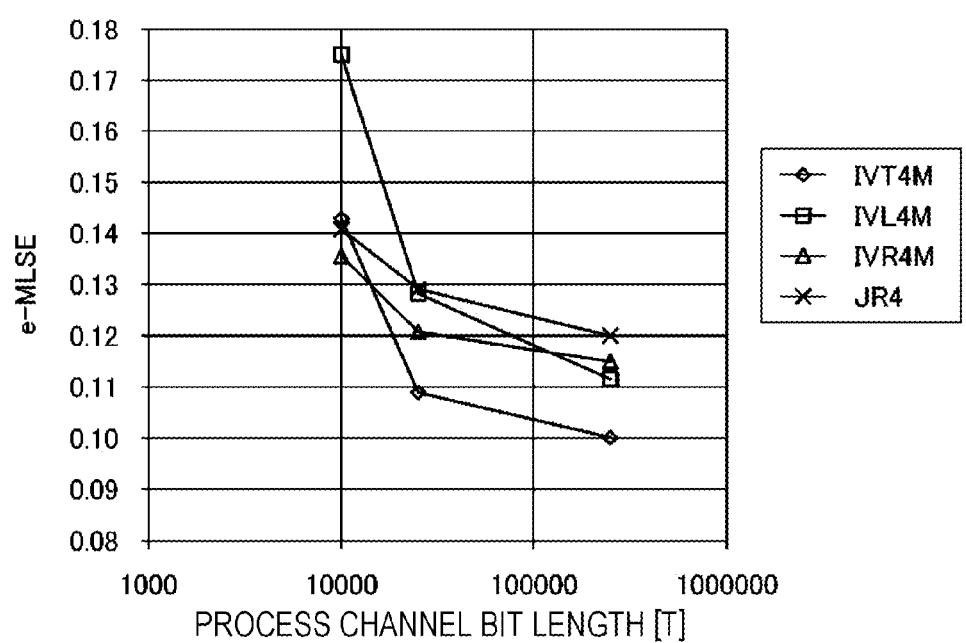
FIG. 34 illustrates graphs of the relationship between process channel bit length and e-MLSE.

FIG. 34 illustrates simulated results in a case where the linear density and the PR class have been varied. FIG. 34 illustrates the simulated results in a case where the linear density is LD44 GB (62.5 GB/L) and the PR class is PR(235777532). Regarding a tendency for each pattern, similarly to FIG. 26 with low linear density, the IVR4M (and the JR4) including the external regions having different channels in the radial direction, namely, the R type is superior in convergence.

Note that, if the initial convergence is removed, the excellence of the characteristic of the IVT4M, namely, the T type is more remarkably shown. It can be seen that the superior pattern switches depending on the linear density and the quality of, for example, the disc, even between the achievable patterns from the same division pattern.

For example, making a plurality of patterns (optical filters) formed from the original same division pattern, switchable with, for example, mode switching of an optoelectronic integrated circuit (OEIC), is considerably effective for "correspondence to various discs in quality" and "correspondence to different densities", for example.

[Different Exemplary Pattern Selection]

Figure 35:
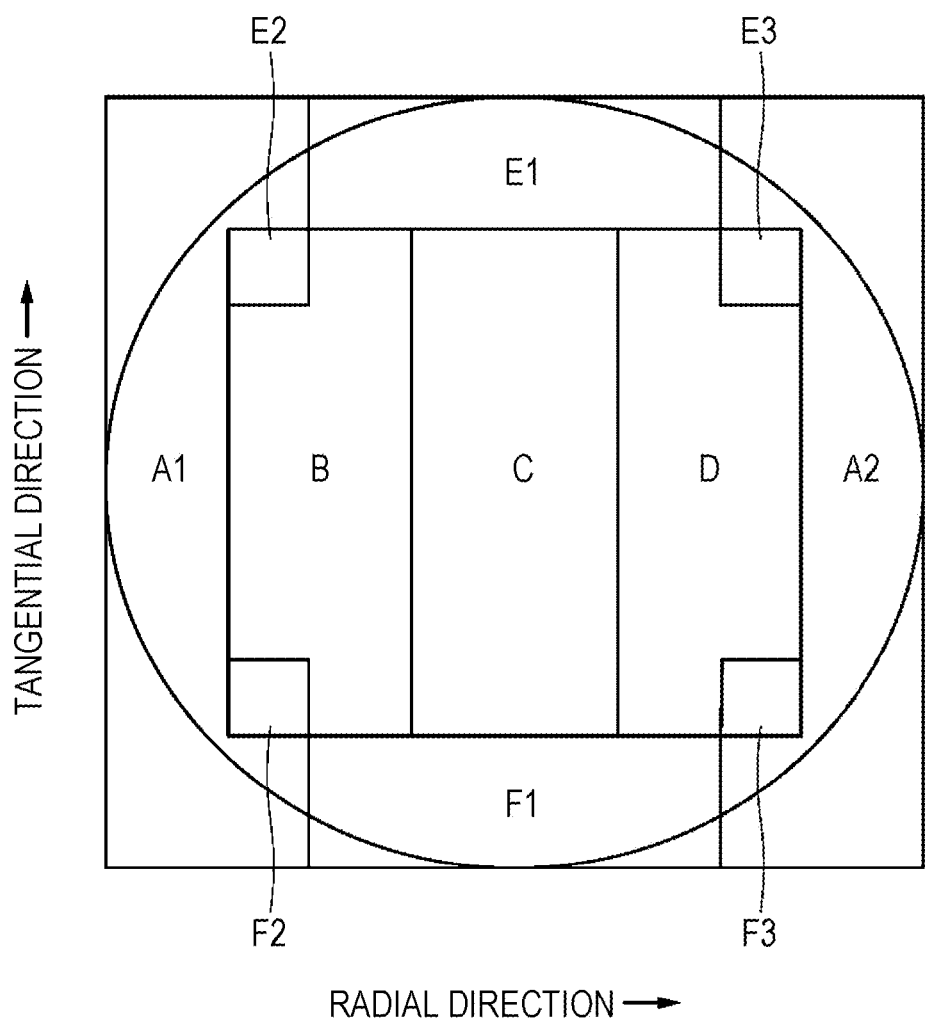
FIG. 35 is a substantial diagram for describing a pattern IVNST6 in more detail.

On the basis of the division of a pattern IVNST6 illustrated in FIG. 35, various optical filters illustrated in Table 3 can be formed. On the basis of the IVT4, the IVNST6 includes a center region B further spatially and optically divided into three in the radial direction in order to increase the number of divisions for regions having different bands in the radial direction. Here, region division positions in the radial direction are positioned so as to be ±0.25, ±0.5, and ±0.7 and region division positions in the tangential direction are positioned so as to be ±0.45 and ±0.65 when the pupillary radius is 1.0.

As indicated in Table 3, in a case where four channels of outputs are provided, a configuration of making at least two from, for example, IVTSM4, IVSP4, IVos4, and IVR4 (region A including different channels on the left and right sides) in addition to the IVT4 described above, switchable, is effective. For example, in a case where the achievement is made with an OEIC, a voltage to be applied to a mode switching pin can be switched between the three values of a high level, a middle level, and a low level. Note that, switching can be similarly made between IVTSP5 and IVNS5 in a case of five channel outputs in addition to the four channel outputs.

TABLE 3

|  | IVT4 | IVNST6 | IVTSP5 | IVTSM4 | IVNS5 | IVSP4 | IVos4 | IVR4 |
| --- | --- | --- | --- | --- | --- | --- | --- | --- |
| channel 1 | A | A | A | A | A | A | A | E + F |
| channel 2 | B + C + D | B | B + Ks × C | C + Ksm × B + Ksm × D | B | B + Ks × C | B + Ks1 × C | B + C + D |
| channel 3 |  | E | C | D + Ks × C | E | C | D + Ks × C | D + Ks2 × C | A1 |
| channel 4 |  | F | D | E | F | D | E + F | E + F | A2 |
| channel 5 |  |  | E | F |  | E + F |  |  |  |
| channel 6 |  |  | F |  |  |  |  |  |  |

[Different Exemplary Pattern Selection]

Patterns indicated in Table 4 below can also be used as pattern selection.

TABLE 4

|  | IVT4M (SD) | IVT4M | IVR4M | IVL4M |
|---|---|---|---|---|
| channel 1 | A1 + A2 | A1 + A2 | E + F | E + F |
| channel 2 | B + D | B + D | B + D | A1 + A2 |
| channel 3 | E + F | E | A1 | B |
| channel 4 | E − F | F | A2 | D |

A selection pattern IVT4M(SD) has been added in comparison to the pattern selection (refer to Table 2).

The selection pattern IVT4M(SD): Ch1=A1+A2, Ch2=B+D, Ch3=E+F, Ch4=E−F, namely, the selection pattern individually forms the sum of regions E and F (E+F) and the difference between the regions E and F (E−F) to be treated as different channels.

Embodiment of the Present Disclosure

As described above, the "adaptive electro optical (AERO) multi-function filter" can improve a reproduction characteristic. In the technology according the present disclosure, as described with reference to FIG. 7, an operation is performed to signals between regions at the pre-stage of adaptive equalization so that the influence of disturbance such as defects, is reduced and the qualities of the signals are made more favorable. According to the present disclosure, the number of divisions of a light flux (the number of regions) and the number of input signals to a signal processing unit (the number of channels), are made to be equivalent to each other. In this condition, a signal from each region is operated so that an input signal is formed to the signal processing unit.

Descriptions will be given with the pattern VHT4 (refer to FIG. 24) as an example. In this case, signals are acquired from four regions including the regions A (=A1+A2), the region C, the region E, and the region F. Then, four channels of signals are formed with linear operations indicated in Table 5 below.

TABLE 5

| OPERATION METHOD | Rad-DIRECTION INTERNAL-AND-EXTERNAL BLEND ADDED TYPE | Rad-DIRECTION INTERNAL-AND-EXTERNAL BLEND SUBTRACTED TYPE | Rad-DIRECTION INTERNAL-AND-EXTERNAL BLEND ADDED-AND-SUBTRACTED TYPE |
|---|---|---|---|
| Ch1 | K1*A + K2*C | A (OR C) | K1*A + K2*C |
| Ch2 | C (OR A) | K3*C − K4*A | K3*C − K4*A |
| Ch3 | E | E | E |
| Ch4 | F | F | F |

The operations illustrated in Table 5 include the following types.

(Radial-direction internal-and-external blend added type: A signal in an external region and a signal in an internal region in the radial direction are added together. K1 and K2 represent coefficients.)

Ch1=K1*A+K2

Ch2=C (or A)

Ch3=E

Ch4=F

In a case of the radial-direction internal and external blend added type, selecting appropriate coefficients can self-cancel adjacent track crosstalk in a low frequency region.

(Radial-direction internal-and-external blend subtracted type: Subtraction is performed between a signal in an external region and a signal in an internal region in the radial direction. K3 and K4 represent coefficients.)

Ch1=A (or C)

Ch2=K3*C−K4*A

Ch3=E

Ch4=F

A subtracting operation can remove in-phase noise, such as laser noise, so that a reproduction characteristic improvement effect is acquired in a state of a large amount of the in-phase noise.

The subtracting operation can alleviate the "disturbance such as defects".

(Radial-direction internal-and-external blend added-and-subtracted type: Addition and subtraction are performed between a signal in an external region and a signal in an internal region in the radial direction. K1 to K4 represent coefficients.)

Ch1=K1*A+K2

Ch2=K3*C−K4*A

Ch3=E

Ch4=F

The features of the added type and the subtracted type are included.

For the regions E and F in the tangential direction, similarly to the radial direction, four channels of signals can be formed with liner operations illustrated in Table 6 below.

TABLE 6

| OPERATION METHOD | Tan-DIRECTION SUBTRACTED-AND-ADDED TYPE | Tan-DIRECTION ENHANCED TYPE | Tan-DIRECTION BLENDED TYPE |
|---|---|---|---|
| Ch1 | A | A | A |
| Ch2 | C | C | C |
| Ch3 | E + F | K5*E − K6*F | K7*E + K8*F |
| Ch4 | E − F | K6*E − K5*F | K8*E + K7*F |

The operations illustrated in Table 6 include the following types.

(Tangential-direction added-and-subtracted type: The sum of the regions E and F and the difference between the regions E and F are formed in the tangential direction. K5 and K6 are coefficients.)

Ch1=A

Ch2=C

Ch3=E+F

Ch4=E−F

The tangential-direction added-and-subtracted type has a high accuracy of detecting the state of a mark phase.

Figure 36:
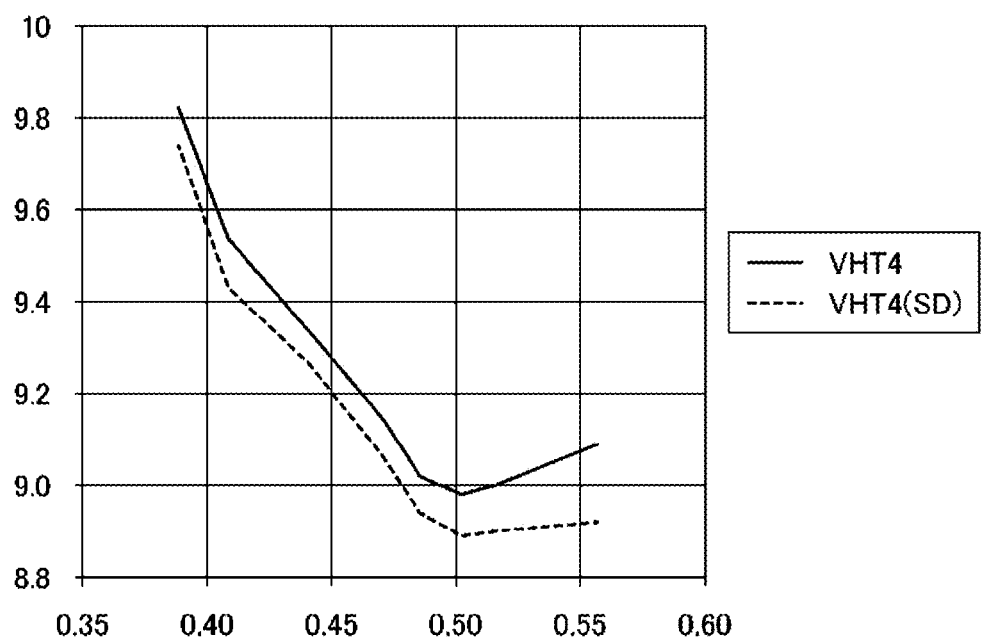
FIG. 36 illustrates graphs for describing a case where an added-and-subtracted-typed operation has been performed.

The channel Ch4 for the difference can remove the in-phase noise, such as the laser noise, so that a reproduction characteristic improvement effect is acquired in a state of a large amount of the in-phase noise. As indicated with a broken line in FIG. 36, the tangential-direction added-and-subtracted type is superior.

(Tangential-direction enhanced type: Subtraction is performed between signals in two regions in the tangential direction. K5 and K6 are coefficients.)

Ch1=A

Ch2=C

Ch3=K5*E−K6*F

Ch4=K6*E−K5*F

The tangential-direction enhanced type has an effect of enhancing the phase difference between the E and the F, and improves the reproduction characteristic with a mark phase.

(Tangential-direction blended type: Addition is performed between signals in two regions in the tangential direction. K7 and K8 represent coefficients.)

Ch1=A
Ch2=C3*C−K4*A
Ch3=K7*E+K8*F
Ch4=K8*E+K7*F

The features of the added-and-subtracted type and the enhanced type are included.

Furthermore, the difference between the region E or the region F in the tangential direction and the region A in the radial direction, may be acquired as illustrated in Table 7 below.

TABLE 7

| OPERATION METHOD | Rad-Tan SUBTRACTED TYPE | Rad-DIRECTION INTERNAL-AND-EXTERNAL BLEND ADDED-AND-SUBTRACTED TYPE WITH Tan-Rad SUBTRACTED TYPE |
|---|---|---|
| Ch1 | A | K1*A + K2*C |
| Ch2 | C | K3*C − K4*A |
| Ch3 | K9*E − K10*A | K9*E − K10*A |
| Ch4 | K9*F − K10*A | K9*F − K10*A |

Operations illustrated in Table 7 include the following types.

(Tangential-radial subtracted type: The region A is subtracted from the regions E and F in the tangential direction. K9 and K10 are coefficients.)

Ch1=A
Ch2=C
Ch3=K9*E−K10*A
Ch4=K9*F−K10*A (Radial-direction internal-and-external blend added-and-subtracted type added with tangential-radial subtracted type)

Ch1=K1*A+K2*C
Ch2=K3*C−K4*A
Ch3=K9*E−K10*A
Ch4=K9*F−K10*A

In an actual optical disc reproducing device, discs to be mounted are not constant in quality and a disc including a large number of defects may be mounted. That is, for example, a foreign substance on a recording surface, a groove molded failure, or the failure of a recording film, being small, a foreign substance or an air bubble included in a middle layer or a cover layer, being large, or dust or fingerprints adhering to a disc surface, can be considered as disturbance such as defects. The operations of acquiring the difference between regions are used for a disc including a large amount of disturbance such as defects, similar to the above, so that an error can be inhibited from occurring.

Note that, the coefficients in each operation, may be varied in response to a mark phase or the tendency of defects. The value of each coefficient can be optimized on the basis of the area ratio or the light intensity ratio between regions between which the difference is acquired.

The operations of acquiring the difference between regions are used for a disc including a large amount of disturbance such as defects, so that an error can be inhibited from occurring.

[Effects of the Present Disclosure]

Figure 37:
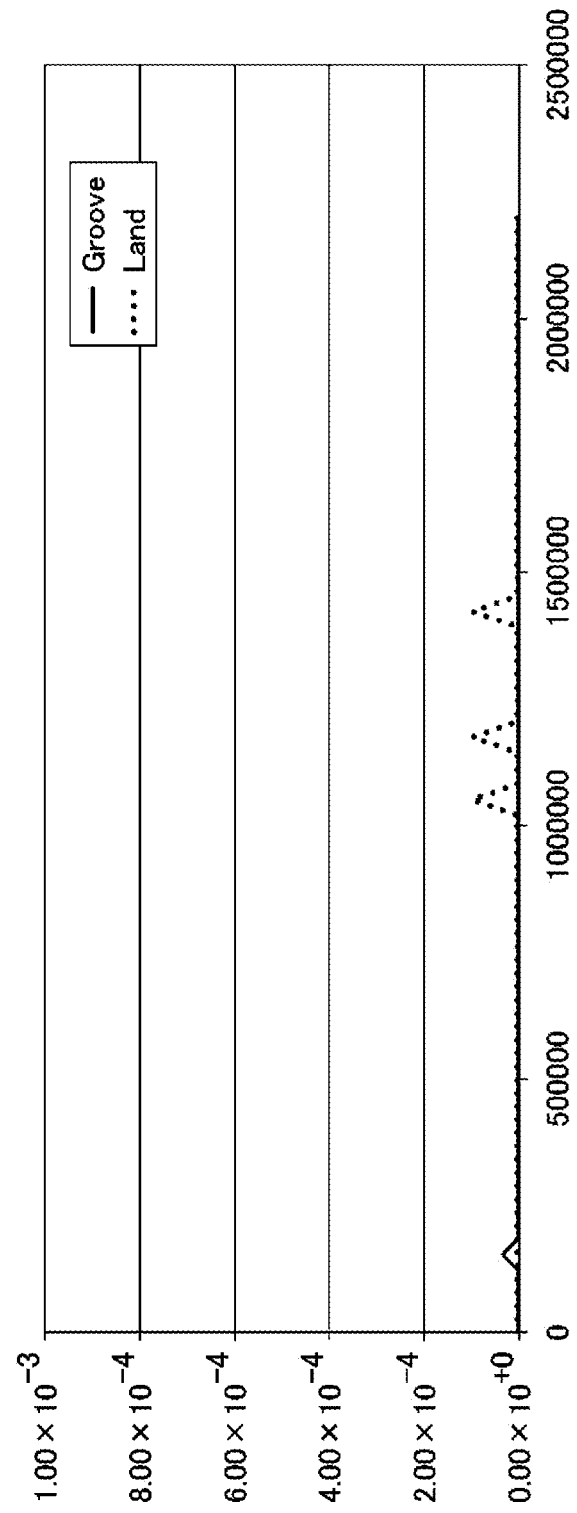
FIG. 37 illustrates graphs of exemplary measurement of error rates.

The effects of the present disclosure will be described below with the pattern VHT4 as an example. FIG. 37 illustrates graphs of exemplary measurement of error rates in a case where no operation has been performed for the signals of the regions and in a case where a disc having a small number of defects has been reproduced. For example, the disc reproducing device illustrated in FIG. 1 is used. The disc that has been used is a disc having a single-sided/three-layer structure, described below. Note that a graph indicated with a solid line indicates an error rate in groove reproducing, and a graph indicated with a broken line indicates an error rate in land reproducing. The horizontal axis represents the clock number and the vertical axis represents the error rate. As illustrated in FIG. 37, no particular problem occurs in a case where the disc having a small number of defects has been reproduced.

Recording surface: single-sided/three layer structure
Tp=0.225 µm (for land and groove)

Figure 38:
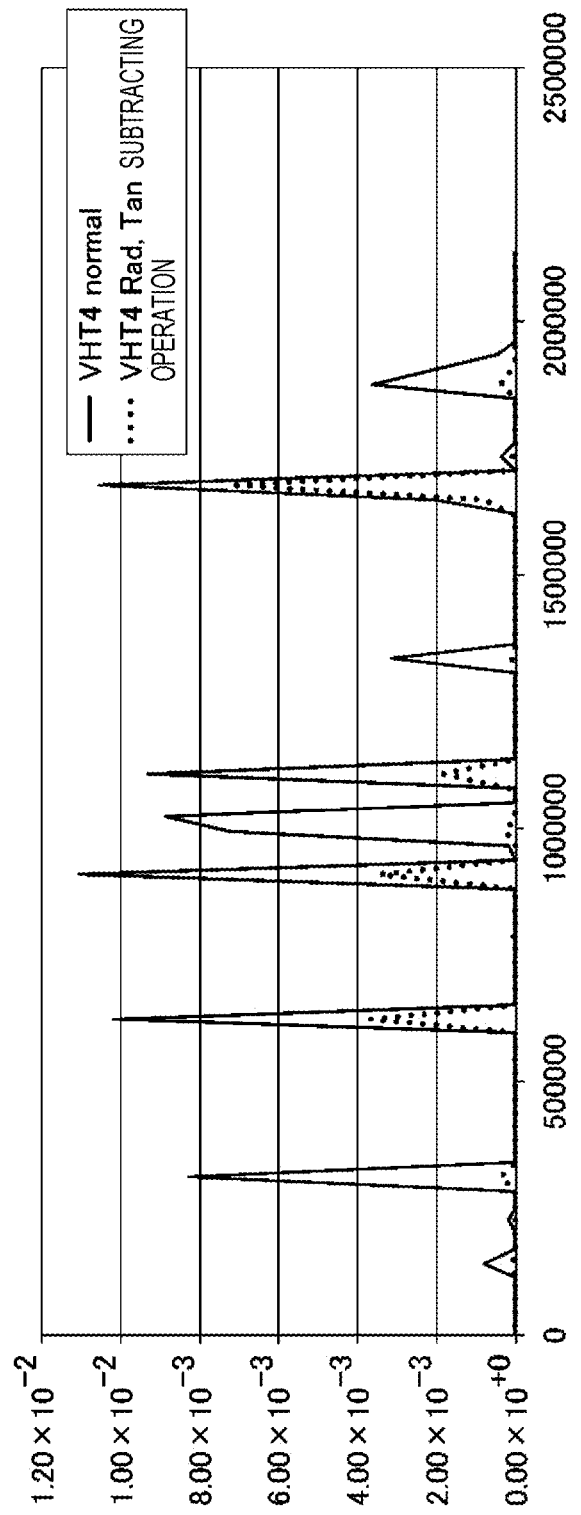
FIG. 38 illustrates graphs of exemplary measurement of error rates.
Figure 39:
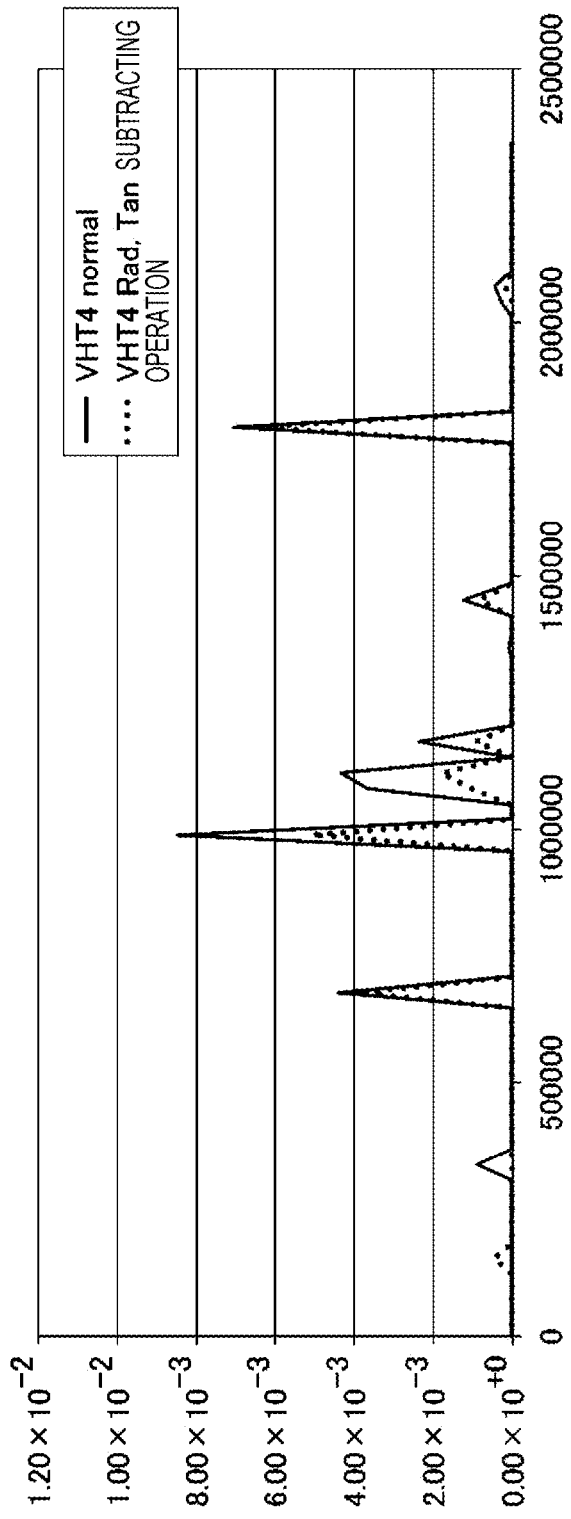
FIG. 39 illustrates graphs of exemplary measurement of error rates.

Signal recording density of LD35.18 GB (53 nm/channelbit) corresponding to 50.0 GB/layer and 300 GB with double-sided 6 layers Recording to both of the land and the groove FIGS. 38 and 39 illustrate graphs of exemplary measurement of error rates in a case where a disc having a large number of defects has been reproduced. The disc that has been used and the vertical axis and the horizontal axis of the graphs, are similar to those in FIG. 37. FIG. 38 illustrates data in groove reproducing and FIG. 39 illustrates data in land reproducing. In FIGS. 38 and 39, graphs indicated with a solid line each indicate data in a case where no operation has been performed for the signals of the regions, and graphs indicated with a broken line each indicate data according to the present disclosure in which an operation has been performed for the signals of the regions, as indicated in Table 8. As illustrated in FIGS. 38 and 39, the error rates can be reduced due to the present disclosure in the case where the disc having a large number of defects has been performed.

That is, using an operation of acquiring the difference between regions for a disc having a large amount of disturbance such as defects, can inhibit an error from occurring. Note that, the coefficients of the operation may be varied depending on a mark phase and the tendency of defects. The coefficients can be optimized on the basis of the area ratio and the light intensity ratio between regions between which the difference is acquired. Particularly, the effect increases in a case of a division pattern in which outputs are used from a plurality of regions having different center positions in the tangential direction (referred to as T type).

TABLE 8

| OPERATION METHOD | LD35.2 GB GroovebER-min | LD35.2 GB G AND L COMMON | LD35.2 GB LandbER-min |
|---|---|---|---|
| Ch1 | A | A | A + 0.5*C |
| Ch2 | C − 2.5*A | C − 3*A | C − 5*A |
| Ch3 | E − 0.5*A | E − 0.7*A | E − 1.2*A |
| Ch4 | F − 0.5*A | F − 0.7*A | F − 1.2*A |

Operations illustrated in Table 8 each are a type including the radial-direction internal-external blend added-and-subtracted type and the tangential-radial subtracted type. Furthermore, the operations are indicated as in groove reproducing, as common to the groove and the land, and as in land reproducing.

In groove reproducing:
Ch1=A
Ch2=C−2.5*A
Ch3=E−0.5*A
Ch4=F−0.5*A
Groove and land common operation:
Ch1=A
Ch2=C−3*A
Ch3=E−0.7*A
Ch4=F−0.7*A
In land reproducing:
Ch1=A*0.5*C
Ch2=C−5*A
Ch3=E−1.2*A
Ch4=F−1.2*A The six regions A1, A2, B, D, E, and F of the division pattern IVT4M illustrated in FIG. 32 described above, are operated in accordance with the selection patterns IVT4M, IVR4M, and IVL4M as illustrated in Table 2. The present disclosure can applied even in this case. An exemplary operation for each selection pattern is described below. Here, a configuration of acquiring a difference with respect to regions outside in the radial direction, is provided. For example, the radial-direction internal-and-external blend added-and-subtracted type added with tangential-radial subtracted type is provided.

Table 9 indicates exemplary operations in the selection pattern IVT4M(SD).

TABLE 9

| OPERATION METHOD | IVT4M (SD) | Rad-DIRECTION INTERNAL-AND-EXTERNAL BLEND ADDED-AND-SUBTRACTED TYPE WITH Tan-Rad SUBTRACTED TYPE |
|---|---|---|
| Ch1 | A1 + A2 | K1* (A1 + A2) + K2* (B + D) |
| Ch2 | B + D | K3* (B + D) + K4* (A1 + A2) |
| Ch3 | E + F | K9'* (E + F) − K10* (A1 + A2) |
| Ch4 | E − F | E − F |

Table 10 indicates exemplary operations in the selection pattern IVT4M.

TABLE 10

| OPERATION METHOD | IVT4M | Rad-DIRECTION INTERNAL-AND-EXTERNAL BLEND ADDED-AND-SUBTRACTED TYPE WITH Tan-Rad SUBTRACTED TYPE |
|---|---|---|
| Ch1 | A1 + A2 | K1* (A1 + A2) + K2* (B + D) |
| Ch2 | B + D | K3* (B + D) + K4* (A1 + A2) |
| Ch3 | E | K9*E − K10* (A1 + A2) |
| Ch4 | F | K9*F − K10* (A1 + A2) |

Table 11 indicates exemplary operations in the selection pattern IVR4M.

TABLE 11

| OPERATION METHOD | IVR4M | Rad-DIRECTION INTERNAL-AND-EXTERNAL BLEND ADDED-AND-SUBTRACTED TYPE WITH Tan-Rad SUBTRACTED TYPE |
|---|---|---|
| Ch1 | E + F | K9'* (E + F) − K10* (A1 + A2) |
| Ch2 | B + D | K3* (B + D) + K4* (A1 + A2) |

TABLE 11-continued

| OPERATION METHOD | IVR4M | Rad-DIRECTION INTERNAL-AND-EXTERNAL BLEND ADDED-AND-SUBTRACTED TYPE WITH Tan-Rad SUBTRACTED TYPE |
|---|---|---|
| Ch3 | A1 | A1 |
| Ch4 | A2 | A2 |

Table 12 indicates exemplary operations in the selection pattern IVL4M.

TABLE 12

| OPERATION METHOD | IVL4M | Rad-DIRECTION INTERNAL-AND-EXTERNAL BLEND ADDED-AND-SUBTRACTED TYPE WITH Tan-Rad SUBTRACTED TYPE |
|---|---|---|
| Ch1 | E + F | K9'*(E + F) − K10*(A1 + A2) |
| Ch2 | A1 + A2 | K1*(A1 + A2) + K2*(B + D) |
| Ch3 | B | K3'*B − K4*(A1 + A2) |
| Ch4 | D | K3'*D − K4*(A1 + A2) |

Table 13 indicates exemplary settings of coefficients for the selection pattern IVR4M.

TABLE 13

| OPERATION METHOD | LD35.2 GB GroovebER-min |
|---|---|
| Ch1 | 0.7(E + F) − (A1 + A2) |
| Ch2 | (B + D) − 1.75(A1 + A2) |
| Ch3 | A1 |
| Ch4 | A2 |

Figure 40:
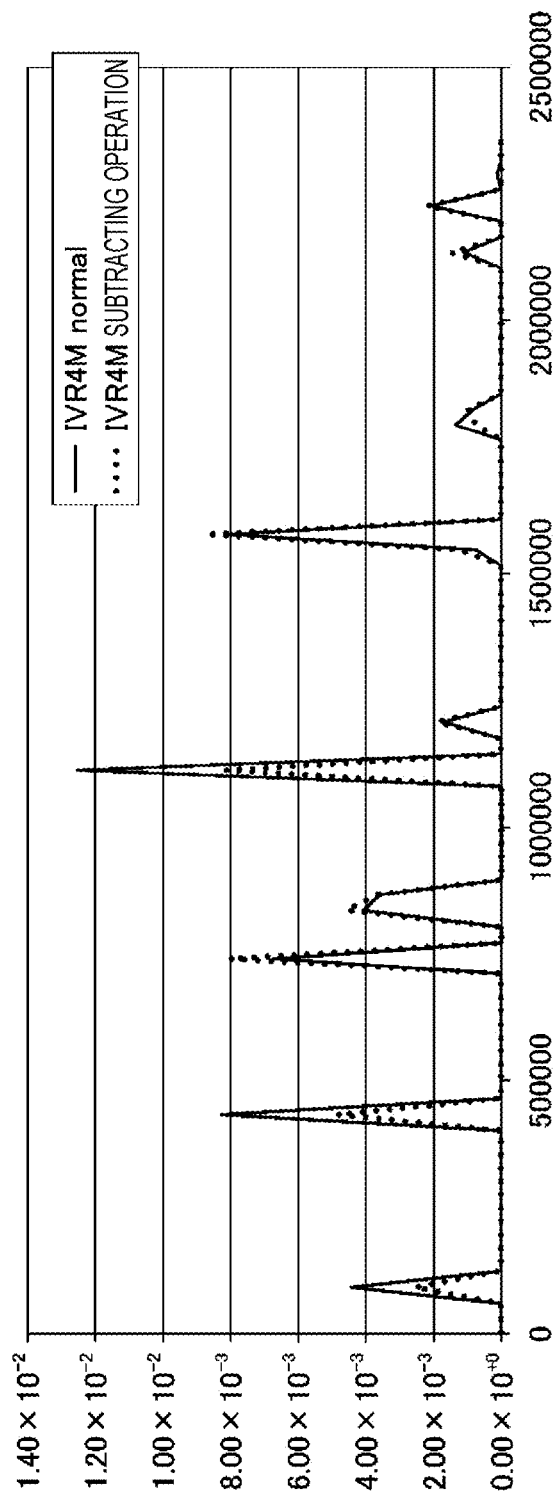
FIG. 40 illustrates graphs of exemplary measurement of error rates.

FIG. 40 illustrates graphs of exemplary measurement of error rates in a case where the coefficients have been set as indicated in Table 13 and a disc having a large number of defects has been reproduced. The disc that has been used and the vertical axis and the horizontal axis of the graphs are similar to those in FIG. 37. FIG. 40 indicates data in groove reproducing. In FIG. 40, a graph indicated with a solid line indicates data in a case where no operation has been performed for the signals of the regions, and a graph indicated with a broken line indicates data according to the present disclosure in which an operation has been performed for the signals of the regions, as illustrated in Table 13. As illustrated in FIG. 40, the error rate can be reduced due to the present disclosure in the case where the disc having a large number of defects has been performed.

That is using an operation of acquiring the difference between regions for a disc having a large amount of disturbance such as defects, can inhibit an error from occurring. Note that, the coefficients in each operation, may be varied in response to a mark phase or the tendency of defects. The coefficients can be optimized on the basis of the area ratio and the light intensity ratio between regions between which the difference is acquired.

[Description of the Reason why a Signal Characteristic does not Degrade Largely Even in a Case where an Inter-Region Operation has been Performed]

As described above, according to the embodiment of the present disclosure, an operation in which the number of signals before the operation and the number of signals after the operation are equivalent, is performed as an inter-region operation. Instead of the "addition and subtraction"

described above, various operations in which the number of signals is constant before and after the inter-region operation between regions, can be considered.

Figure 41:
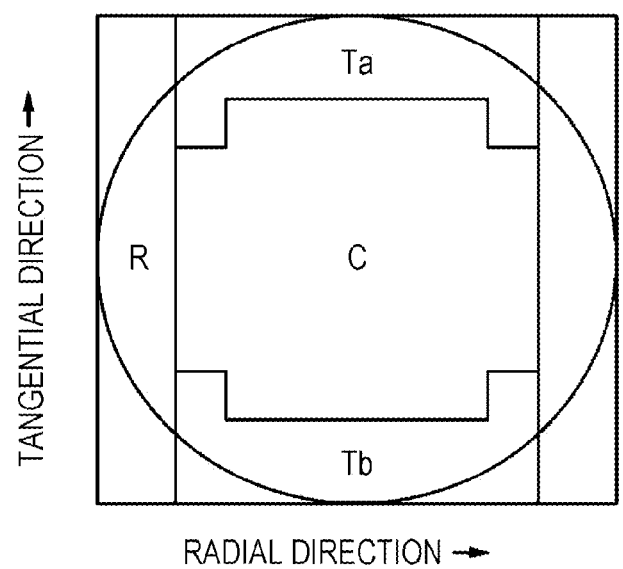
FIG. 41 is a substantial diagram for describing a pattern VHT4.

The reason why a signal characteristic does not degrade largely even in case where the inter-region operation has been performed, will be described with the pattern VHT4 as an example. For convenience of the description, signal names corresponding to the regions are changed as indicated in FIG. 41. As described later, a signal characteristic does not degrade largely even in a case where addition and subtraction are performed to an average signal level multiplied by a gain (a coefficient) of one to approximately two.

Figure 42:
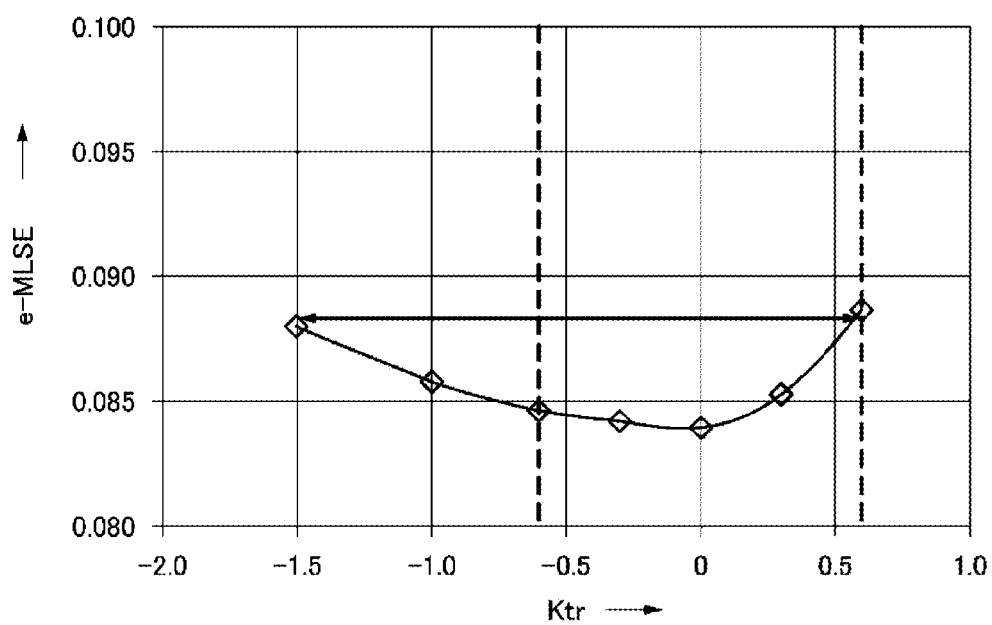
FIG. 42 illustrates a graph of the relationship between the coefficient of a first exemplary inter-region operation and e-MLSE.

FIG. 42 illustrates a simulated result of the variation of the e-MLSE with respect to a coefficient Ktr in a case where the following operation has been performed as a first example.

Ch1=R
Ch2=Ta+Ktr*R
Ch3=C
Ch4=Tb+Ktr*R

Conditions of the simulation are as follows: Tp=0.225 μm (for land and groove)
Signal recording density of LD35.18 GB (53 nm/channelbit)
50 GB/layer
Recording to both of the land and the groove In FIG. 42, broken lines individually indicate the positions of a Ktr of −0.6 and a Ktr of 0.6. The broken lines correspond to the average light intensity ratios between regions Ta and Tb outside in the tangential direction and a region R outside in the radial direction. A value of 0.6R in a case of a Ktr of 0.6, is substantially equivalent to that of the Ta in terms of the average light intensity ratio. That is, the simulated result of FIG. 42 indicates that degradation is small in the signal characteristic in a range between addition of a signal R having approximately the average light intensity ratio and subtraction of the signal R having approximately the average light intensity ratio doubled with respect to signals Ta and Tb corresponding to the outside in the tangential direction.

Figure 43:
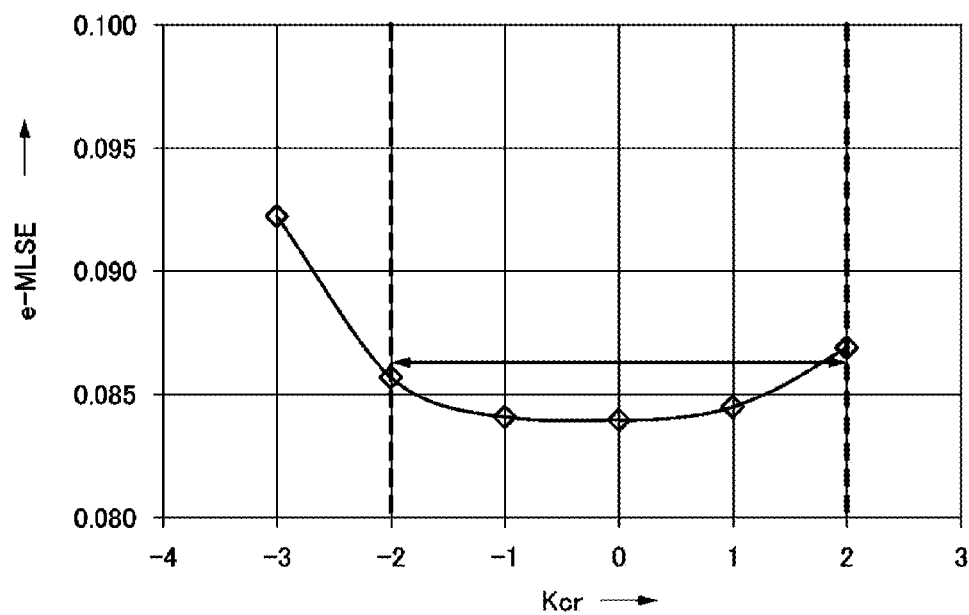
FIG. 43 illustrates a graph of the relationship between the coefficient of a second exemplary inter-region operation and e-MLSE.

FIG. 43 illustrates a simulated result of the variation of the e-MLSE with respect to a coefficient Kcr in a case where the following operation has been performed as a second example.

Ch1=R
Ch2=Ta
Ch3=C+Kcr*R
Ch4=Tb

Conditions of the simulation are as follows:
Tp=0.225 μm (for land and groove)
Signal recording density of LD35.18 GB (53 nm/channelbit)
50 GB/layer
Recording to both of the land and the groove In FIG. 43, broken lines individually indicate the positions of a Kcr of −2 and a Kcr of 2. A range interposed between the broken lines corresponds to the average light intensity ratio between the regions Ta and Tb outside in the tangential direction and the region R outside in the radial direction. A value of 2R in a case of a Kcr of 2, is substantially equivalent to that of the C in terms of the average light intensity ratio. That is, the simulated result of FIG. 43 indicates that degradation is small in the signal characteristic in a range between addition and subtraction of the signal R having approximately the average light intensity ratio with respect to a signal C corresponding to a center region.

Figure 44:
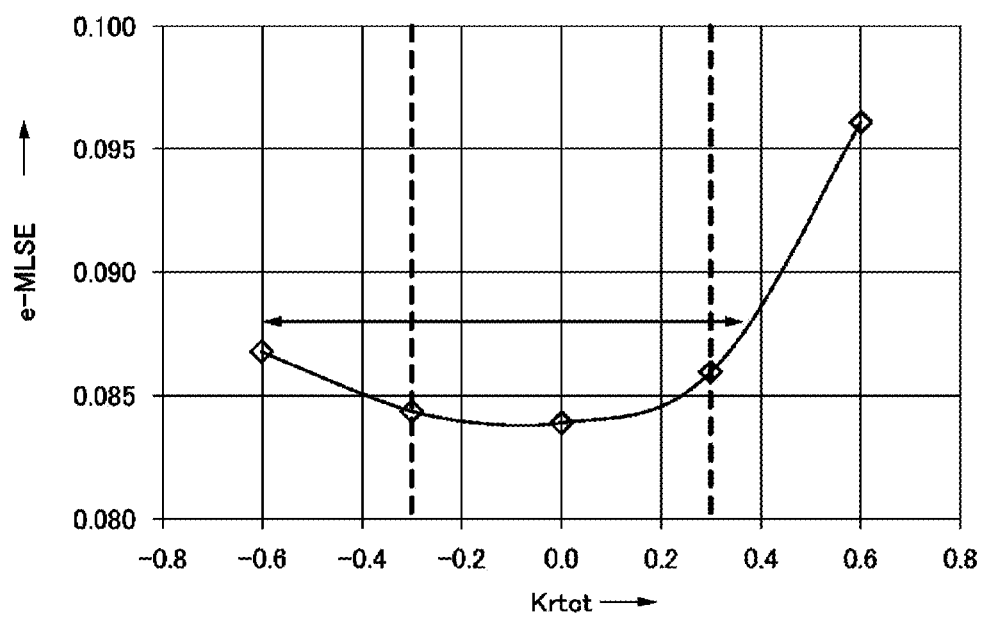
FIG. 44 illustrates a graph of the relationship between the coefficient of a third exemplary inter-region operation and e-MLSE.

FIG. 44 illustrates a simulated result of the variation of the e-MLSE with respect to a coefficient Krtct in a case where the following operation has been performed as a third example.

Ch1=R+Krtct*(Ta+C+Tb)
Ch2=Ta
Ch3=C
Ch4=Tb

Conditions of the simulation are as follows:
Tp=0.225 μm (for land and groove)
Signal recording density of LD35.18 GB (53 nm/channelbit)
50 GB/layer
Recording to both of the land and the groove In FIG. 44, broken lines individually indicate the positions of a Krtct of 0.3 and a Krtct of −0.3. A range interposed between the broken lines corresponds to the average light intensity ratio between the regions Ta and Tb outside in the tangential direction, the center region C, and the region R outside in the radial direction. A value of 0.3(Ta+C+Tb) in a case of a Krtct of 0.3, is substantially equivalent to that of the R in terms of the average light intensity ratio. That is, the simulated result of FIG. 44 indicates that degradation is small in the signal characteristic in a range between addition of a signal (Ta+C+Tb) having approximately the average light intensity ratio and subtraction of the signal (Ta+C+Tb) having the average light intensity ratio doubled with respect to the signal R corresponding to the region outside in the radial direction.

As described above, according to the present disclosure, the inter-region operation is performed so that tolerance can improve against disturbance such as defects. As can be seen in the simulated results described above, the signal characteristic does not degrade largely even in a case where addition and subtraction have been performed after multiplication of a coefficient in a range of the average light intensity ratio (average signal level) multiplied by one to approximately two.

Note that, the coefficient may be fixed, or at least two constants may be provided so that switching may be performed between the constants. Furthermore, the coefficient may be variable. Furthermore, the inter-region operation may be performed with an analog circuit on an OEIC (PDIC), may be performed with a matrix circuit (an analog circuit) including an individual OEIC output, or may be performed with a digital circuit after an A/D converter converts the signals into digital signals.

Furthermore, according to the present disclosure, switching is performed between a case where the operation for defect-tolerance improvement is used and a case where no operation is used and then a difference between characteristics is detected so that defects can be detected and a detected result can be used for defect measures. Furthermore, providing a mechanism of cleaning a disc by, for example, injecting the wind into a drive or a library, or performing wiping, is effective against dust on a disc surface. The operation of the mechanism of performing the cleaning, may be controlled with the disc detected result. In a case where a double-sided disc is provided in order to acquire large capacity, providing the mechanism of cleaning a disc is effective because the disc is particularly and easily susceptible to the influence of dust.

<Modification>

The embodiments of the present disclosure have been specifically described above. However, the present disclosure is not limited to each embodiment and various modifications based on the technical idea of the present disclosure may be made. For example, the numeral values of the wavelength of the laser light source, the track pitch, and the recording linear density described above are exemplary, and thus other numeral values may be used. Furthermore, as an index for evaluating the reproduction performance, other indices may be used instead of the index described above. Furthermore, the present disclosure can be applied to an optical disc device that only performs recording or reproducing to an optical disc.

In addition, for example, the configurations, the methods, the processes, the shapes, and the materials and the numerical values in the embodiments described above, can be combined with each other without departing from the spirit of the present disclosure.

Note that, the present disclosure can include the following configurations.

(1)

An optical medium reproducing device configured to optically reproduce an optical medium including a plurality of tracks formed, includes: an optical filter configured to receive an incident returned light beam from the optical medium, and to spatially and optically form a plurality of signals having different bands in a tangential direction and a radial direction; an arithmetic unit configured to operate the plurality of first signals formed by the optical filter so as to form a plurality of channels of second signals; and an electrical filter configured to individually receive the second signals, and to perform processing to the second signals so as to acquire a reproduced signal.

(2)

According to the optical medium reproducing device described in (1), the number of the first signals is equivalent to the number of the second signals.

(3)

According to the optical medium reproducing device described (1) or (2), the optical filter divides a light flux of the returned light beam into a plurality of regions having different positions in the tangential direction and the radial direction, and a plurality of detected signals corresponding to light intensities individually incident on the plurality of regions, includes the first signals.

(4)

According to the optical medium reproducing device described in (3), the arithmetic unit performs addition or subtraction to the detected signals of the plurality of regions having the different positions in the tangential direction so as to form the second signals.

(5)

According to the optical medium reproducing device described in (3), the arithmetic unit performs addition or subtraction to the detected signals of the plurality of regions having the different positions in the radial direction so as to form the second signals.

(6)

According to the optical medium reproducing device described in (3), the arithmetic unit adds, between the detected signals of the plurality of regions having the different positions in the tangential direction and the detected signals of the plurality of regions having the different positions in the radial direction, the detected signals on one side to the detected signals on the other side or subtracts the detected signals on the one side from the detected signals on the other side, so as to form the second signals.

(7)

According to the optical medium reproducing device described in any of (1) to (6), the electrical filter includes: a multi-input equalizer unit including a plurality of equalizer units individually supplied with the plurality of channels of signals, the multi-input equalizer unit configured to operate outputs of the plurality of equalizer units so as to output an equalized signal; and a binarization unit configured to perform binarization processing to the equalized signal so as to acquire binarized data.

(8)

The optical medium reproducing device described in (7), further includes: a multi-input adaptive equalizer unit including the multi-input equalizer unit; and an equalization error arithmetic unit configured to acquire an equalization error from an equalization target signal acquired on the basis of a binarized detected result of the binarization unit and the equalized signal output from the multi-input adaptive equalizer unit, the equalization error arithmetic unit configured to supply the equalization error to the multi-input adaptive equalizer unit as a control signal for adaptive equalization.

(9)

According to the optical medium reproducing device described in (8), the multi-input adaptive equalizer unit performs partial response equalization processing to an output signal, the binarization unit performs maximum likelihood decoding processing as binarization processing to the equalized signal of the multi-input adaptive equalizer unit, and the equalization error arithmetic unit acquires the equalization error with an operation of using the equalization target signal acquired by convolution processing of the binarized detected result due to the maximum likelihood decoding and the equalized signal output from the multi-input adaptive equalizer unit.

(10)

According to the optical medium reproducing device described in any of (1) to (9), the optical medium includes a land and a groove alternately formed, and the optical medium including information recorded on both of the land and the groove, is reproduced.

(11)

An optical medium reproducing method of optically reproducing an optical medium including a plurality of tracks formed, includes: forming a plurality of signals having different bands in a tangential direction and a radial direction, spatially and optically, from an incident returned light beam from the optical medium, by an optical filter; by an arithmetic unit, operating the plurality of first signals formed by the optical filter to form a plurality of channels of second signals; and performing processing to the second signals that have been input, by an electrical filter to acquire a reproduced signal.

REFERENCE SINGS LIST

13 multi-input adaptive equalizer
14 binarization detector
15 PR convolver
21 to 23 adaptive equalizer unit
100 optical disc
101 optical pickup
105 data detection processing unit
131 optical filter
132 arithmetic unit
133$_1$ to 133$_n$ electrical filter

The invention claimed is:
1. An optical medium reproducing device configured to optically reproduce an optical medium including a plurality of tracks, the optical medium reproducing device comprising:

a light source configured to emit a laser beam;

an objective lens configured to irradiate the optical medium with the laser beam;

an optical filter configured to receive an incident returned light beam from the optical medium, and to spatially and optically divide the incident returned light beam into a plurality of regions including a plurality of first signals having different bands in a linear density direction and a track density direction with parting lines extending in a tangential direction and a radial direction;

an arithmetic unit configured to operate the plurality of first signals formed by the optical filter so as to form a plurality of channels of second signals; and an electrical filter configured to individually receive the second signals, and to perform processing to the second signals so as to acquire a reproduced signal, wherein the electrical filter has a filter characteristic including different amplitude-frequency characteristics and/or phase-frequency characteristics individually with respect to the plurality of signals individually generated in response to the regions separated by the optical filter.

2. The optical medium reproducing device according to claim 1, wherein the number of the first signals is equivalent to the number of the second signals.

3. The optical medium reproducing device according to claim 1, wherein the optical filter divides a light flux of the returned light beam into a plurality of regions having different positions in the tangential direction and the radial direction, and a plurality of detected signals corresponding to light intensities individually incident on the plurality of regions, includes the first signals.

4. The optical medium reproducing device according to claim 3, wherein the arithmetic unit performs addition and subtraction to the detected signals of the plurality of regions having the different positions in the tangential direction so as to form the second signals.

5. The optical medium reproducing device according to claim 3, wherein the arithmetic unit performs addition or subtraction to the detected signals of the plurality of regions having the different positions in the radial direction so as to form the second signals.

6. The optical medium reproducing device according to claim 3, wherein the arithmetic unit adds, between the detected signals of the plurality of regions having the different positions in the tangential direction and the detected signals of the plurality of regions having the different positions in the radial direction, the detected signals on one side to the detected signals on the other side or subtracts the detected signals on the one side from the detected signals on the other side, so as to form the second signals.

7. The optical medium reproducing device according to claim 1, wherein the electrical filter includes:

a multi-input equalizer unit including a plurality of equalizer units individually supplied with the plurality of channels of signals, the multi-input equalizer unit configured to operate outputs of the plurality of equalizer units so as to output an equalized signal; and a binarization unit configured to perform binarization processing to the equalized signal so as to acquire binarized data.

8. The optical medium reproducing device according to claim 7, further comprising:

a multi-input adaptive equalizer unit including the multi-input equalizer unit; and an equalization error arithmetic unit configured to acquire an equalization error from an equalization target signal acquired on the basis of a binarized detected result of the binarization unit and the equalized signal output from the multi-input adaptive equalizer unit, the equalization error arithmetic unit configured to supply the equalization error to the multi-input adaptive equalizer unit as a control signal for adaptive equalization.

9. The optical medium reproducing device according to claim 8, wherein the multi-input adaptive equalizer unit performs partial response equalization processing to an output signal, the binarization unit performs maximum likelihood decoding processing as binarization processing to the equalized signal of the multi-input adaptive equalizer unit, and the equalization error arithmetic unit acquires the equalization error with an operation of using the equalization target signal acquired by convolution processing of the binarized detected result due to the maximum likelihood decoding and the equalized signal output from the multi-input adaptive equalizer unit.

10. The optical medium reproducing device according to claim 1, wherein the optical medium includes a land and a groove alternately formed, and the optical medium including information recorded on both of the land and the groove, is reproduced.

11. An optical medium reproducing method of optically reproducing an optical medium including a plurality of tracks, the optical medium reproducing method comprising the steps of:

irradiating, by an objective lens, the optical medium with a laser beam from a light source;

dividing, by an optical filter, an incident returned light beam from the optical medium, into a plurality of regions including a plurality of first signals having different bands in a linear density direction and a track density direction, spatially and optically, with parting lines extending in a tangential direction and a radial direction;

operating, by an arithmetic unit, the plurality of first signals formed by the optical filter to form a plurality of channels of second signals;

performing, by an electrical filter, processing to the second signals that have been input, to acquire a reproduced signal, wherein the electrical filter has a filter characteristic including different amplitude-frequency characteristics and/or phase-frequency characteristics individually with respect to the plurality of signals individually generated in response to the regions separated by the optical filter.

* * * * *